United States Patent [19]

Capello et al.

[11] Patent Number: 5,187,747

[45] Date of Patent: Feb. 16, 1993

[54] METHOD AND APPARATUS FOR CONTEXTUAL DATA ENHANCEMENT

[76] Inventors: Richard D. Capello, 1911 Rushmore, Orange, Calif. 92667; George R. Mabry, 1250 Longview Dr., Fullerton, Calif. 92631

[21] Appl. No.: 416,919

[22] Filed: Oct. 4, 1989

Related U.S. Application Data

[62] Division of Ser. No. 816,865, Jan. 7, 1986, Pat. No. 4,876,726.

[51] Int. Cl.$^5$ .............................................. G06K 9/00
[52] U.S. Cl. ......................................... 382/4; 382/18; 382/21; 382/50; 382/54
[58] Field of Search ....................... 382/18, 54, 50, 21, 382/4, 22

[56] References Cited

U.S. PATENT DOCUMENTS

| | | | |
|---|---|---|---|
| 3,426,325 | 2/1969 | Partin et al. | 382/18 |
| 3,624,606 | 11/1971 | Lefevre | 382/18 |
| 4,747,152 | 5/1988 | Knutsson et al. | 382/21 |
| 4,813,078 | 3/1989 | Fujiwara et al. | 382/21 |

*Primary Examiner*—Leo H. Boudreau

[57] ABSTRACT

The present invention relates to contextual enhancement of data comprising a matrix of data elements wherein each matrix data location has contained therein data representative of certain characteristics, for example, in the case of image data, the intensity of the image within a range of intensities, or the direction of image contour flow lines at each particular data element within the matrix. A preferred embodiment of the invention described in the present application relates to the field of the enhancement of image data obtained from the scanning of a fingerprint image by a digital black and white camera. This results in a matrix of data elements each of which data elements in the matrix contains data representative of the intensity of the image at the particular matrix point, from a 0 black value to a maximum intensity white value. The variations in intensity therebetween are represented by shades of gray between black and white.

19 Claims, 39 Drawing Sheets

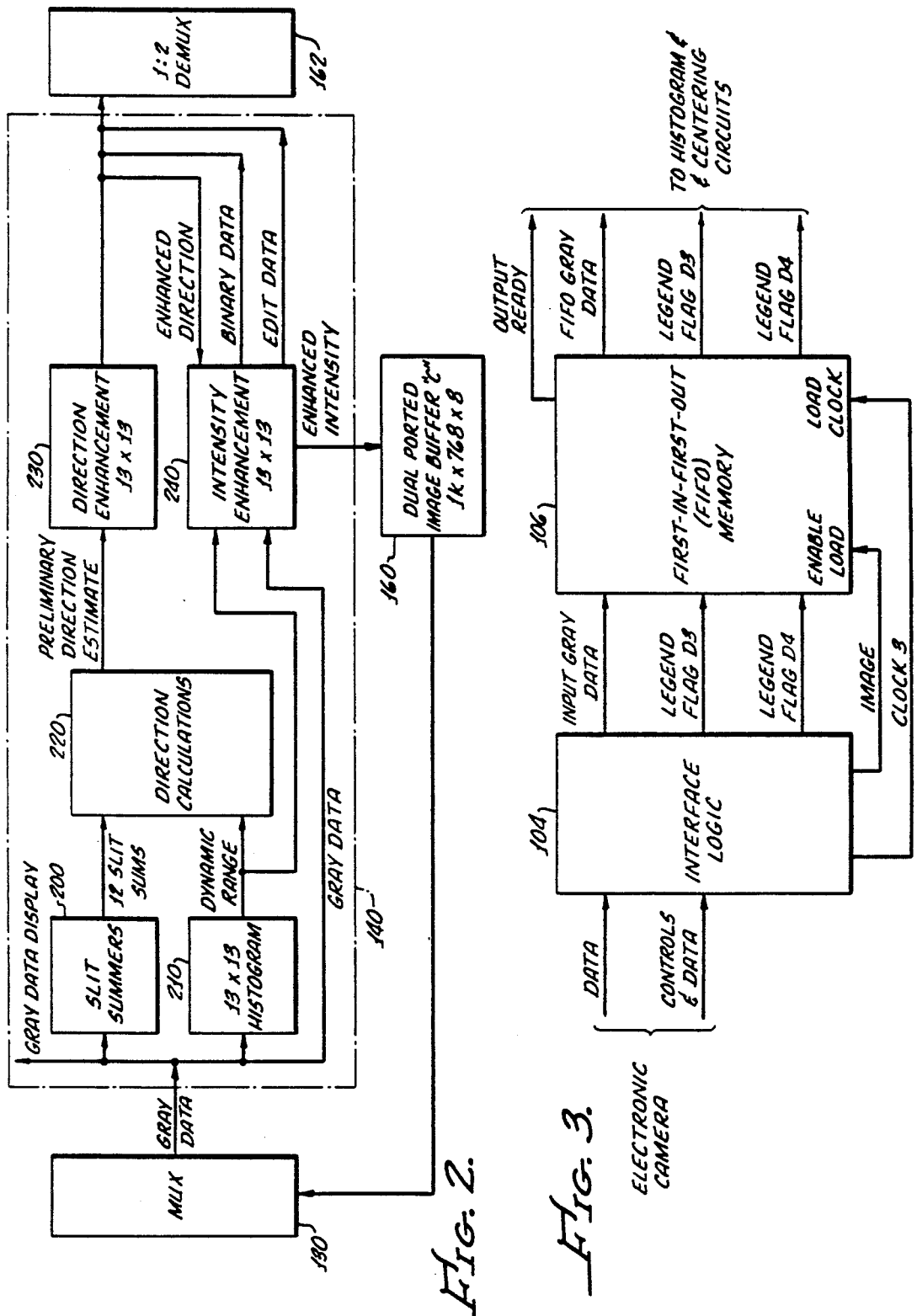

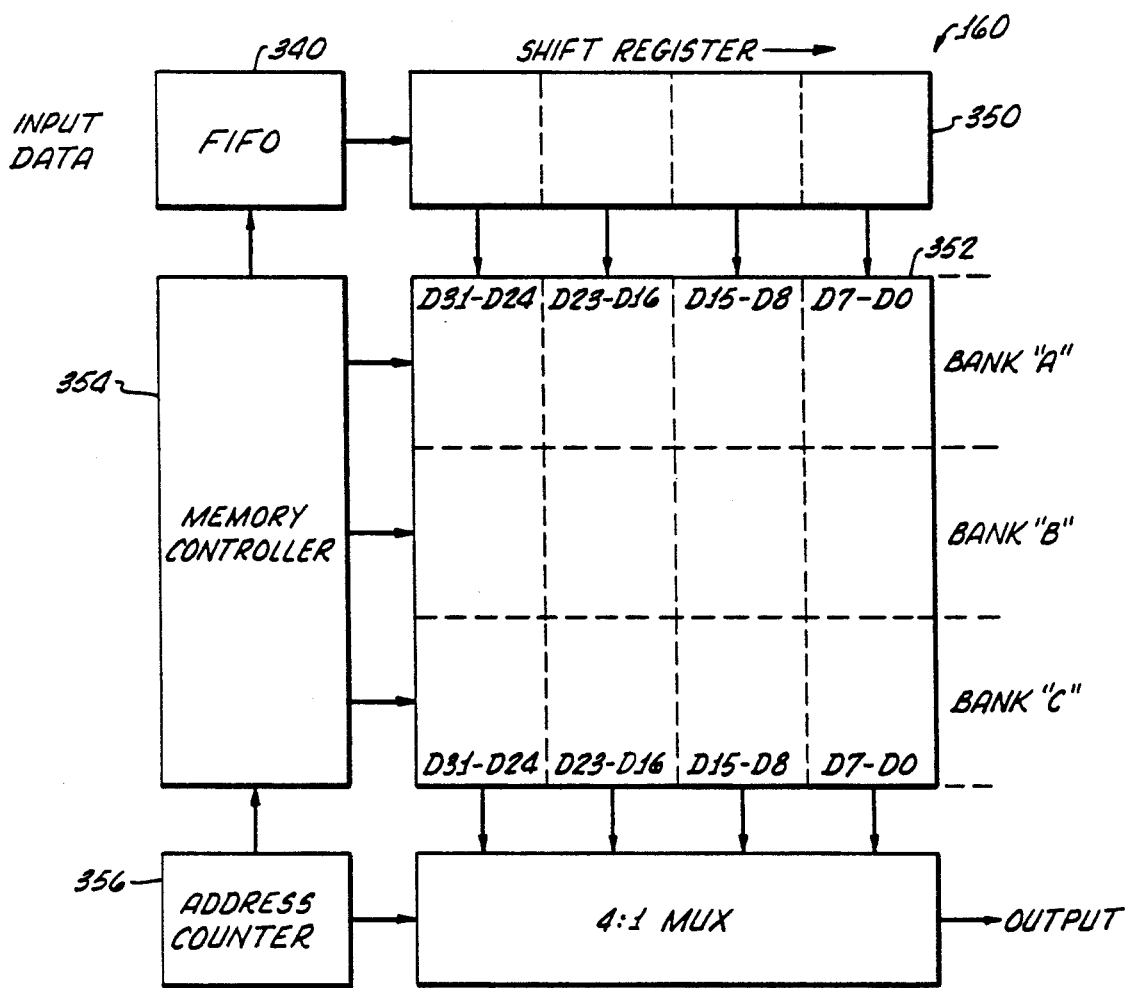
_Fig. 11._
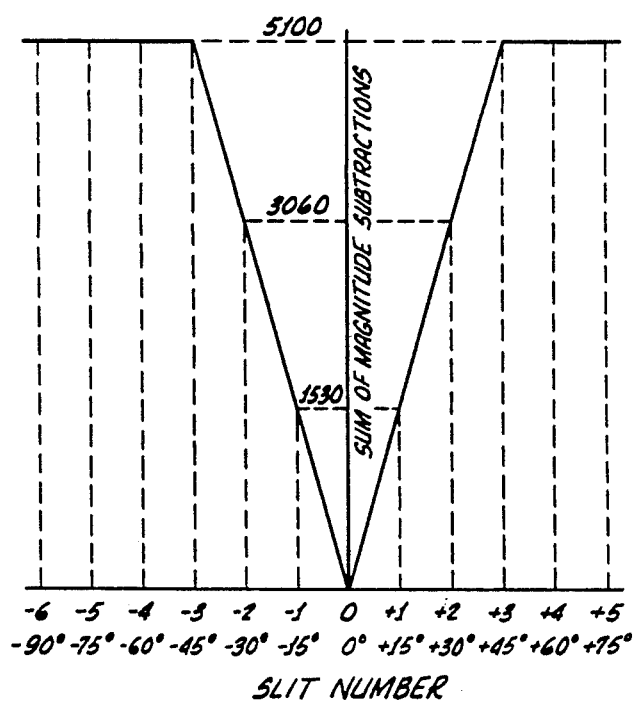
_Fig. 14._

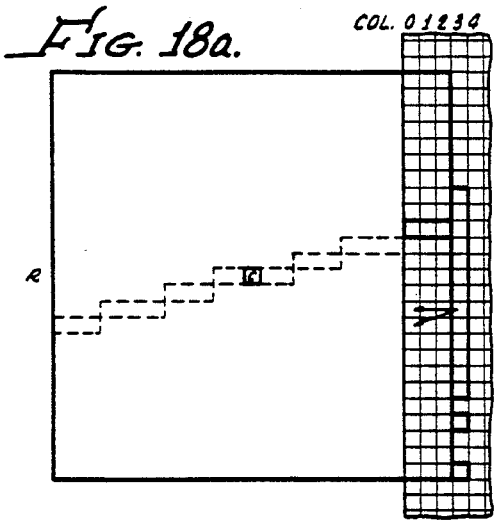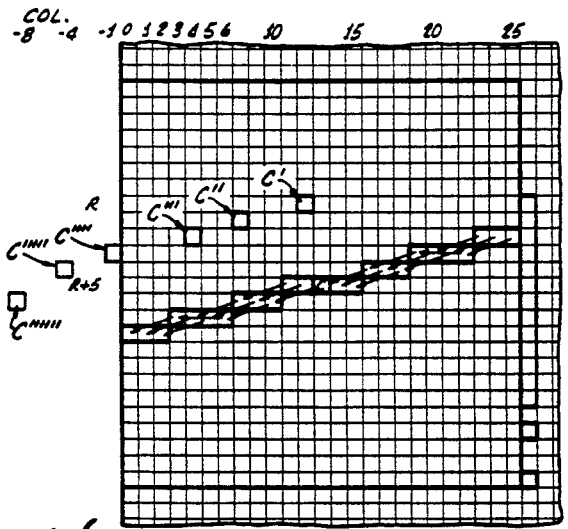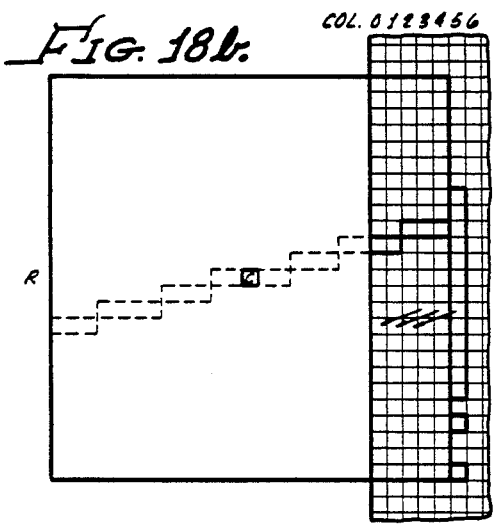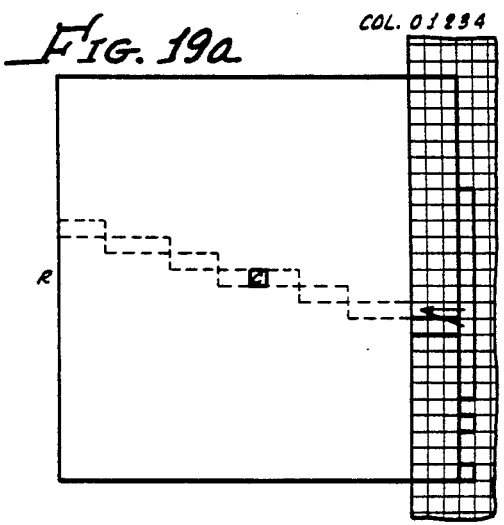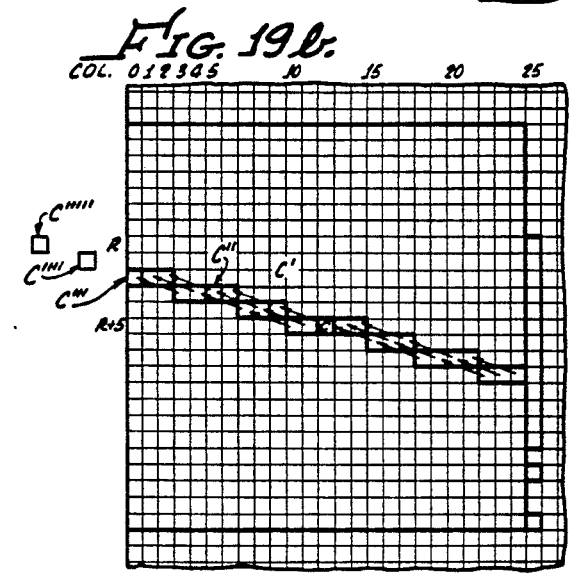

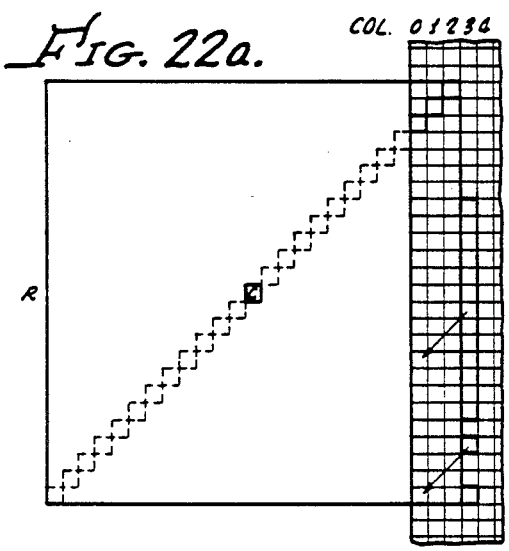
Fig. 22a.  COL. 01234
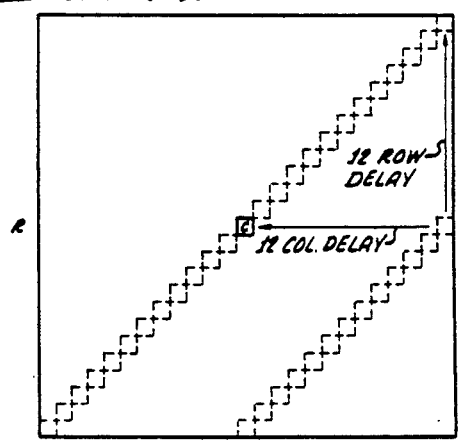
Fig. 22d.
12 ROW DELAY
12 COL. DELAY
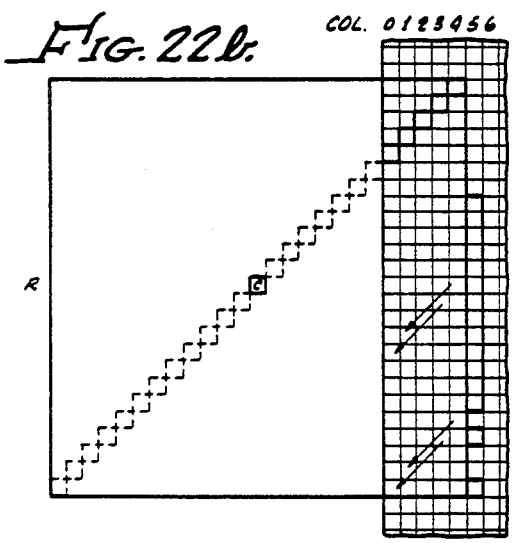
Fig. 22b.  COL. 0123456
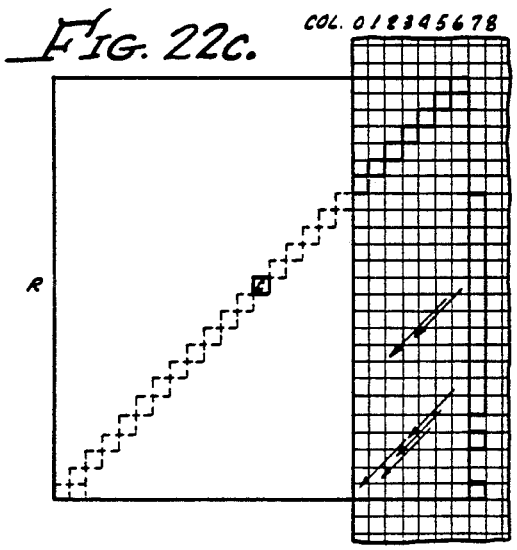
Fig. 22c.  COL. 012345678

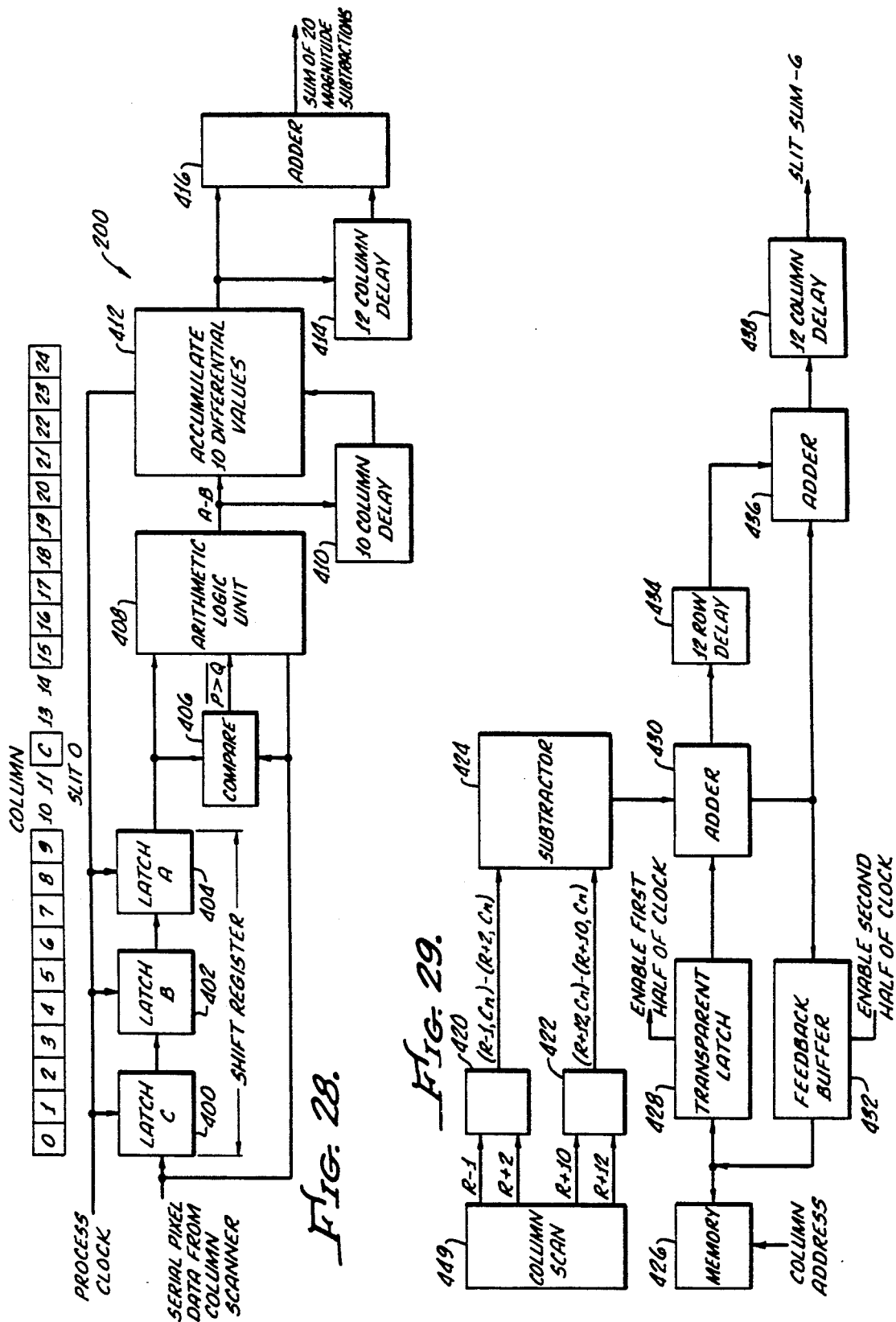

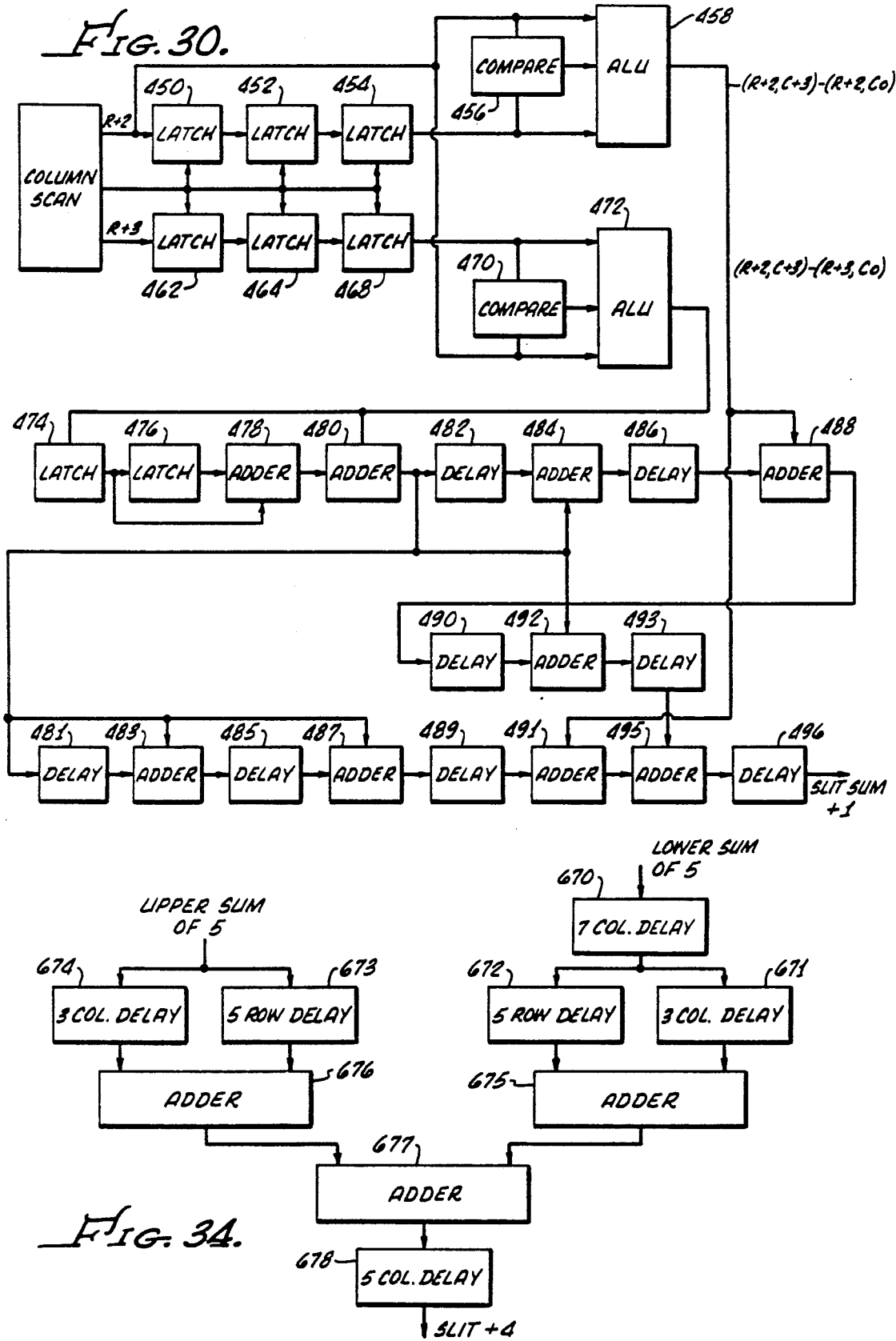

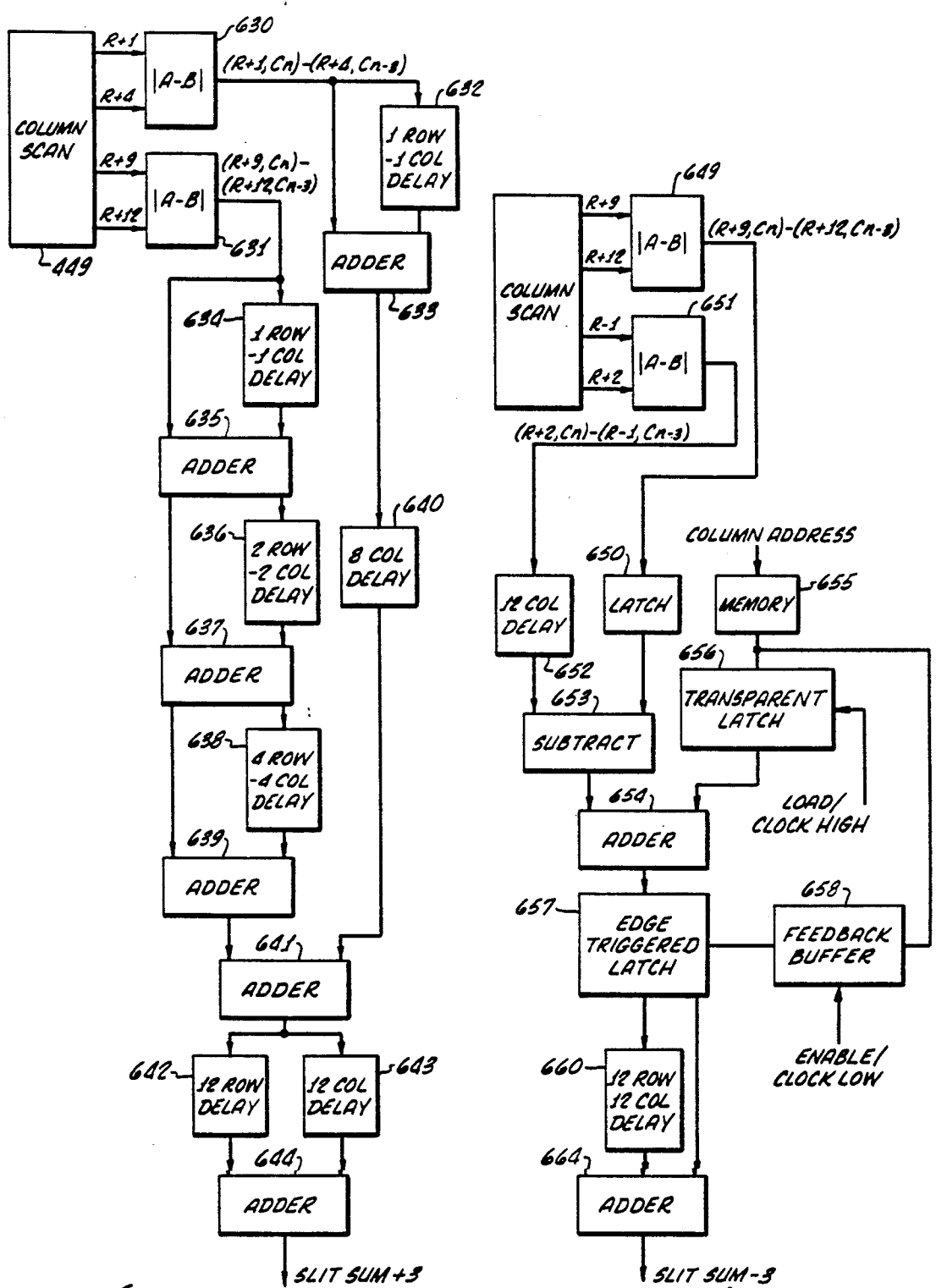

FIG. 44.

| STATE OF PROM ADDRESS BIT A12 | PROM OUTPUT BIT NO. | FROM ADDRESS BITS (A0–A11) | INDEX OF MINSUM | D2 | D1 | D0 |
|---|---|---|---|---|---|---|
| 0 | D0 | | 0 | 0 | 0 | 0 |
| 0 | D1 | | +1 | 0 | 0 | 1 |
| 0 | D2 | | +2 | 0 | 1 | 0 |
| 0 | D3 | | +3 | 0 | 1 | 1 |
| 0 | D4 | | +4 | 1 | 0 | 0 |
| 0 | D5 | | +5 | 1 | 0 | 1 |
| 0 | D6 | DEFAULT CASE SET OUTPUT BIT = 1 FOR ALL POSSIBLE STATES OF A0 THROUGH A11 | X | | | |
| 0 | D7 | | X | | | |
| 1 | D0 | | X | | | |
| 1 | D1 | | X | | | |
| 1 | D2 | | −6 | 0 | 1 | 0 |
| 1 | D3 | | −5 | 0 | 1 | 1 |
| 1 | D4 | | −4 | 1 | 0 | 0 |
| 1 | D5 | | −3 | 1 | 0 | 1 |
| 1 | D6 | | −2 | 1 | 1 | 0 |
| 1 | D7 | | −1 | 1 | 1 | 1 |

FIG. 45.

|    | 0  | 1  | 2  | 3  | 4  | 5       | 6            | 7           | 8  | 9  | 10 | 11 | 12 |
|----|----|----|----|----|----|---------|--------------|-------------|----|----|----|----|----|
| 0  | −3 |    | −4 |    | −5 |         | −6           |             | +5 |    | +4 |    | +3 |
| 1  |    | −3 |    | −4 |    | −5      |              | −6          | +5 |    | +4 |    | +3 |
| 2  | −2 |    | −3 |    | −4 | −5      | −6           | +5          | +4 |    | +3 |    | +2 |
| 3  |    | −2 |    | −3 | −4 | −5      | −6           | +5          | +4 | +3 |    | +2 |    |
| 4  | −1 |    | −2 | −2 | −3 | −4      | ±5 −6        | +4          | +3 | +2 | +2 |    | +1 |
| 5  |    | −1 | −1 | −1 | −2 | −4 −3 −2 | ±5 −6     | +4 +3 +2    | +2 | +1 | +1 | +1 |    |
| 6  | 0  | 0  | 0  | 0  | ±1 0 | ±1 0  | C            | ±1 0        | ±1 0 | 0 | 0  | 0  | 0  |
| 7  |    | +1 | +1 | +1 | +2 | +4 +3 +2 | ±5 −6     | −4 −3 −2    | −2 | −1 | −1 | −1 |    |
| 8  | +1 |    | +2 | +2 | +3 | +4      | ±5 −6        | −4          | −3 | −2 | −2 |    | −1 |
| 9  |    | +2 |    | +3 | +4 | +5      | −6           | −5          | −4 | −3 |    | −2 |    |
| 10 | +2 |    | +3 |    | +4 | +5      | −6           | −5          | −4 |    | −3 |    | −2 |
| 11 |    | +3 |    | +4 |    | +5      | −6           | −5          |    | −4 |    | −3 |    |
| 12 | +3 |    | +4 |    | +5 |         | −6           |             | −5 |    | −4 |    | −3 |

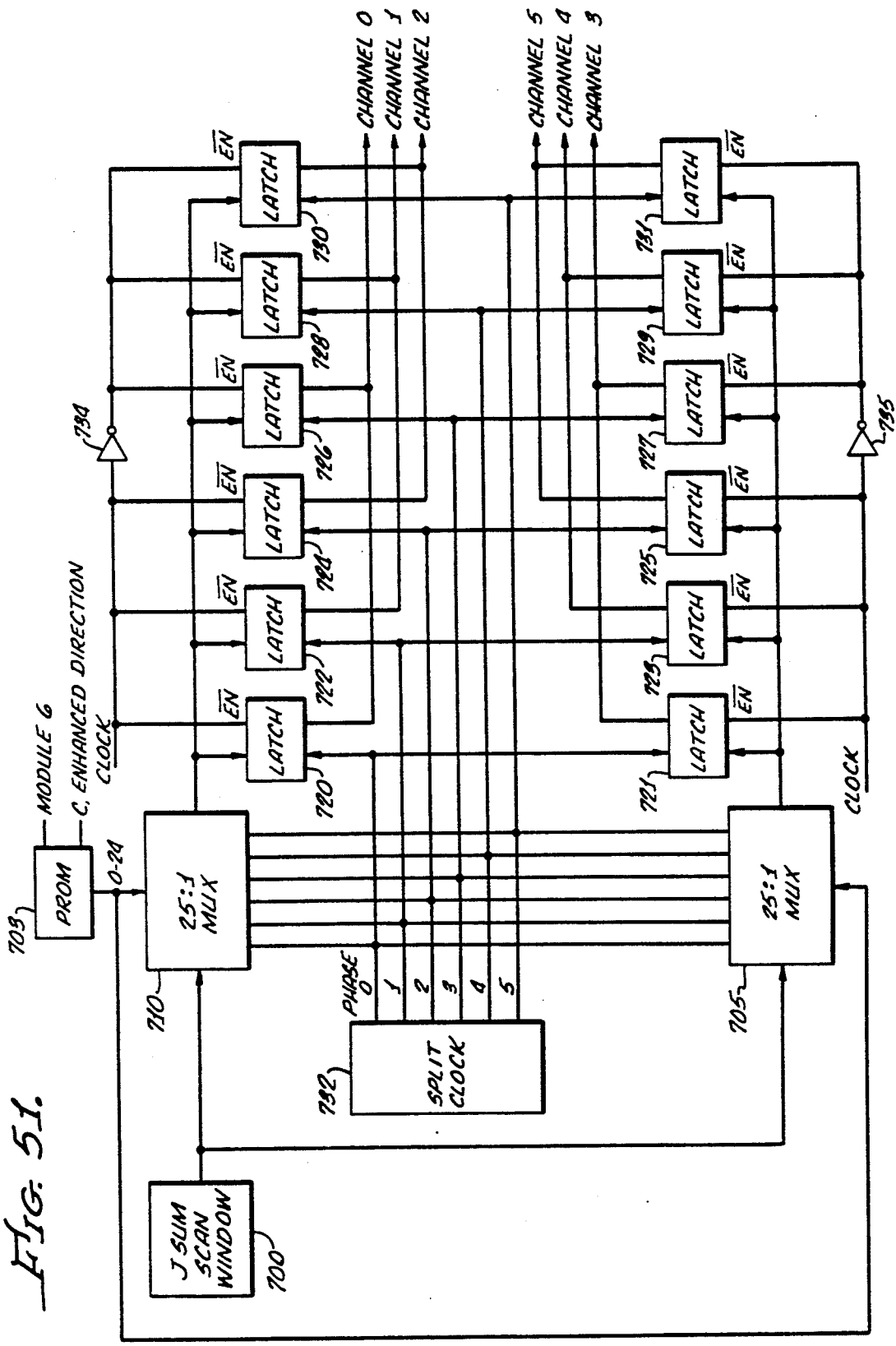

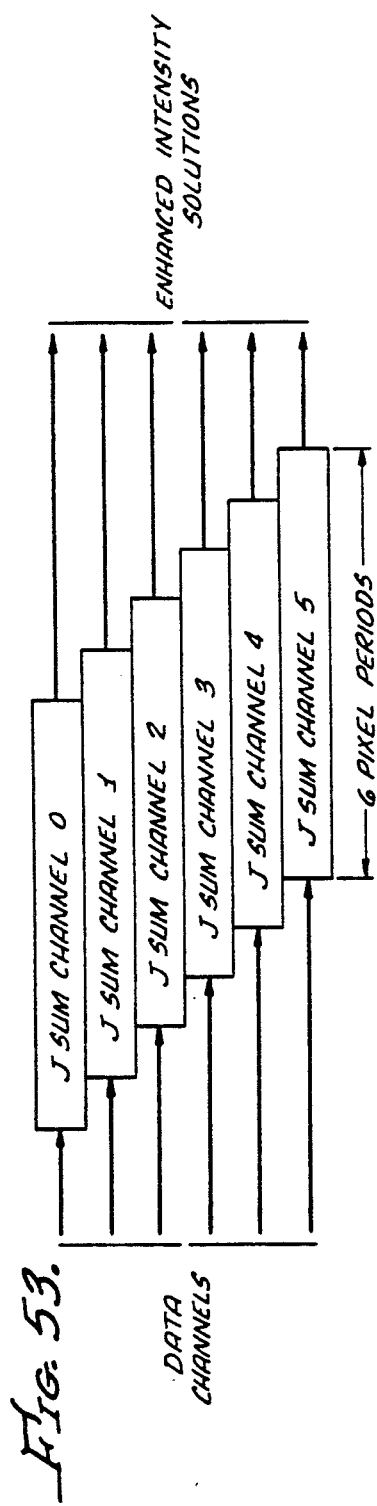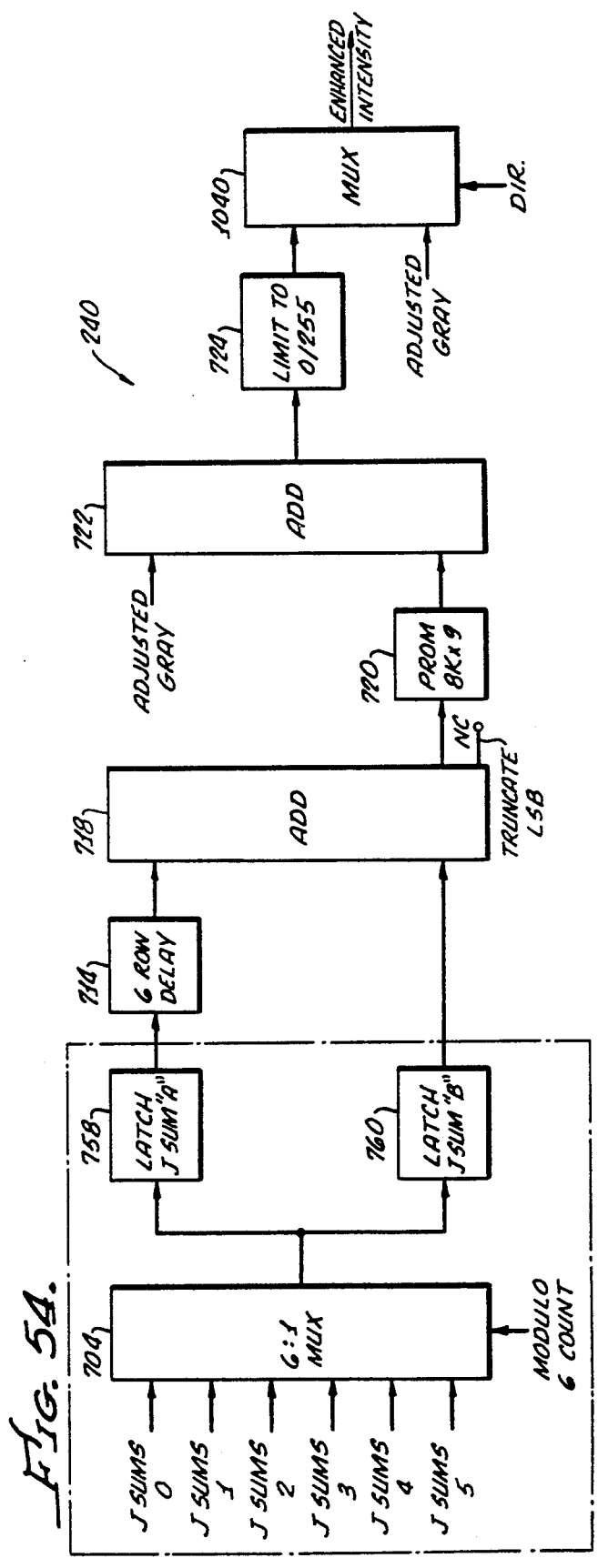

METHOD AND APPARATUS FOR CONTEXTUAL DATA ENHANCEMENT

This is a division of application Ser. No. 816,865, filed Jan. 7, 1986; for A Method and Apparatus for Contextual Data Enhancement, now U.S. Pat. No. 4,876,726.

FIELD OF THE INVENTION

The present invention relates to contextual enhancement of data comprising a matrix of data elements wherein each matrix data location has contained therein data representative of certain characteristics, for example, in the case of image data, the intensity of the image within a range of intensities, or the direction of image contour flow lines at each particular data element within the matrix. A preferred embodiment of the invention described in the present application relates to the field of the enhancement of image data obtained from the scanning of a fingerprint image by a digital black and white camera. This results in a matrix of data elements each of which data elements in the matrix contains data representative of the intensity of the image at the particular matrix point, from a 0 black value to a maximum intensity white value. The variations in intensity therebetween are represented by shades of gray between black and white.

BACKGROUND AND SUMMARY OF THE INVENTION

The present invention has particular applicability with respect to the enhancement of image data obtained from the scanning of a fingerprint. The data enhancement according to the present invention comprises a first step in an apparatus and method for (1) the further refining of data defining an image, for example, a fingerprint, (2) the classification of the refined image, and (3) the matching of the particular image to data in a data bank containing data representative of features of an image, for example, a fingerprint image, according to the presence and location of certain types of identifying characteristics, e.g., fingerprint minutia found in the refined image.

It is known in the art to process fingerprint image data in order to refine the fingerprint image, classify the refined image and match the minutia found in the refined image to a data bank containing minutia data. The present invention relates to an improved method and apparatus for enhancing the image data prior to the steps of refinement, classification and identification. The invention may also be useful for enhancing images in arts other than the classification and identification of fingerprints. The enhanced data output may also be utilized with data which is not representative of an image per se. However, for purposes of illustration the method and apparatus of the present invention will be described in terms of enhancement of fingerprint image data prior to further processing of the enhanced data.

The art of fingerprint classification and identification has utilized an input image in the form of a matrix of data elements in the form of pixels derived from the scanning of a fingerprint image with a digital camera to form a digitized binary image consisting of a matrix of pixels having a value of either 1 or 0, representing, respectively, white or black. The art has processed this binary image with a technique known as thin fill and a technique known as angflow in order to classify the fingerprint according to type and to locate and define minutia within the fingerprint image as is shown by the U.S. Pat. Nos. 4,003,024, 4,083,035, 4,151,512, 4,156,230 and 4,225,850 assigned to the assignee of the present invention, the disclosures of which are hereby incorporated by reference.

In the past, the binary image data has been generated by comparing the data in the individual image pixels within the matrix to a mean value of the possible intensities and assigning a 0 if the intensity is below that mean and a 1 if the intensity is above that mean. For various reasons, the image may be of poor quality or may be of poor quality in certain locations. For example, in a fingerprint there are instances where the fingerprint may be only partially retrievable or the fingerprint may be partially smudged. The digitizing of the image intensity data as performed in the prior art, has a number of drawbacks when the image is of poor quality as a whole or in certain parts. The errors induced into the binary image as a result of, in effect, making a guess as to the high intensity or low intensity nature of the image data at a given image pixel carry forward through the remainder of the refinement, classification and identification processes known in the art. This may result in the inability to properly classify or properly to identify the image, e.g., the fingerprint, even where a matching print in fact is within the data storage memory of the fingerprint identification system.

The present invention seeks to improve the apparatus and method used in deriving binary image and direction data for each data element from the camera input image intensity for each image pixel obtained from an image source, e.g., a digital camera. Aspects of processing of the data in accordance with certain parts of the invention may be implemented on a microprocessor or minicomputer suitably programmed to perform the various logic and arithmetic functions explained below. However, such implementation of the present invention would require a great deal of computing power and time. Therefore, the applicants have incorporated into the apparatus and method of the present invention specifically dedicated hardware circuits which improve by several thousand times the speed with which the data enhancement process could be performed on, for example, a programmed minicomputer or microprocessor.

One invention described herein encompasses the various algorithms for contextual enhancement of image data as implemented in either software or hardware. Software implementation enables, in comparison to the prior art, a much more accurate and precise computer matching of a blurred, poorly defined print with a file print. Thus, with the use of such software, programmed to carry out the logic operations disclosed herein, a very poor grade fingerprint, being blurred, smudged or otherwise lacking in good definition of various portions, may be processed to provide a much clearer, well defined print that can be readily matched to a file print. Although such software implementation will provide significant enhancement of the poor print, it does require a large amount of time to enhance the fingerprint image in order to generate the fingerprint minutia data used for each print comparison, and thus suffers severe disadvantages in commercial application.

Described herein, and illustrated in the drawings, is a hardware invention comprising new and improved apparatus and methods for carrying out contextual image enhancement with vastly increased speed of operation and very high-quality results. This hardware according to the present invention, constitutes a major improvement over the software and enables the apparatus to develop minutia data for a fingerprint image in approximately 900 milliseconds, whereas the software implementation may require approximately 35 minutes to develop such minutia data for each print.

Other examples of images which may be enhanced according to the present invention are, for example, digitized photographic data taken under conditions of very low light or at great distance, or under conditions of high shadow in certain areas of the photograph. In addition, image data, e.g., representing features defined and extracted by optical character readers, and many types of contour patterns, including those developed in conjunction with geographical and geological mapping, structure analysis and wave analysis, may be enhanced according to the principles of the present invention. Similarly, data, e.g., relating to speech or other sound patterns may be enhanced according to the present principles of the invention.

Recognizing the need for an improved data enhancer useful in enhancing image data and the like, a general object of the present invention is to provide an apparatus and method for producing an improved enhancement of the data contained in a data array of a matrix of data elements, and, more specifically, in the preferred embodiment as described, a data array consisting of a matrix of pixels containing image intensity data.

Before highlighting some of the features of the apparatus and method of the present invention, it will be helpful to outline the entire apparatus and method. The apparatus which mechanizes the method of the present invention is set up to analyze data in three basic scan windows which are clocked through a matrix array of data elements each containing either intensity data, direction data or both. The first window and its associated circuitry serve to estimate data element directions by analyzing the intensity data in selected direction slits in the window to establish the slit having the least summed contrast between data elements spaced apart in the slit by a selected number of data elements, or to establish that there does not clearly exist such a slit. The second window passes through the matrix such that its data elements have already been passed through the preliminary direction estimate window and have a preliminary direction estimate of one of the slit directions or "no direction." This second window and its associated circuitry enhance the direction estimates (made during passage of the first window) according to various logic tests which generally seek to identify a slit direction which, along with the directions adjacent to it, are the directions of the predominate number of data elements in the window, or which is the average the two slit directions which comprise the largest and second largest number of data elements, if they are sufficiently close in direction. The final window examines data elements having enhanced directions and with its associated circuitry, enhances the intensity data of a center data element in the third window, provided the center data element has an enhanced direction other than "no direction," according to an analysis of the center data element and the neighboring slit data elements in the slit with the direction of the enhanced direction of the center data element. The center data element and the neighboring slit data elements are compared with each other for direction data and intensity data and are compared with a mean intensity value for the scan window to derive a correction value for the center data element intensity to arrive at an enhanced intensity value. Separate logic is used to enhance the center data element intensity when it has a direction of "no direction."

A feature of the present invention is an improved method of enhancement of data contained a data element within the matrix of the data element array through the analysis of data contained in surrounding data elements comprising a window of data elements positioned within the matrix of the data element array.

Another feature of the present invention is the stepping of the window through the data array in a stepwise fashion, column by column and row by row to sequentially enhance the data contained in a center data element of the window.

Yet another feature of the present invention is to sequentially employ several such windows, each being in registration with the other such that the output of an enhancing step performed in one window is serially input into the next succeeding window as such output is available for a center data element in the preceding window, in order to further perform steps to enhance the data in a center data element in the succeeding window.

Still another feature of the present invention is to enhance the data in a central data element within a particular window by operations performed on the data contained within the window which are independent of the actual location of the data elements within the window, e.g., a compilation of the distribution of data throughout the window or, e.g., the mean of the particular data throughout the window. This feature includes updating the results of these operations for the purpose of enhancing the data in a center data element of a next succeeding position of the window by a two axis window update. This involves storing the change necessary to update the compilation of the data within the data elements of the window from a prior first window location to a prior succeeding window location, and updating the necessary change for moving the center data element from a present first window location to the present succeeding window location, by examining the changes resulting from data elements disposed at generally the corners of the present first window location and adding these changes to the change which was necessary between the prior first window location and succeeding window location. These data elements are selected to constitute the difference between the previous update of the compilation of data elements in the window and the present update of the compilation of the data elements in the window.

It is still another feature of the present invention to provide circuitry for the parallel evaluation of the relationship of a plurality of different selected data elements within the window as it passes through the matrix, simultaneously for each particular location of a window within the data array.

Yet a further feature of the present invention is to first assign a preliminary direction estimate for each data element within the array based upon the contrast of intensity values in selected spaced apart data elements defining selected directions within a window, and second to enhance the direction estimate based upon the distribution of preliminary direction estimates within a window, and third to enhance the intensity data of a center data element, having been assigned an enhanced direction, based upon the comparison of the direction data contained in selected data elements defining a slit within a window. The slit selected is the one aligned with the enhanced direction assigned the center data element. Another factor employed in the intensity enhancement step is the variance of the intensity data in each such selected data element from the mean intensity of all data elements within the window. Yet another factor employed is the variance of the direction of each such data element in the slit from the direction assigned the center data element.

Yet a still further feature of the present invention is to assign a preliminary direction estimate to each center data element for each position of a first scan window by defining within the window a plurality of selected data elements comprising slits, respectively aligned as closely as practicable to each of a set of line directions generally equally separated within the window and passing through the center data element. A slit sum is generated for each slit comprised of the accumulated sum of the differences of the intensity data values for pairs of spaced apart data elements in the slit, separated by a selected number of data elements. A determination is then made of which of the slit sums is the lowest and the dynamic range of all data intensity values for the window. A preliminary direction estimate of the direction of the slit having the lowest slit sum is assigned the center data element. This is done unless the dynamic range is below a selected threshold, or too many of the slit sums of the closely aligned slits or any of the slit sums of the unaligned slits fail to exceed the lowest slit sum by some percentage of the lowest slit sum, in which event a direction of "no direction" is assigned. The closely aligned slits have directions within a selected number of degrees of the slit having the lowest slit sum, and the unaligned slits do not.

Again another feature of the present invention is to enhance the direction data for a center data element within a second scan window, regardless of whether the center data element has a direction or "no direction" as a preliminary direction estimate, by generating a histogram of a number of data elements within the window having each of the possible slit directions, including "no direction," and selecting an enhanced direction based upon the occurrence of a sufficient number of data elements with closely aligned directions. The direction of the histogram bin with the highest number count of data elements, which have the same slit direction, is selected as the enhanced direction if the sum of this bin and the bins containing the count of the number of data elements with adjacent slit directions exceeds a threshold number. The bin from the histogram with the second highest number count of data elements, which have the same direction, is selected if the first condition is not met and the sum of the second highest bin number and the number contained in the bins designated by slit directions adjacent to the direction of the second high bin number exceeds the threshold. If no enhanced direction has been assigned by the preceding steps, the direction of the high bin number is selected if the sum of the high bin number and its adjacent bins exceeds a second threshold and the sum of the high bin number and its adjacent bins plus the number in the "no direction" bin exceeds a third threshold. If the preceding tests are not met the direction of the second high bin number is selected if the sum of the number count in the second high bin and its adjacent direction bins exceeds the second threshold and the count in the second high bin, and its adjacent bins, plus the number in the "no direction" bin, exceeds the third threshold. If the preceding tests have not been met, the average of the direction of the high bin and the second high bin is selected if the sum of the numbers in those bins exceeds a fourth threshold or the sum of the high bin and second high bin numbers exceed the fifth threshold, and the sum of the high bin and second high bin plus the number count in the "no direction" bin, exceeds the third threshold. The directions associated with the respective first and second high bins also must not be separated from each other by more than a selected number of degrees. If the above-noted tests are not met, the enhanced direction assigned is "no direction."

Again yet a further feature of the present invention is the enhancement of the intensity data in a data element by comparing that data element with a third scan window containing enhanced direction data and intensity data. If the center data element in the window has an assigned direction other than "no direction," then the mean intensity within the scan window is compared to the dynamic range within the window. If the mean intensity is equal to or greater than a selected percentage of the dynamic range, then the mean intensity is adjusted by the addition of a constant value. If, instead, the mean intensity is equal to or less than a smaller percentage of the dynamic range, then the mean value is adjusted by the subtraction of a fixed constant.

A further feature of the present invention is the enhancement of the intensity data in a data element by comparing the center data element of the scan window with the data contained in each of a plurality of neighboring data elements defining a slit aligned with the slit direction of the center data element.

If the local dynamic range, i.e., the dynamic range of the data elements within the intensity enhancement scan window, is large and the intensity of the center data element is nearly equal to the adjusted local mean, i.e., the mean of the intensity values of the data elements within the intensity enhancement scan window, incremented or decremented by a constant adjustment factor, then the intensity of the center data element is set equal to the adjusted local mean. Provided the respective neighboring slit data elements have other than "no direction" assigned, the intensity of each such neighboring slit data element is compared with the adjusted mean intensity for the data elements in the third window. If the dynamic range is large and the difference between the adjusted mean intensity and the intensity of a neighboring slit data element is small, then the neighboring slit data element is ignored in the enhancement calculations. If not, then an intensity enhancement value contribution is computed for each such neighboring slit data element. The value of each contribution is proportional to the difference between the intensity of each such neighboring data element and the adjusted mean intensity. Each intensity enhancement value contribution has a signed multiplication factor to decrease the intensity of the center data element when the intensity of the neighboring data element is less than the adjusted mean and to increase the intensity of the center data element when the intensity of the neighboring data element exceeds the adjusted mean, for each neighboring slit data element in which the difference in direction between the neighboring slit data element and the center data element is less than a selected number of degrees. The intensity enhancement value has a signed multiplication factor to increase the intensity of the center data element when the intensity of the neighboring data element in the slit is less than the adjusted mean and to decrease the intensity of the center data element when the intensity of the neighboring slit data element exceeds the adjusted mean, for each neighboring data element with a direction differing from the center data element by more than the selected number of degrees. The sum of these intensity enhancement value contributions is divided by a constant and this result is added to the center data element intensity to become the enhanced intensity for this data element.

If the center data element in the scan window has "no direction," then the intensity enhancement is based on local statistical data. If the intensity of the center data element is greater than the local mean and the local dynamic range is small, then the enhanced intensity for the center data element is set equal to its original intensity value plus a constant.

If the intensity of the center data element is greater than the local mean, and the local dynamic range is large, and the intensity of the center data element is less than the average of the local mean and the upper limit of the local dynamic range (usually the 90 percentile intensity value), then the enhanced intensity is set equal to the average of the local mean and upper limit of the dynamic range. If the intensity of the center data element is greater than the local mean, and the local dynamic range is large and the intensity of the center data element is equal to or greater than the average of the local mean and the upper limit of the dynamic range, then the enhanced intensity for the center data element is set equal to the average of its original intensity and the upper limit of the dynamic range.

If the intensity of the center data element is less than the local mean and the dynamic range is small, the enhanced intensity for the center data element is set equal to its original intensity minus a constant.

If the intensity of the center data element is less than the local mean, and the dynamic range is large, and the intensity of the center data element is greater than the average of the local mean and the lower limit of the local dynamic range (usually the 10 percentile intensity value), then the enhanced intensity value for the center data element is set equal to the average of the local mean and the lower limit of the local dynamic range.

If the intensity of the center data element is less than the local mean, and the dynamic range is large, and if the intensity of the center data element is equal to or less than the average of the local mean and the lower limit of the local dynamic range, then the enhanced intensity for the center data element is set equal to the average of its original value and the lower limit of the local dynamic range.

The foregoing features are not intended to be exhaustive, but rather are intended to illustrate the advantages of the present invention over the prior art and to enable one skilled in the art to better understand the present invention and the contribution to the art. These and other advantages and features of the present invention will be better understood by reference to the detailed description of a preferred embodiment set forth below in conjunction with the drawing, in the figures of which like reference numerals have been used to identify like elements.

BRIEF DESCRIPTION OF THE DRAWINGS

FIG. 2 shows a schematic block diagram of a contextual enhancement processing filter employed in a data enhancement system according to the present invention;

FIG. 3 shows an interface between an electronic camera and the input to the data enhancement system according to the present invention;

FIG. 11 shows a block diagram of an image buffer as shown in FIG. 2;

FIG. 14 illustrates the result of the slit summing in the idealized case illustrated in FIG. 13, and is exemplary of the use of contrast values, obtained by magnitude substractions between spaced-apart pairs of data elements along the respective slit directions, to assign a direction estimate to a center data element in a scan window;

FIGS. 18a-c illustrate the slit summing for the slit +1;

FIGS. 19a-b illustrate the slit summing for the slit −1;

FIGS. 22a-d illustrate the slit summing for the slit +3;

FIG. 28 shows the slit summing circuitry for slit 0;

FIG. 29 shows the slit summing circuitry for slit −6;

FIG. 30 shows the slit summing circuitry for slit +1;

FIG. 32 shows the slit summing circuitry for slit +3;

FIG. 33 shows the slit summing circuitry for slit −3;

FIG. 34 shows the slit summing circuitry for slit +4;

FIG. 44 shows the preliminary direction estimate PROM contents for the PROM employed in the preliminary direction estimate logic circuitry;

FIG. 45 shows a 13×13 data element scan window employed in the direction enhancement and intensity enhancement sections of the contextual enhancement processor filter according to the present invention, with the data elements designated as members of the slits from +5 to −6, as employed in intensity enhancement;

FIG. 50b shows the derivation of the JSUM scan window shown in FIG. 50a;

FIG. 51 shows the JSUM scan window data element selection circuitry according to the present invention;

FIG. 53 illustrates the parallel JSUM channels according to the present invention;

FIG. 54 shows the enhanced intensity calculation circuitry according to the present invention where the center data element has an enhanced direction other than "no direction";

DETAILED DESCRIPTION OF A PREFERRED EMBODIMENT

1. Fingerprint Classification and Matching System

Figure 1A:
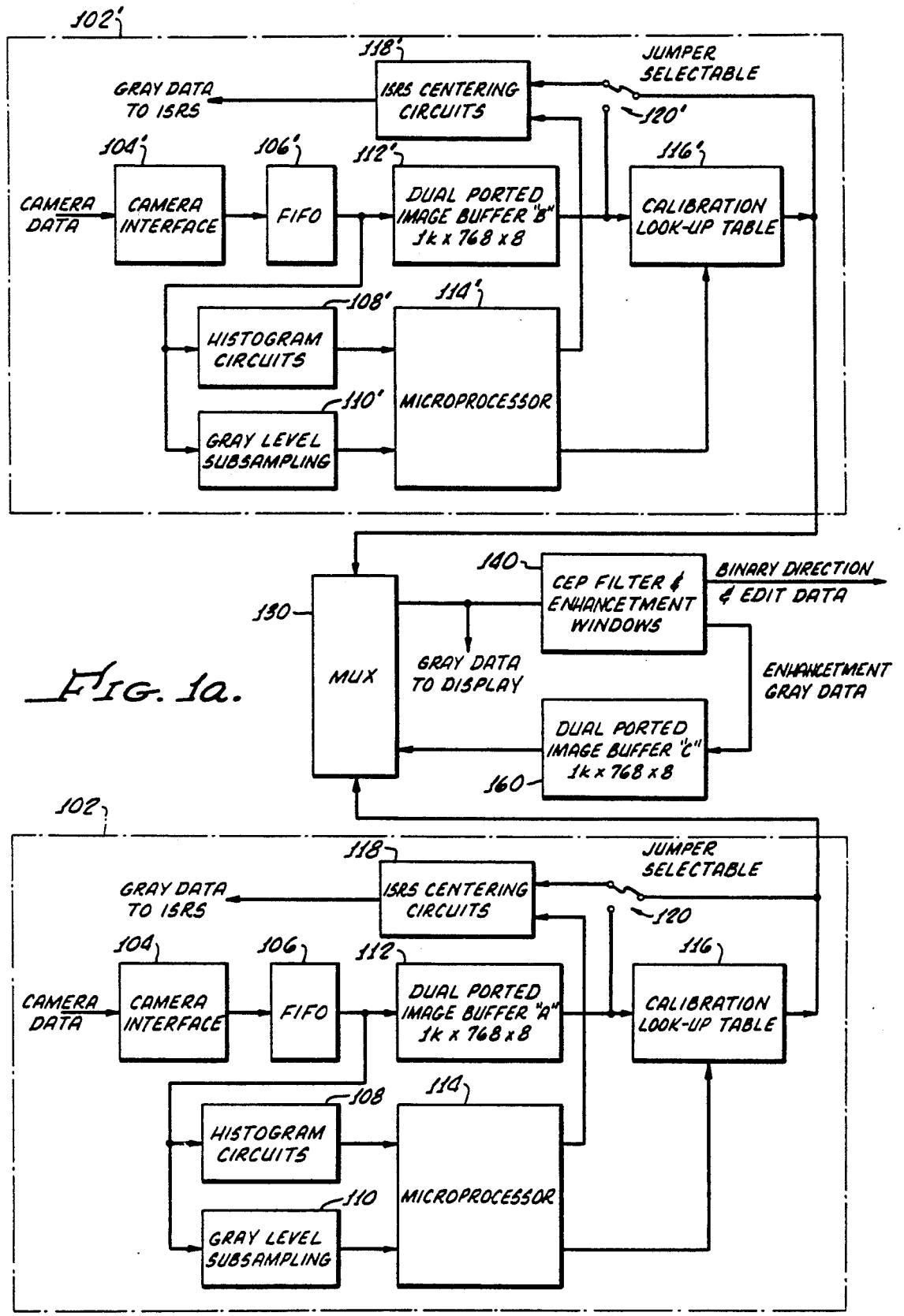
FIGS. 1a and b show a schematic block diagram of a system for classifying and identifying fingerprints which employs the present invention.
Figure 1B:
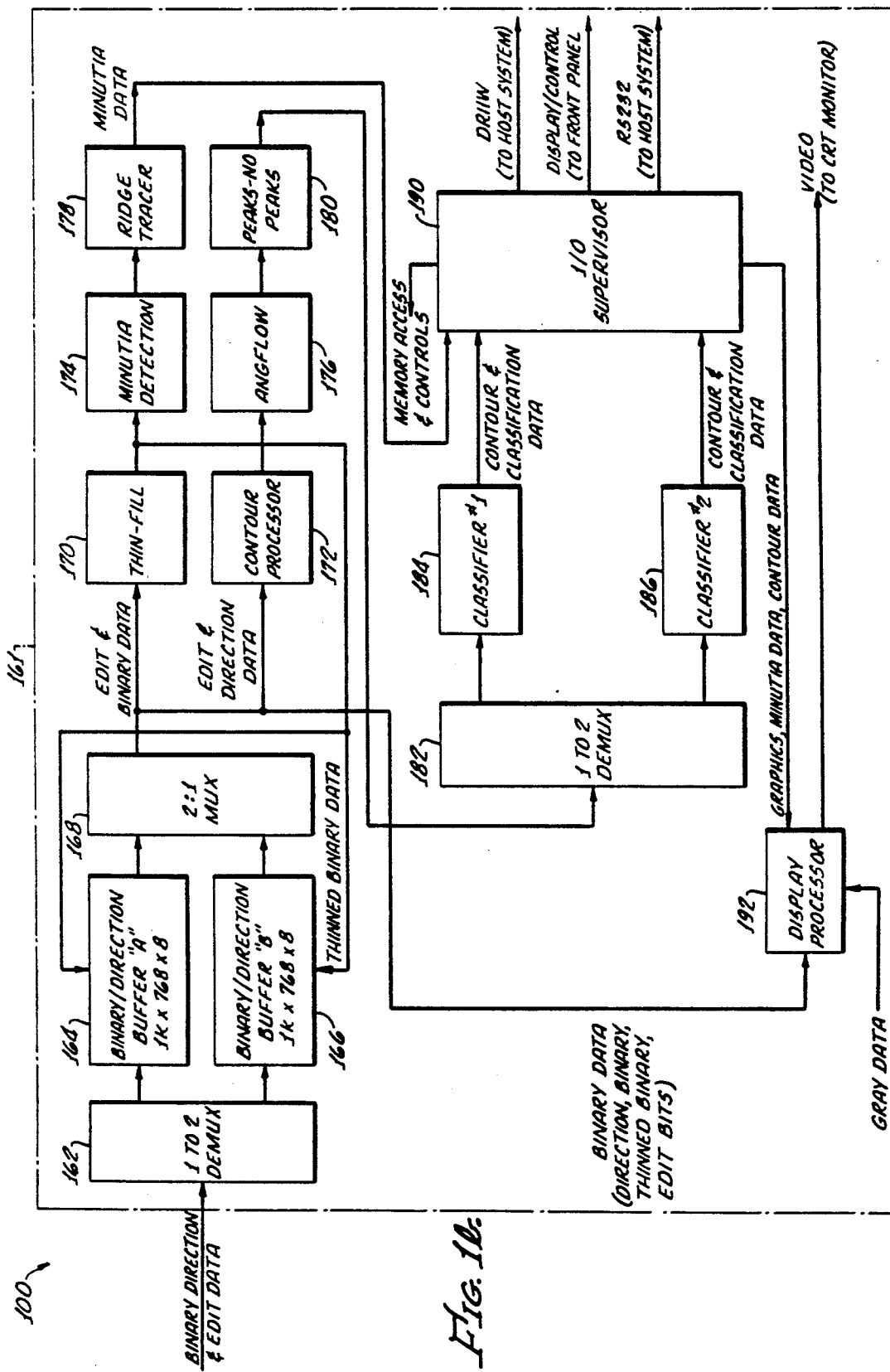

Turning now to FIGS. 1a and b, there is shown a fingerprint classification and matching system 100 according to the present invention, which employs a contextual data enhancement processing filter 140 ("CEP filter") according to the present invention. The system 100 is shown in block diagram form, and as shown is capable of receiving input from two separate digital cameras (not shown) through camera input circuitry 102, 102'. The camera input circuitry 102, 102' is identical and only one 102 will be discussed, with the corresponding primed element numbers shown in FIG. 1a identifying like elements in the second camera input circuit 102'. The input circuit 102 receives digital camera data in the form of intensity values for each of a plurality of rows and columns of image pixel positions as scanned by the camera. This data enters the camera interface circuit 102 in a camera interface 104 and passed serially in 8-bit bytes to a first in-first out memory 106. This data is serially input into a dual ported 1K×768×8 image buffer 112. This data is also the input to histogram circuitry 108 and gray level subsampling circuitry 110, each of which form an input to a microprocessor 114, for the purpose of generating a calibration look-up table 116 and providing input to an image Storage and Retrieval System (ISRS) centering circuits 118, as will be more fully described below. The input camera data received in the camera interface 104 has a possible range of from 0 to 255 discrete levels of intensity.

The calibration look-up table, as will be explained more fully below, converts the pixel intensity data received from the camera to a new intensity value in the range of 0 to 255, based on an integration of the pixels within the entire image above some intensity which constitutes a lower percentile, for example the 5 percentile, of the pixel intensity values received from the camera, and below some intensity, which constitutes a higher percentile, for example the 95 percentile, of the pixel intensity values received from the camera. A jumper 120 allows the centering circuits 118, described more fully below, to receive either the uncalibrated or calibrated pixel intensity values.

The output of the calibration look-up table 116 is a serially transmitted stream of 8-bit bytes, which enters a multiplexer 130. The multiplexer 130 serves to multiplex into the CEP filter 140, the input data from both camera interface circuits 102 and 102', when two cameras are in use. The multiplexer 130 also serves to multiplex the enhanced intensity data from a dual ported image buffer 160, comprising a 1K×768×8 bit memory, which contains the enhanced intensity data obtained from the CEP filter 140, in order to pass the enhanced intensity data through the CEP filter 140 for further enhancement, as will be described more fully below.

The CEP filter 140 also provides binary image data, direction data and edit data to a fingerprint classification and minutia data extraction system 161, the basic features of which are known in the art. The binary image data, direction data and edit data are received from the CEP filter 140 by a 1 to 2 demultiplexer 162 and stored in a respective one of a pair of buffer memories 164 and 166, each dedicated to one of the images received from a respective one of the camera input circuits 102, 102'. The contents of the respective buffer memory 164, 166 are passed through a 2 to 1 multiplexer 168, the output of which supplies two paths of the classification circuitry. The first path includes thin fill circuitry 170, minutia detection circuitry 174 and ridge tracer circuitry 178. This path receives the edit and binary intensity data. The other path includes contour processor circuitry 172, angflow analysis circuitry 176 and peaks-no-peaks analysis circuitry 180. This path receives the edit and enhanced direction data. The output of the peaks-no-peaks analysis circuitry 180 passes through a 1 to 2 demultiplexer 182, the output of which provides the input for a respective one of a classifier 184 and a classifier 186.

The output of the classifier 184 and 186, and the minutia data from ridge tracer circuitry 178, all form inputs to an input-output supervisor 190 which supervises the memory access and controls within the classification and matching circuitry 161. The input-output supervisor 190 also supplies data to the host system via a DRIIW data bus for storage in a central memory (not shown) in order to match minutia data, comprising the output of the circuitry 161, with minutia data stored in the central memory. The input-output supervisor 190 also provides data to a display processor 192, which display processor 192 also receives input intensity data from the multiplexer 130 and binary, direction and edit data from the multiplexer 168, and controls a video monitor (not shown). The I/O supervisor 190 provides an RS232 digital data interface capability to communicate with the host system (not shown). Except for the CEP filter 140, the general features of the system shown in FIGS. 1a and b are known in the art, and except as combined with the CEP filter 140 form no part of the present invention.

2. Overview of the CEP filter

FIG. 2 shows a schematic block diagram of the CEP filter 140 according to a presently preferred embodiment of the present invention. The recalibrated intensity data for each image pixel received by the CEP filter 140 from the multiplexer 130 enters, in parallel, slit summing circuitry 200 and dynamic range histogram circuitry 210. These intensity values also form an input to intensity enhancement circuitry 240, with the dynamic range output of the dynamic range histogram circuitry 210 forming a second input to the intensity enhancement circuitry 240. The slit sums from the slit sum circuitry 200 and the dynamic range from the dynamic range histogram circuitry 210 form inputs into preliminary direction estimate circuitry 220. The output of the preliminary direction estimate circuitry 220, four bits identifying a direction estimate from within a plurality of possible direction estimates or a direction estimate of "no direction," forms the input to a direction enhancement circuitry 230. The enhanced direction output of the direction enhancement circuitry 230 also forms an input to the intensity enhancement circuitry 240. The output of the intensity enhancement circuitry 240 is stored in the enhanced image buffer 160 to be multiplexed by the multiplexer 130 back through the CEP filter 140 for a second and succeeding passes through the CEP filter 140, up to and including 5 passes, or until the data being processed has been sufficiently enhanced. The intensity enhancement circuitry 240 also performs a function of forming a binary image from the final enhanced intensity data and provides the binary data along with edit data to the demultiplexer 162, which passes this data, along with the enhanced direction data from the direction enhancement circuitry 230, to the classification and matching circuitry 161 through the demultiplexer 162.

3. Camera Interface Circuitry

FIG. 3 shows the camera interface logic 104 within the camera interface and calibration circuitry 102 which receives the data from the electronic camera (not shown) and provides control and status signals to the camera for controlling the processing of subsequent images photographed by the camera. A suitable camera is a Model C322 made by Datacopy Corp. of Palo Alto, Calif. The interface logic 104 provides the intensity data for the image pixels as received from the camera, plus legend flags, to the first in-first out memory 106, from which the image pixel intensity data and the legend flags are read into the calibration histogram circuits 108 and the gray level subsampling circuits 110. It also provides control signals and clock signals to the first in-first out memory 106.

The legend flags identify the pixel data in accordance with the following table:

| FLAG LEGENDS | | |
|---|---|---|
| Legend Flag D4 | Legend Flag D3 | Definition |
| 0 | 0 | None of those below |
| 0 | 1 | Row and column subsample (64 × 64 array) |
| 1 | 0 | Last column in each row except last row |
| 1 | 1 | Last row and last column (end of print) |

As the data for each pixel becomes available at the output of the FIFO 106, the output ready line becomes active. When the output ready line is active, a clock pulse is issued which stores the data in image buffer "A" (or "B"), and updates the histogram memory. If legend flag D4 is in the zero logic state while legend flag D3 is set to a logic state of 1, the pixel is thus identified as being part of the 64×64 subsample matrix. In that case, the gray value data is loaded into the gray level subsampling circuits 110.

The 10 and 11 logic states shown in the flag legend table provide identifiers which make it possible to program the microprocessor to verify the number of samples for each row and to determine when the entire image has been received.

Figure 4A:
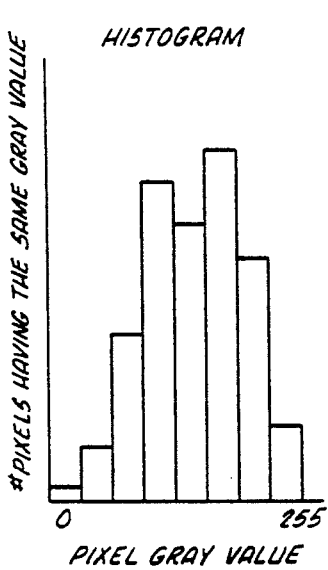
FIGS. 4a, 4b and 4c show the functioning of the interface logic shown in FIG. 3, with FIG. 4a showing an example of a histogram giving the number of pixels within the camera image having the same intensity value, FIG. 4b showing a histogram representing an integration of the histogram of FIG. 4a, with the histogram of FIG. 4b representing the number of pixels having less than or equal to each of the possible intensity values in the image, and FIG. 4c showing a recalibration histogram based upon the pixels above the 5 percentile value and below the 95 percentile value, used as a look-up table to recalibrate the camera output for use in the present invention.
Figure 4B:
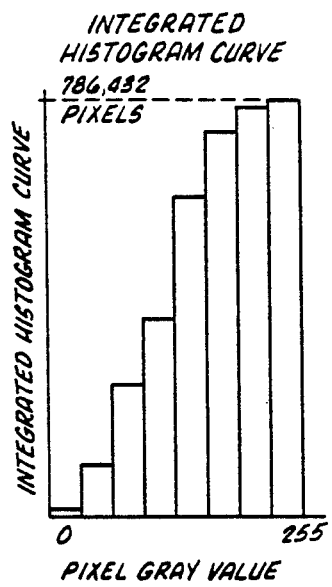

FIGS. 4a, b and c illustrate the operation of the histogram circuits 108 and microprocessor 114 to generate the calibration look-up table 116. In the histogram circuitry 108, a histogram is generated for the entire image from the serially-received 8-bit pixel intensity data from the first in-first out memory 106. The histogram contains 256 bins each containing the number of pixels having an intensity value with each of the respective discrete intensity levels from 0 to 255. Only some of the bins are illustrated in FIG. 4a for the purposes of showing the manner in which the recalibration look-up table is generated. The histogram circuitry 118, also provides an integrated histogram having a total of 256 bins. Each of these bins contains the number of image pixels having an intensity value less than or equal to each of the 256 possible discrete intensity values.

Figure 4C:
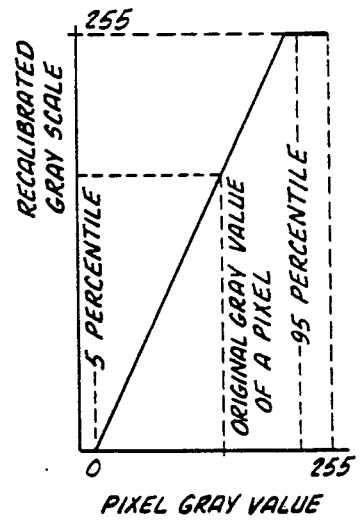

An analysis is performed to find the 5 percentile and the 95 percentile gray scale values for the entire image. When these values have been computed, a linear recalibration scale is drawn as shown in FIG. 4c. As the gray scale data are read from the image buffer for each pixel, a recalibrated gray scale value is determined as illustrated in FIG. 4c.

Figure 5:
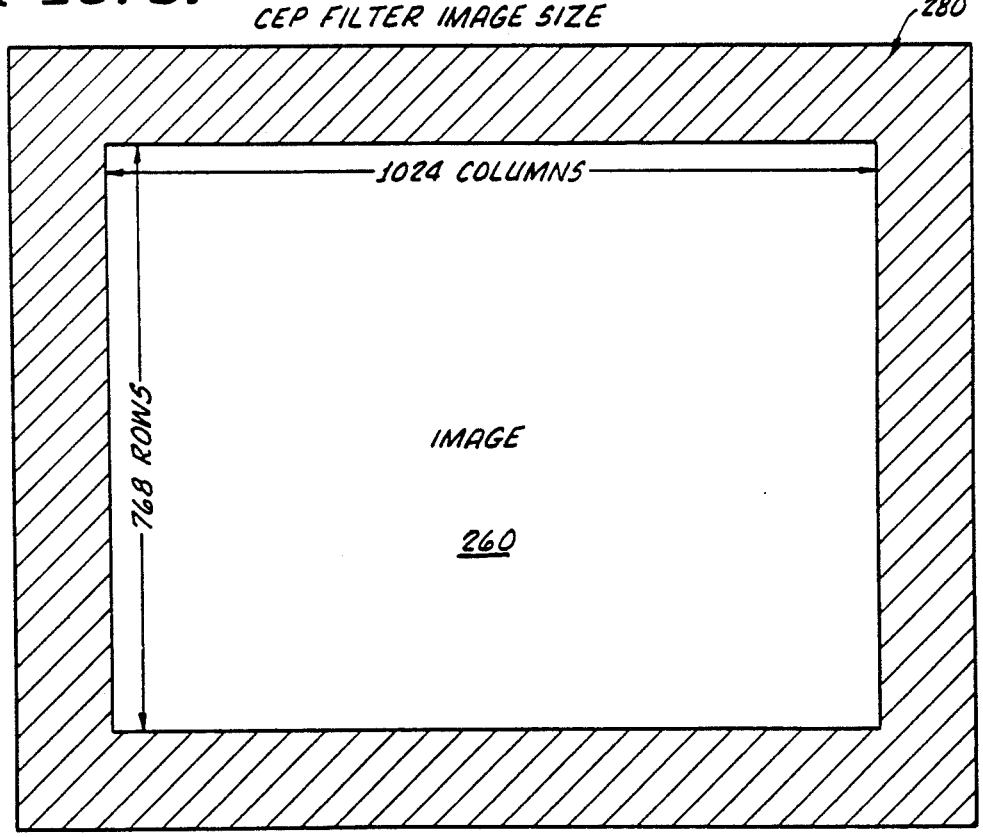
FIG. 5 shows an illustrative image size employed in the contextual enhancement processor filter according to the present invention, with a border of data elements surrounding the image arbitrarily selected to have an intensity value of white, i.e., the maximum intensity.

FIG. 5 illustrates the CEP filter 140 data array which consists of an array 260 of a matrix of data elements 768 rows deep and 1,024 columns wide surrounded by a border 280. The border 280 may be selected to be all white or all black and as described herein is selected to be all white, i.e., having intensity values equal to 255. The border is preferably 12 data elements around the image 260.

Figure 6:
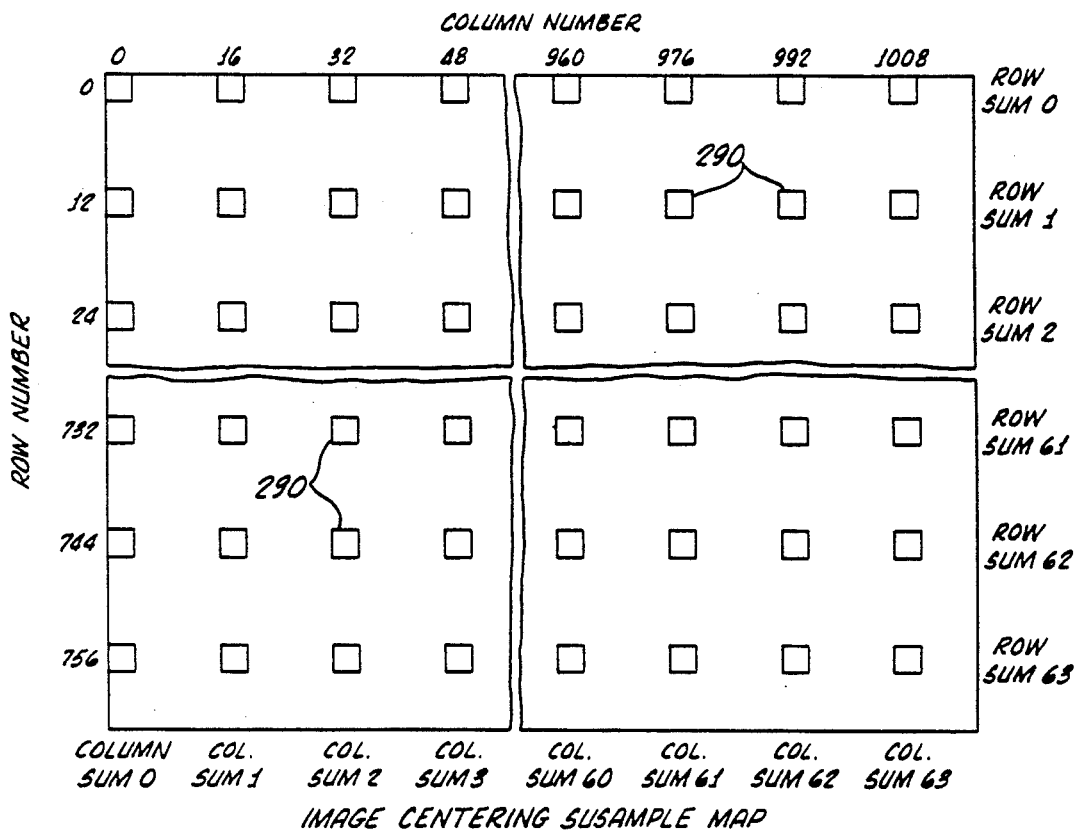
FIG. 6 shows a map of a subsample of data elements within the image array selected for the purpose of locating the approximate center of the image.

The gray level subsampling circuitry 110 selectively stores the intensity value for the image pixels 290 from the camera from each 16th column and 12th row as is illustrated in FIG. 6, with these image pixels 290 constituting an image centering subsample map. The intensity values in these image centering subsample map pixels 290 are passed to the microprocessor 114. The microprocessor sums the values for each of the rows and for each of the columns. A histogram of the subsampled pixel data is then generated by the microprocessor 114 to show the distribution of the number of pixels 290 having each of the possible 256 values of intensity.

Figure 7:
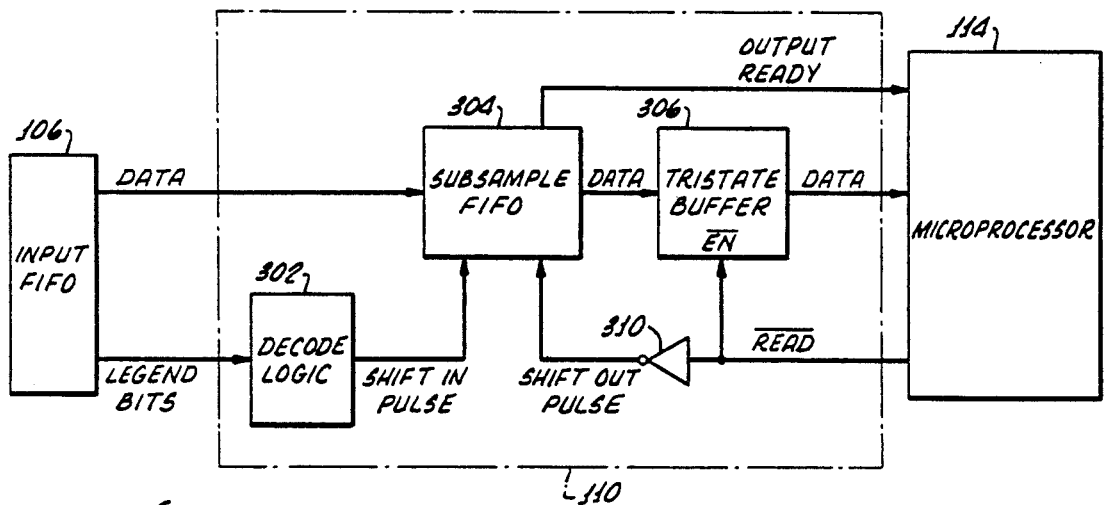
FIG. 7 shows a schematic block diagram of circuitry for acquiring and processing the subsample of the image data array for the purpose of centering the image.

The intensity subsampling circuitry 110 is shown in more detail in FIG. 7. The intensity subsampling circuit 110 receives the intensity data from the output of the first in-first out memory 106 along with the legend bits, which are received in a decode logic 302. The decode logic 302 detects the presence of legend bits indicating the data output from the first in-first out memory during a particular clock period is that of one of the subsample map pixels 290. The decode logic 302 then provides a shift in pulse to a subsample first in-first out memory 304. The intensity value for each of the pixels 290 is passed into a tri-state buffer 306 under the control of a "not read" signal from the microprocessor 114. When low, the "not read" signal passes through an inverter 310 as a shift-out pulse to the subsample first in-first out memory 304. The output of the tri-state buffer supplies the data to the microprocessor 114.

Figure 8:
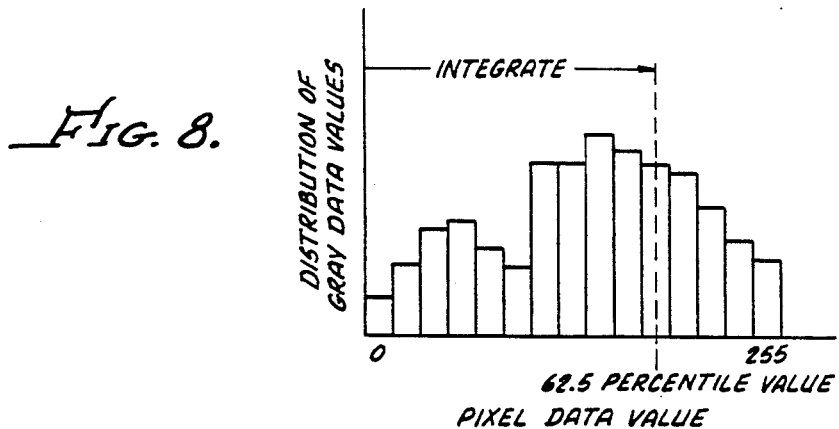
FIG. 8 shows a histogram of the subsampled intensity data employed in finding the approximate center of the image.

As is shown in FIG. 8, a histogram is generated. As with the recalibration histogram mentioned above, the histogram may also be integrated in order to find the value of the intensity below which 62.5 percent of the pixels 290 in the subsampled array are found.

Figure 9A:
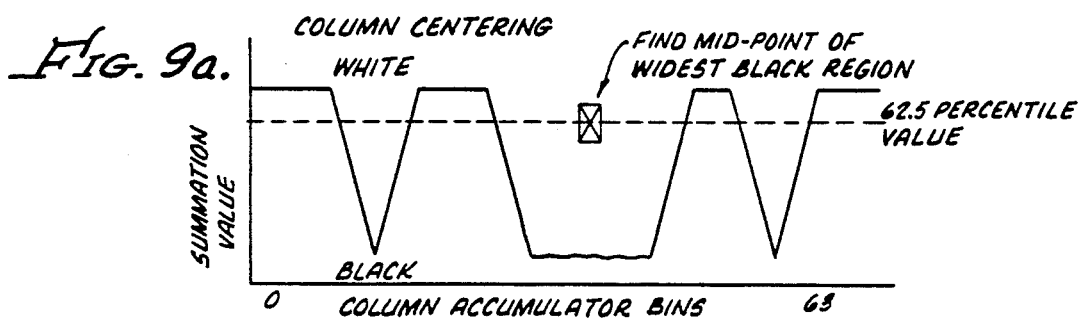
FIG. 9a illustrates the manner in which the microprocessor shown in FIG. 7 locates the center column of the image within the image array.
Figure 9B:
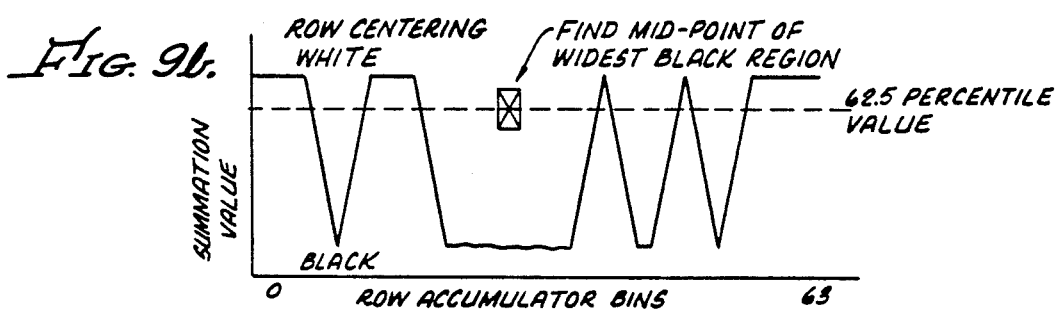
FIG. 9b illustrates the determination of the location of the center row within the image array.

Turning now to FIGS. 9a and b, this 62.5 percentile value is then compared by the microprocessor 114 with the row and column sums previously computed. The row sums are actually an average intensity for the subsample image pixels 290 in the row and the column sums are an average image pixel intensity for the subsample image pixels 290 in the column. As is shown in FIG. 9a, the columns are then analyzed to determine white columns and black columns, with the white columns being defined as columns having a column sum greater than the 62.5 percentile value, and with the other columns being designated as black columns. The columns are then analyzed to determine the widest region of black columns between adjacent white columns and to define the column which constitutes the midpoint of that region which is designated the column of the midpoint of the widest black region. A similar operation is performed by the microprocessor 114 to determine the midpoint of the widest black region of rows, with that column and row designation being the desired center of the ISRS window, provided that the ISRS window, constituting a 512×512 pixel matrix and having that center, still lies within the 1024×768 data array matrix.

Figure 10:
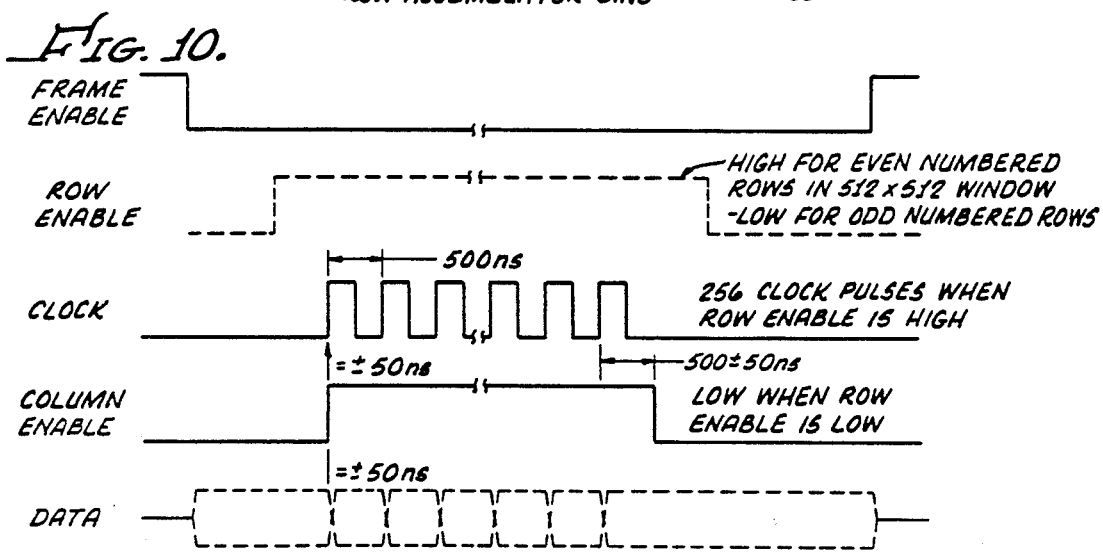
FIG. 10 shows an illustration of the image storage and retrieval timing signals.

FIG. 10 shows the image storage and retrieval signal timing of the 512×512 pixel array selected to provide output data to ISRS equipment (not shown). Output data is provided for every second column and for every second row. Thus, the output data becomes a 256×256 subsampled array. For each active row, the row enable line becomes active and a series of 256 clock pulses is issued. At the same time, the gray data for 256 pixels are issued serially with the gray data being valid during the fall of each clock pulse.

4. Dual Ported Image Buffer

FIG. 11 shows a schematic block diagram of a dual ported image buffer such as that of the dual ported image buffer 160. The image buffers 112 and 112' are similar. The image buffer 160 receives input data in the form of 8-bit bytes of intensity values in a serial stream from the output of the CEP filter 140 and holds these in a first in-first out storage memory 340. The contents of the first in-first out memory 340 are clocked into a buffer shift register 350 by an internal clocking contained within the image buffer 160. The contents of the shift register 350 is the data for four matrix data elements. The data for the four data elements is then clocked in parallel into memory locations within one of several banks A, B and C of a data storage memory bank 352, under the control of the memory controller 354, which receives write signals from the address counter 356.

Assuming that the data contained in the rightmost 8 bits of the 32-bit shift register 350 is the intensity data for the data element at row 0 and column 0, the data bits are contained in the shift register in reverse order of significance, i.e., D7 to D0. The data bits D15 to D8 represent the intensity data for the data element at row 0, column 1 in reverse order of significance. The data bits D23–D16 are the intensity data for the data element at row 0, column 2, in reverse order of significance, and the data bits D31–D24 are the intensity data for the data element at row 0, column 3. These are then loaded in parallel into the first four memory locations in bank A of the memory 352. This is necessary for the dual ported image buffer 160, because the CEP filter 140 is operating at 4 megapixels, i.e., four million data elements, per second, which is above the capacity for a dynamic RAM. By reading four data elements four at a time into the RAM, the data elements throughput rate for the RAM 352 is decreased to 1 megapixel per second.

The shift register 350 is then loaded with the contents of the data for the data elements in row 0, columns 4, 5, 6 and 7, which are then read into the memory 352 as described above. In this fashion, the data for each data element in the row 0, columns 0 through 1,024 is stored in the memory 352 of the buffer 160, followed by the data elements, in sequence, in row 1, row 2, row 3 and so on. When bank A of the memory 352 is full, the memory controller 354 under the control of the address counter 356 begins loading of the data element data in bank B. After bank B is fully loaded, bank C of the memory 352 is loaded. The dual ported image buffer 160 is a 1K×768×8 memory, and thus has a memory location for each 8 bits of data element intensity data for each of the data elements in the 768 rows, containing 1,024 columns. The borders are added by causing the row and column counters to start 12 rows (columns) early and by ending 12 rows (columns) late. Whenever the counters indicate that the data elements are outside the normal 1K×768 data element image area, the data issued to the processor sections are arbitrarily forced to an all white (maximum) intensity. In actuality, a one's compliment of the intensity data is employed. This is done because of the need to periodically initialize the border data elements to all white. Registers which can be initialized to all 0's are easier to utilize. Thus the need to use the one's complement, such that in the CEP 140, all white is "0000 0000."

When it is desired to read the data from the memory 352, the memory controller 354 generates a read signal under the control of the address counter 356. The address counter 356 also provides control signals to a 4 to 1 multiplexer 358. The 4 to 1 multiplexer 358 provides an output stream of 8-bit bytes serially from the four selected memory locations. For example, as shown, the first four data element intensity values would pass through the 4 to 1 multiplexer 358 in a serial output stream from D0 through D31, and would contain the data representative of the intensity values for the data elements at row 0, columns 0-3, sequentially.

5. Preliminary Direction Estimate Method and Circuitry

Figures 12, 13:
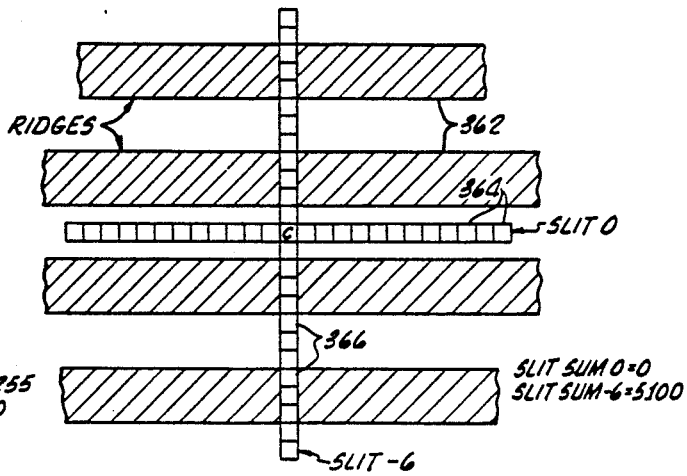
FIG. 12 shows a 25×25 data element scan window having a center data element and having selected data elements, as illustrated, defining a plurality of slits aligned with directions through the scan window center data element, separated generally by 15° increments from 0° to +75° and 0° to −90°.
FIG. 13 shows an idealized view of the slit sum contrast-comparison magnitude subtractions employed in the present invention for the purpose of defining the image feature flow within a scan window and assigning a direction estimate to the center data element.

Returning now to FIG. 2, the serial data stream from the output of the 4 to 1 multiplexer 358 of the dual ported image buffer 160 is input into the multiplexer 130. The output of the multiplexer 130 forms the input to the slit summing circuits 200. This input may, therefore, be from camera interface circuits 102, 102' or the image buffer 160. The slit summing circuits 200 are set up to analyze the data contained in a 25×25 data element window as shown in in FIG. 12. Selected data elements within the 25×25 data element window shown in FIG. 12 are identified as data elements lying along one of a plurality of twelve possible slit directions through the common center data element, C, each slit defining a direction generally separated by 15°. The horizontal slit direction 0, corresponding to 0 degrees, the vertical slit direction −6, corresponding to −90°, and the two diagonal slits +3 and −3, corresponding, respectively, to +45° and −45°, are straight line slits. It will be understood that the remaining slits ±1, ±2, ±4 and ±5 do not precisely lie along their respective directions ±15°, ±30°, ±60° and ±75°. However, they are selected to approximate as closely as possible 15° separations between adjacent slit directions. In addition, it will be noted, that the data elements identifying the respective slits are reflective about the center data element C. In addition, it will be noted, that the twelve selected directions lie in the right-hand half of the plane of the scan window shown in FIG. 12. This is so because the data enhancement process, as utilized for image data enhancement, according to the present invention, utilizes the directional flow of features contained in the image, e.g., a fingerprint image, and depends only on the relative angle of the direction of flow. It is independent of whether the flow is from right to left or left to right through the scan window. Thus, twelve slit directions will define all the necessary possible directions of the flow of the image features, within the scan window separated by approximately 15°.

5.a. Preliminary Direction Estimate Method

FIG. 13 illustrates the method used according to the present invention to estimate the direction of image feature flow in the vicinity of the center data element C of a particular direction estimate scan window location, based upon data representative of the intensity for selected data elements within the window. FIG. 13 is an idealized case for illustrative purposes. The two slits shown in FIG. 13, slit 0, the horizontal slit, and slit −6, the vertical slit, are selected for purposes of this illustration in FIG. 13. Where the data represents an image, e.g., a fingerprint image, it is desirable to determine the general flow of the features of the image in the vicinity of the center data element, which define, in the case of an image of a fingerprint, fingerprint ridges. This is done according to the present invention by computing slit sums for each of the slits in the scan window. However, by way of example, only slits 0 and −6 are shown in FIG. 13. A slit sum according to the present invention is defined as the sum of the differences between the intensity values in each of the data elements in a particular slit, which data elements are separated from each other by a selected number of intervening data elements, and excluding the data elements in which the intervening data elements contain the center data element. The choice of comparison of data elements separated by several elements maximizes the probability of the existence of relatively large contrast between intensities of the compared elements. It will be seen that, with twenty-five data elements in each slit, and having two data elements for the intervening data elements, there are a total of twenty difference comparison intensity magnitude subtractions which make up the slit sum for each slit. It will also be seen that there are ten such comparisons on each side of the center data element C in the slit. Furthermore, it will be seen that the total slit sum for the particular slit is independent of the sequence in which the various intensity data comparison magnitude subtractions are made for the particular data elements in question within the slit, so long as each of the ten magnitude subtractions between the respective separated data elements on each of the sides of the center data element are made and summed together.

The idealized case illustrated in FIG. 13 shows fingerprint ridges 362 which are exactly three data elements wide and separated by exactly three data elements. In addition, the idealized case is selected such that the ridge direction is exactly parallel to slit 0. In reality, the image feature flow lines, for example, the ridges in a fingerprint image, will typically be greater than three data elements wide and the separation typically will be greater than three data elements wide. However, the selection of the difference comparisons between data elements having two intervening data elements will, where the ridge flow allows, insure that at least some contrast comparisons within each slit are made between data elements within ridges and data elements within adjacent valleys.

Returning to the idealized case shown in FIG. 13, each of the magnitude comparisons in slit-6 involves the comparison of a data element 366 in slit −6, which is in a valley, or white region, of the fingerprint image and a data element 366 in a ridge, or black region, of the fingerprint image. An additional assumption has been made in the idealized case that the valleys are all white, i.e., have an intensity of 255, and the ridges are all black, i.e., have an intensity of 0. In reality, the image, e.g., a fingerprint image, will have various shades of gray in both the ridge regions and valley regions, or at least in the transition between ridge and valley. However, for the purposes of illustration, it is assumed the values of intensity are all black or all white. It can be seen that the slit sum for slit −6 is the total of 20×255 or 5,100. This is because each difference comparison subtracts 0 from 255. The slit sum for the slit 0, lying totally in a white region, results in a slit sum of 0. This is because each of the contrast comparisons subtracts data elements 364 in slit 0 from each other, each having a value of 255, resulting in a 0 each time. It will also be seen that the slit sum for slit 0 would also be 0 if the slit 0 lay totally within a ridge, because all magnitude subtractions would be subtracting 0 from 0.

It can be seen that the slit with a high slit sum will generally be indicative of the slit which is running perpendicular to the general flow of the image features, for example, fingerprint ridges, within the scan window. Similarly, a slit having a lower slit sum will generally be running more parallel to the flow direction of the image features. Thus, by determining the lowest slit sum and examining for certain other criteria, which will be explained below, a determination can be made as to the direction to be assigned to the center data element C, as an indication of the general image feature flow direction in the region of the center data element C. This is independent of whether the center data element is positioned in a ridge or in a valley within the image contained within the scan window. It will be understood that the idealized illustration of FIG. 13 could employ any two of the twelve slit directions having a 90° relation to each other.

In addition, if there is no slit sum from among the twelve slits, which, when tested according to the criteria which will be explained below, clearly indicates a significantly lower slit sum value, then the image in the region of the center data element C may be determined to be sufficiently undefined. In that event a direction of "no direction" is assigned. For example, in a fingerprint image there may be smudges and the like in the image or a fingerprint may be incomplete in certain portions. In the former case, the image in the region of the center data element contained within the scan window would be generally dark but with no definable general feature flow direction, i.e., ridges. In the latter case, the image in the scan window would be generally white and also with no definable general feature flow direction. It can be seen that in these instances, all of the slits sums would much more closely approximate each other than in the idealized case illustrated in FIG. 13.

If one were to superimpose the entire scan window shown in FIG. 12 upon the idealized image pattern shown in FIG. 13, the results of the slit sums for the various slits −6 through +5 are shown in FIG. 14. It will be seen that the slit sums for slits −6 through −3 and +3 through +5 are equal the maximum value of 5,100. This is because of the manner in which these slit data elements are arranged in the dog-leg fashion shown in FIG. 12, such that, when the scan window of FIG. 12 is superimposed on the ideal image feature pattern shown in FIG. 13, the individual comparisons of data elements in those slits, separated by two intervening data elements, results always in comparing a data element in the slit which is a white data element to a data element in the slit which is a black data element. The slits ±1 and ±2 have slit sums which converge toward the idealized slit sum of 0 for slit 0.

It can also be seen from FIG. 14 that the slit having the lowest sum and defining the general image feature flow direction in the region of the center data element C should be bracketed by slits having slit sums which more nearly approximate the slit sum of the slit having the lowest slit sum than the slit sums of the slits having directions less closely aligned to the slit having the lowest slit sum. These less closely aligned slits should also have slit sums which are relatively much greater than the slit sum of the slit having the lowest slit sum. This property of the low slit sum when the scan window is in a region of the image wherein image feature flow directions are relatively clearly defined will be used, as explained below, in the logic circuitry used to assign a preliminary direction estimate to the center data element, or to assign a "no direction" as the preliminary direction estimate for the center data element.

Since the 25×25 scan window is incremented through the image array one data element at each clock period, row by row and column by column, and the throughput rate for the CEP filter 140 is desired to be 4 megapixels per second, it is not possible in software to compute all of the slit sums and do the necessary comparisons, as will be explained in more detail below, for each position of the scan window during the 250-nanosecond period available at a 4 megapixel-per-second throughput rate. These operations can be performed in software, but only at a vastly slower rate. Thus, while the preliminary direction estimate technique according to the present invention may be implemented in software, the present invention incorporates a hardware implementation of the slit summing and the logic performed on the results of the slit summing. This hardware implementation provides for the dedication of circuits to operate on the various slit sums in parallel, and also circuitry which enables computation earlier in time (effectively a prior computation) of almost all of the actual computations needed for a given slit at a given center data element location in the array, and also enables a reduction in the amount of memory needed.

5.b. Slit Summing Circuitry 5.b.1. Column Scanner

Figure 15:
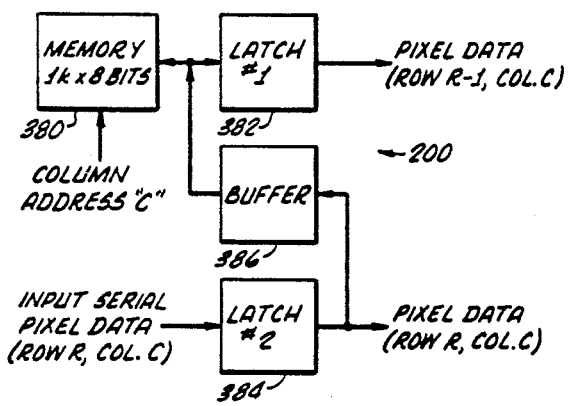
FIG. 15 shows a simplified block diagram illustrating a portion of the column scanner circuitry employed to provide data element inputs into the slit summing circuitry and other circuitry according to the present invention.

FIG. 15 shows the circuitry for a simplified form of the column scanner. As shown in the figure, serial input data elements data (gray data) for row R, column C are received and stored in latch #2 384 during the first half of the processor clock cycle. At the same time, the 1K×8-bit memory 380 is read and the data stored in latch #1 382. As will be shown later, the data read from the memory 380 was saved when the prior row was processed and the input data was the data element gray scale value for row R-1, and column C. Thus, the output of latch #1 382 is the data element data for the same column as that of latch #2 384 but for the row just above that of latch #2 384. During the last half of the processor clock period, a buffer 386 is enabled and the data for row R, column C is written into memory 380 before column address C has been advanced. Thus, the data for row R, column C has thereby been written into the memory 380 at the same location which contained the data for row R-1, column C. The column address C is incremented at the beginning of the next clock period and the process repeated for the next column.

By using 17 circuits like that shown in FIG. 15, there is provided a parallel data element data array for column C for all the rows from row R to row R-17. By incrementing the column address counter coherently with the processor clock, the data array will scan across the image 260 from left to right. Outputs are then provided as explained below to select data elements from the particular column and selected ones of the rows R to R-17 (18 rows) which are reoriented to a row selected as row R in which the center data element is located, and are redefined as rows R-5 to R+12, as explained below.

5.b.2. Slit 0

FIGS. 16a–e show the progress of the 25×25 scan window to select data elements forming slit 0. The scan window moves through the border 280 into the image array 260 starting with column 0, with the center data element C lying in a row arbitrarily designated as R. For purposes of illustration, the slit summing techniques described herein, will be described as if there were no border 280 data elements. As will be seen from the following description, until the scan window reaches the image array 260, all the magnitude substractions in the border 280 will result in 0 outputs from the slit summing circuitry.

Figure 16C:
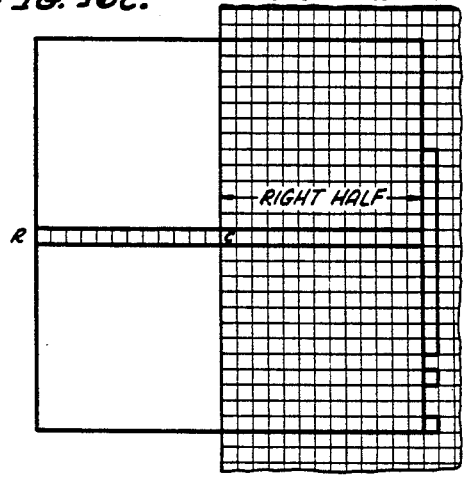
FIGS. 16a–e illustrate the slit summing of the horizontal slit, designated slit 0.
Figure 16A:
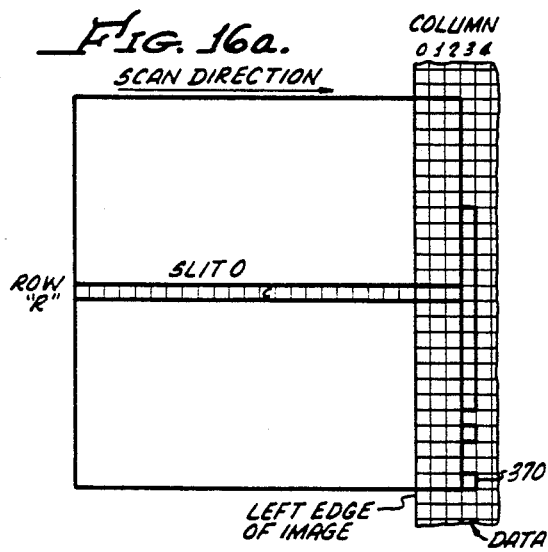
Figure 16D:
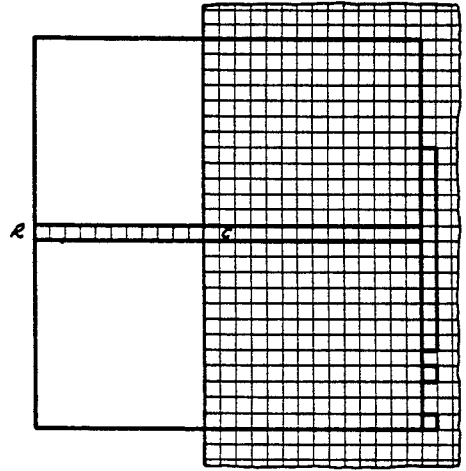
Figure 16B:
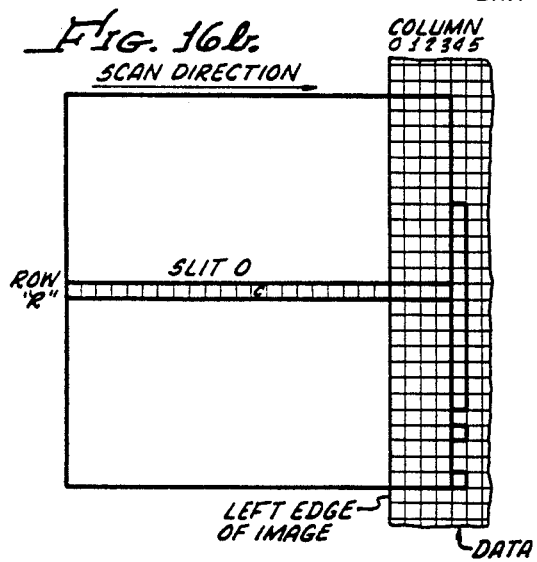

FIG. 16a shows the scan window with its rightmost column of twenty-five data elements in coincidence with column 2 of the image. In the next clock period the data element shown at the lower right-hand corner just outside the scan window, identified as data element 370, enters the scan window. Stored in memory, as explained above with respect to FIG. 15, are the intensity data values for the data elements located in the same column as data element 370 and three rows above data element 370 and also five through seventeen rows above data element 370. These data elements constitute the data elements which are contained in a slit sum column scanner 449 (shown, e.g., in FIG. 30) constructed according to FIG. 15 for the purpose of providing inputs for computing slit sums. In particular, in the example shown in FIG. 16a, the data contained in the data element in row R, column 3 is input to the slit summing circuitry for slit 0 for a particular center data element. As is shown in FIG. 28, the data element intensity values for the data elements in row R, when the scan window entered columns 2, 1 and 0, are stored in a 24-bit shift register. This, in effect, acts as a latch for the values for the data element intensities for those data elements, sequentially for three columns of movement of the scan window, in latches 400, 402 and 404. Contents of latch 404 is compared with the contents of the data element at row R, column 3 by a comparator 406, the output of which, P>Q, controls an arithmetic logic unit (ALU) 408 in such a way as to cause the smaller input to the ALU 408 to be subtracted from the larger input. The output of the arithmetic logic unit 408 is thus the absolute value of the difference between the contents in latch 404 and the contents of the data element at row R, column 3. This value is fed to an accumulator 412 which accumulates the sum of these difference values and is also fed to a 10-column delay 410. This process continues as the slit 0 at row R proceeds into the image as shown in FIGS. 16b and c until the center data element of the scan window is located in row R, column 0 in FIG. 16c. In the next clock period, shown in FIG. 16d, the original value of the magnitude subtraction for the data elements in row R, column 3 and row R, column 0 forms the output of the 10-column delay 410. This output is subtracted from the accumulated value in the accumulator 412. This accounts for the fact that when the scan window is moved one column to the right of the position shown in FIG. 16c to the position in FIG. 16d, the subtraction occurring ten columns earlier, i.e., between the values of the data elements in row R, column 3 and row R, column 0, will bracket the center data element C. This is a magnitude subtraction which is, under the present preferred embodiment, not employed as part of the slit sum. The accumulated differential value output of the accumulator 412 has subtracted from it the output of the 10-column delay 410 due to the negative input from the 10-column delay 410. The output of the accumulator 412 is the input to a 12-column delay 414, the output of which is added in an adder 416 to the output of the accumulator 412. Thus an output from the accumulator 412 after twelve columns from the first magnitude subtraction, of the data elements at row R, column 3 and row R, column 0, will constitute the left half of the slit sum for the slit 0 with its center data element at row R, column 12. This can be seen in FIG. 16e. It also, of course, constitutes the right half of the slit sum for the center data element at row R, column 1, as seen in FIG. 16d. It will be seen that, as the center data element of the scan window moved through to border 280 to column −1, the slit summing circuitry was generating 0 outputs, because all data elements in the border 280 are arbitrarily selected to have an intensity of 255. Thus, the slit sum for the slit 0 with the center data element at row R, column −1, just prior to the position as seen in FIG. 16c includes a right side sum from the accumulator 412, plus a 0 output from the 12-column delay 414. In the next column position of the scan window, seen in FIG. 16d, the 10-column delay output is the magnitude subtraction of the data elements in row R, column 0 and row R, column +3, and the output of the 12-column delay is indicative only of the amount by which the magnitude subtraction between the data elements in row R, column 0 and row R, column 3 modifies the 0 output from the 12-column delay 414.

Figure 16E:
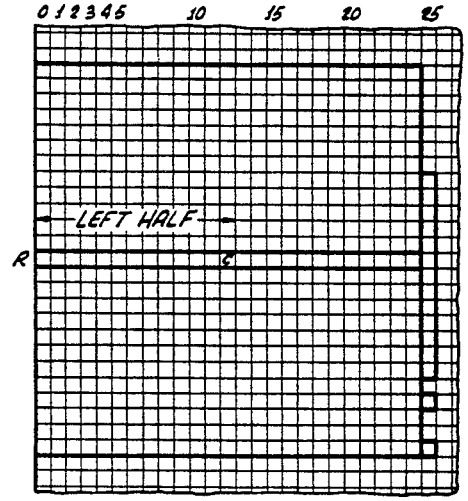

This process continues as the scan window proceeds across the image array 260 until the scan window is entirely located within the image array as shown in FIG. 16e. At this point, the output of the 12-column delay 414 is an input to the adder 416 which adds the current output from the accumulator 412 with the output from the 12-column delay 414 to produce an output which is the sum of 20 magnitudes subtractions. As can be seen from FIG. 16e, the first ten magnitude subtractions which were delayed in the 12-column delay 414 comprise the magnitude subtractions for the left half of slit 0 in the location shown in FIG. 16e. It will also be understood that the output of the accumulator 412 at this point is the sum of the ten magnitude subtractions for the right half of slit 0 for the position of scan window shown in FIG. 16e, including the subtraction of the output of the 10-column delay 410. This comprises the slit sum for slit 0 with the center data element in row R, column 12, as shown in FIG. 16e. It will be understood that from this point on the output of the adder 416 will continue to comprise the slit sum for row R for slit 0 with the center data element C of the scan window in each succeeding location in row R. These will be based upon the contents of the data elements for the slit 0 for each position of the center data element C, until the right side data elements leave the image array 260 and enter the right-hand border 280 surrounding the image array 260.

5.b.3. Slit −6

Figure 17A:
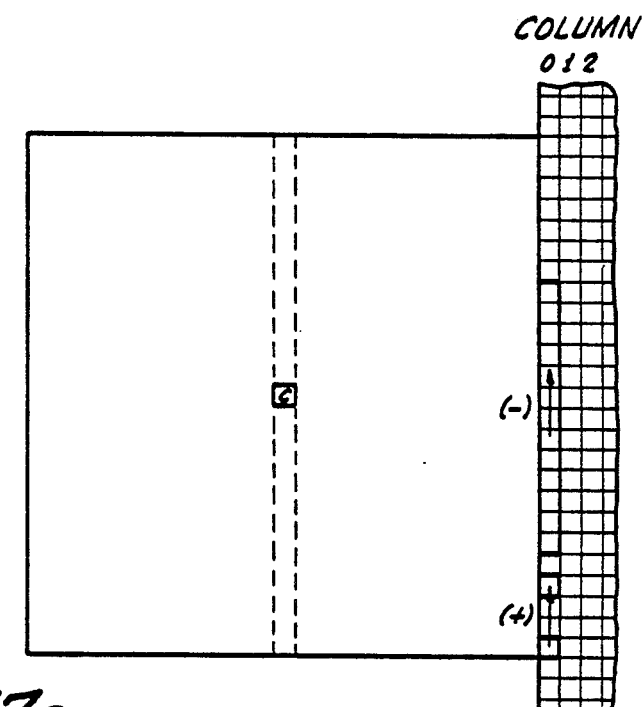
FIGS. 17a and b illustrate the slit summing for the vertical slit, designated slit −6.
Figure 17B:
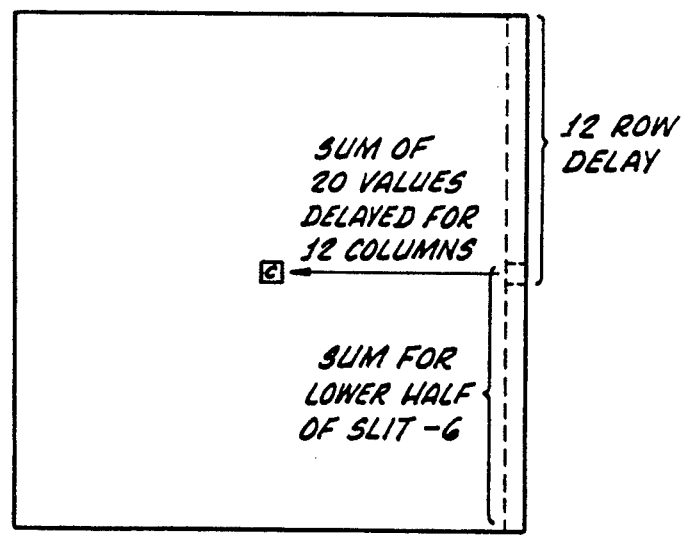

Turning now to FIGS. 17a and b and 29, the illustration of the slit summing for the vertical slit −6 and the mechanization thereof are shown. During each clock period, the column scanner 449 is scanned for the data elements in rows $R-1$, $R+2$, $R+10$ and $R+12$. Since the slit −6 is a straight line slit, it is possible to accumulate all of the magnitude subtractions by storing for a particular column the accumulation of the results of the magnitude subtraction between the rows $R+10$ and $R+12$, added to the resulting accumulation for when the scan window was incremented through the image 260 one row above the present position of the scan window. However, as explained above, it is preferred in the embodiment of the invention described in this application to limit the number of magnitude subtractions to ten on either side of the center data element. Thus, it is necessary to account for the magnitude subtraction between spaced-apart data elements which bracket the center data element. This is accomplished in the mechanization shown in FIG. 29 by inputting the column scanner outputs for row $R-1$ and row $R+2$ into an arithmetic logic unit 420, the output of which is the magnitude subtraction between the data elements in row $R-1$, column $C_n$ and row $R+2$, column $C_n$. In addition, the output of the column scanner 449 for rows $R+10$ and $R+12$ are input into an arithmetic logic unit 422, the output of which is the magnitude subtraction for the data elements in row $R+12$, column $C_n$ and row $R+10$, column $C_n$. The outputs of the arithmetic logic units 420 and 422 form the input to a subtractor 424. The output of the subtractor 424 is added in an adder 430 to the output of a transparent latch 428. The transparent latch 428 is enabled on the first half of the CEP 140 clock period, and reads and latches the contents of a memory 426, which is addressed by column No. identifying the column which will enter the scan window shown in FIG. 17a during the next clock period. The output of the adder 430 forms an input to a feedback buffer which is enabled during the second half of the CEP clock period, to write the output of the adder 430 into the memory location in the memory 426 corresponding to the column address. In this manner, the column address memory location in the memory 426 is continually updated to comprise an accumulation of 10 magnitudes subtractions forming the lower half of a slit −6. It will be seen that the lower half of the slit −6 also comprises the upper half of the slit −6 for a different center data element location. Thus, the output of the adder 430 also forms the input to a 12-row delay 434, the output of which is added in an adder 436 to the output of the adder 430. The output of the adder 436 comprises a sum of 20 magnitude subtractions for a slit −6. It will als be seen in FIG. 17b that this slit −6 sum of 20 magnitude subtractions forms the slit sum for a slit −6 having a center data element C when the scan window has advanced an additional 12 columns. Thus, the output of the adder 436 is the input to a 12-column delay, the output of which forms the slit sum −6 for a center data element C as shown in FIG. 17b.

5.b.4. Slit +1

Turning now to FIGS. 18a–c and 30, there is shown a pictorial representation of the slit summing mechanization for the slit +1 and the mechanization circuitry.

With the center data element in row R, the column scanner 449 scans column 3, rows +2 and +3. Rows +2 and +3 correspond to rows separated from row R, which contains the center data element, and arbitrarily defined as + rows in counting down from the row R.

As shown in FIG. 30, the values for row +2 for columns 2, 1 and 0 had previously been latched in latches 450, 452 and 454, comprising a shift register, and the values for row +3, columns 2, 1 and 0 have previously been latched in latches 462, 464 and 468, also comprising a shift register. Each latch 450, 452, 454 and 462, 464 and 468, respectively, has 8 bits of the shift register. The value for row +2, column 3 is compared in a comparator 456 with the value for row +2, column 0, which is the output from latch 454. The output of the comparator 456, as described above, controls a magnitude subtraction performed by an arithmetic logic unit 458. In addition, the intensity value for the data element in row +2, column 3 is compared in a comparator 470 with the output of the latch 468, which constitutes the value for row +3 column 0. The output of the comparator 470 controls a magnitude subtraction performed in an arithmetic logic unit 472 as described above.

The output of the arithmetic logic unit 472 is latched in a shift register comprising latches 474 and 476, each comprising 8 bits of the shift register. The output of the latch 474 and the output of the latch 476 comprise inputs to an adder 478. The output of the adder 478 is an input to an adder 480 which also receives an input from the magnitude subtraction output from the arithmetic logic unit 472. Thus, after three succeeding clock periods, the output of the adder 480 comprises a sum of a group of three magnitude subtractions for data elements separated by two intervening columns and displaced one row from each other in rows $R+2$ and $R+3$. This is illustrated in FIG. 18b.

As seen in FIG. 18c, this same group comprises a portion of slit +1 for a center data element in row R, column 12. Also in FIG. 18c, it can be seen that three groups of magnitude subtractions in the slit +1 to the right of the center data element C have the same data element position relationship among the data elements in the group. Thus, by retaining in memory the results of these grouped magnitude subtractions they can be summed together to form nine of the ten necessary magnitude subtractions for a particular center data element on the right-hand side of the slit +1 for that center data element. In order to form the entire right half slit sum for that particular center data element as illustrated in FIG. 18c, there remains only the addition of the magnitude subtraction between the data elements shown in row −2, columns 21 and 18, which will be seen to correspond to the output of the adder 458 for a previous center data element location. This output of adder 458 is stored and recalled, as will be explained with reference to FIG. 30.

Once the ten magnitude subtractions for the right half are accumulated and stored in memory the magnitude subtractions for the left half of slit +1 are similarly accumulated. The slit summing mechanization for slit +1 can be better understood by considering FIG. 18c in conjunction with FIG. 18b. The sum of the magnitude subtractions for the group of three in the upper right-hand corner of slit +1 for the center data element located in the position shown in FIG. 18c, i.e., in row R, was the output of the adder 480 when the center data element of the scan window was located at C' two rows above and thirteen columns to the left of the right-hand end data element of slit +1 in the position shown in FIG. 18c, i.e., when the center data element was five rows above and one column to the left of the present center data element location shown in FIG. 18c. Similarly, it can be seen that the center data element of the scan window was located at C'' two rows above and thirteen data elements to the left of the rightmost data element in the second group of three (i.e., the data element in row −2, column 20 as shown in FIG. 18c) when the magnitude subtraction for the second group was the output of the adder 480. In other words, the center data element of the scan window was located four rows above and five columns to the left of the center data element location as shown in FIG. 18c. It can similarly be seen that for the next group of three, closest to the center data element C on the right-hand side of the slit +1, as shown in FIG. 18c, the location for the center data element of the scan window was at C''' three rows above and eight columns to the left of the present center data element location shown in FIG. 18c. In like manner, when the center data element of the scan window was located at C'''' two rows above and thirteen columns to the left of the present center data element location, i.e., in row R−2, column −1, the output of the adder 480 was the magnitude subtraction sum for the first group of three to the left of the center data element, and, when the center data element of the scan window was located at C''''' one column above and sixteen columns to the left of present location of the center data element, i.e., in row R−1, column −4, the output of the adder 480 was the second group of three to the left of the center data element C in the position shown in FIG. 18c. Finally, with the center data element of the scan window located at C'''''' in the same row as the center data element shown in FIG. 18c and twenty columns to the left of the center data element C, the output of the adder 480 was the accumulated magnitude subtraction for the left most group in the slit +1. Thus, when the center data element of the scan window is in row R+1, column −4, the output of the adder 480 is combined with the contents of a memory location in which was loaded the output of the adder 480 when the center data element of the scan window was in row +2, column −1, with the result being stored in memory to be combined with the output of adder 480 when the center data element is in row R, column −8. One column earlier in row R the output of the adder 458 is also a part of the left-hand portion of the slit sum for the slit +1 with its center data element in row R, column 12 as shown in FIG. 18c. This sum for the left-hand side is combined with the sum for the right-hand side and provided as an output from the slit sum circuitry 200 as the slit sum for slit +1 with the center data element of the slit shown in FIG. 18c. In other words, with the center data element in row R, column −8, the left-hand sum and right-hand sum are added and placed in a 20 column delay, the output of which is slit sum +1 for the scan window positioned as shown in FIG. 18c.

The mechanization of this accumulation and storage of the values for the right-hand and left-hand portions of the slit sum for slit +1 is shown in FIG. 30. The output of the adder 480, constituting the first group of three sums for the slit +1 as shown in FIG. 18b is the input to a delay circuit 482 when the center data element of the scan window is located in the position C' in row R−5, column 11 as shown in FIG. 18c. When the center data element of the scan window is in the position C'' in row R−4, column 7, as shown in FIG. 18c, the output of the adder 480 is the sum of the group of three for the center data element of the scan window in row R−4, column 7. Thus, assuming an image 260 of 1,024 of data elements in a row with a twelve data element border 280, the delay circuit 482 would be for 1,043 clock periods. This would move the center data element of the scan window from the position at C' in row R−5, column 11 to the position at row R−4, column 7. The output of the adder 480 and the delay circuit 482 are inputs to an adder 484. The output of the adder 484 is a combined group of six magnitude subtractions. It will be seen, that the output of the arithmetic logic unit 458, with the center data element of the scan window in a position one column to the right of the position C'', shown in FIG. 18c, will comprise the magnitude subtraction for the data elements in row R−2, columns 21 and 18. Thus, the output of the adder 484 is put in a one clock period delay latch 486, the output of which is added in an adder 488 to the output of the arithmetic logic unit 458. The output of the adder 488, is put through a 1,045 clock period delay circuit 490, the output of which will then be added in an adder 492 to the output of the adder 480 with the center data element in a position C''' in row R−2, column 4, as shown in FIG. 18c. It will be seen that the output of the adder 492 comprises the sum of ten magnitude subtractions for the data elements in the right-hand side of the slit +1 for its center data element positioned in row R, column 12, as shown in FIG. 18c.

A suitable delay circuit for any delay beyond one clock period in length can be comprised, as is known in the art, of a memory, a buffer and a counter. For example, for a one-row delay of data through the image, i.e., 1024 columns, a memory is provided having at least 1024 memory locations, each with a sufficient word size to accommodate the data in question. For example, if the stored and delayed data is to be the sum of six magnitude subtractions, the maximum value for this is 6×255, i.e., 1530, which would require eleven bits. This typically would result in using a memory having a standard 16 bit word for each memory location. In the first half of a clock period a memory location is addressed according to the output of a 1024 count counter, this is the data from one row earlier. The output read from the memory location is put in a latch for use by the circuitry in question during the clock period. The incoming data is also latched in the buffer. In the second half of the clock period the buffer is enabled and the data there read into the same addressed memory location. It will be understood that as the counter increments, the data read from memory is for one row earlier in the same column, because when the counter reaches the same address count again, the data being read out was placed in the memory exactly 1024 counts earlier, i.e., one row earlier. The counter is suppressed when the scan window in question is in border 280.

In some circumstances, a delay of only a few columns, less than a full row, is necessary, e.g., twelve columns. In this event the same arrangement is used employing a memory having at least twleve memory locations, e.g., a standard sixteen-word memory, with a modulo 12 counter as the memory address generator instead of a 1024 count counter.

In other circumstances, it is necessary to delay data for more than one row, e.g., four rows. This is done with a memory having 4096 memory locations and a 4096 count counter. It will be understood that, if more than four rows of delay are needed, e.g., twelve rows, the output of the four-row delay is input into a like four-row delay, the output of which is the input to another like four-row delay, the output of which has been delayed twelve rows. It will also be understood these delays may be connected such that the output is a delay of a certain number of columns and a certain number of rows.

For the left-hand side of the slit $+1$, the output of the adder 480 is delayed in a delay circuit 481, the output of which is combined with the output of the adder 480 in another adder 483. The output of the adder 483 comprises the sum of the two groups of magnitude subtractions from the adder 480 corresponding to center data element locations $C''''$ and $C'''''$ as shown in FIG. 18c. The output of the adder 483 is delayed in a delay circuit 485, the output of which is added to the output of the adder 480 in an adder 487. This comprises the addition of the final group of three with the center data element for the scan window in the position $C''''''$ as shown in FIG. 18d. It will be seen that with the center data element of the scan window one column further to the right of the position $C''''''$ shown in FIG. 18d, the output of the arithmetic logic unit 458 corresponds to the magnitude subtraction between the data elements in $R+2$, column 7 and $R+2$, column 4. Thus, the output of the adder 487 is delayed in a one clock period delay circuit, i.e., a latch 489, and is added with the output of the arithmetic logic unit 458 in an adder 491. The output of the adder 491 is added in an adder 495 to the output of a delay circuit 493, which delays the output of the adder 492 for a sufficient number of clock counts to account for the change in the center data element location of the scan window from the position designated $C'''$ to the position designated $C''''''$ in FIG. 18c. The output of the adder 495 is delayed twenty clock periods in a delay 496 and comprises the slit sum $+1$ for the center data element C positioned in row R, column 12, as shown in FIG. 18c.

It will be seen that it takes the data accumulated by the slit summing scan window for slit $+1$ in six different rows in order to construct the slit sum for slit $+1$. In addition, it will be seen that for each clock period there is an output of the adder 495 which, constitutes a slit sum for a slit $+1$. It will be understood, of course, that when the scan window has its rows only partially within the image array 260 the slit sums for the various slits, including slit $+1$, may not be entirely valid. In addition, when the scan window initially begins entry into the image array 260, with its rows fully in the image array 260, but not all of its columns in the image array, the slit sums similarly are not valid. Furthermore, it will be understood, that as the scan window begins its scan in each row starting in the border 280, it will take some time for the various latches and delay circuits shown in FIG. 30 to become sufficiently loaded to begin producing output data for use in subsequent adders. However, as the scan window progresses through the image array 260, from a position such as that shown in FIG. 18c, and until the scan window is in a position in its respective row in which the output of the adder 480 comprises a magnitude subtraction of a data element within the image array 260 and a data element within the right-hand part of the border 280, the circuitry is accumulating and generating a valid slit sum for each of the slits, including slit $+1$, for a particular center data element within the image array 260 during each clock period.

5.b.5. Slit $-1$

Turning now to FIGS. 19a and b, it can be seen that the slit sum for the slit $-1$ is quite similar to that for the slit $+1$. The details of the circuitry for slit $-1$ will, therefore, not be described. The circuitry for slit $-1$ involves the same latching technique for performing magnitude subtractions and grouping three magnitude subtractions together, so as to form an output similar to the output of the adder 480 in FIG. 30. As will be seen from FIGS. 19a and b, the inputs into the slit sum circuitry for slit $-1$ are the contents of the column scanner 449 in row $R+3$ and row $R+2$, with the contents in row $R+2$ being latched from three preceding columns to be compared with both the contents of row $R+2$ and row $R+3$ in the column incoming into the scan window. Row R, as was the case with the discussion of slit sum $+1$, is arbitrarily selected as the row position of the center data element C in the row in which the final input to the slit sum $+1$ is received. In the case of slit sum for slit $+1$, this is shown in FIG. 19b as the magnitude subtraction between the data elements in row $R+2$, column 21 of the image and row $R+3$, column 24 of the image. The slit sums for the left side of the slit $-1$ are accumulated first, as can be seen from FIG. 19b, because the scan window first encounters data elements in the slit $-1$ in the manner shown in FIG. 19a when the center data element of the data window is in the position $C''''''$ in row $R-5$, column $-9$. When the center data element $C''''''$ has moved two more columns to the right, the output of an adder in the slit sum circuitry for slit $-1$, like adder 480, is the first group of three magnitude subtractions. When the center data element of the scan window is in a position one row below, in row $R-4$, and one column to the right, column $-8$, of the position $C'''''$, the output of an arithmetic logic unit calculating the magnitude subtraction between the data elements disposed in the positions row $R-3$, column 6 and row $R-3$, column 3 as shown in FIG. 19b is a portion of the slit sum for slit $-1$. The sum of the group three when the center data element was in the position $C'''''$ in FIG. 19b is thus delayed for 1,048 clock periods (corresponding to the column counter counting 1024 columns and being suppressed in the border 280) and added to the output of the arithmetic logic unit performing the magnitude subtraction for the data elements in the positions corresponding to row $R-3$, column 6 and $R-3$, column 3, as shown in FIG. 19b. This sum is then delayed for a total of four clock periods and is added to a second sum of three for the position of the center data element in the location $C''''$, row $R-4$, column $-3$, as shown in FIG. 19b. This added sum is then delayed and added to the sum of the group of three when the center data element is in a position $C'''$ in row $R-3$, column 0, as shown in FIG. 19b. This comprises the sum of the left half of slit $-1$ for the center data element in the position C as shown in FIG. 19b. For the center data element in the position $C''$ in row $R-2$, column 5, a group of three is summed, the result of which is delayed until the center data element is in the position C' shown in FIG. 19b at row R−1, column 8 at which time the previous sum of three from the center data element position C" is added to form a group of six. With the center data element in a position three columns to the left of that shown for the center data element C in FIG. 19b, the output of the arithmetic logic unit computing the magnitude subtraction for the positions corresponding to those of row R+2, column 21 and row R+2, column 18, as shown in FIG. 19b, comprises a portion of the slit sum −1 for the center data element in the position C. The sum of six magnitude subtractions comprising the total of the two groups of three for the center data element positions C" and C' is delayed until the center data element for the scan window is one row below the position C', i.e., for 1,048 clock periods and added to the output of the arithmetic logic unit. This sum of two groups plus one magnitude subtraction is delayed for three clock periods, i.e., to the center data element position C as shown in FIG. 19b. This sum of six plus one is then added to the output of the adder comprising the final group of three magnitude subtractions for the slit −1 with the center data element in position C in FIG. 19b.

5.b.6. Slit +2

Figure 20A:
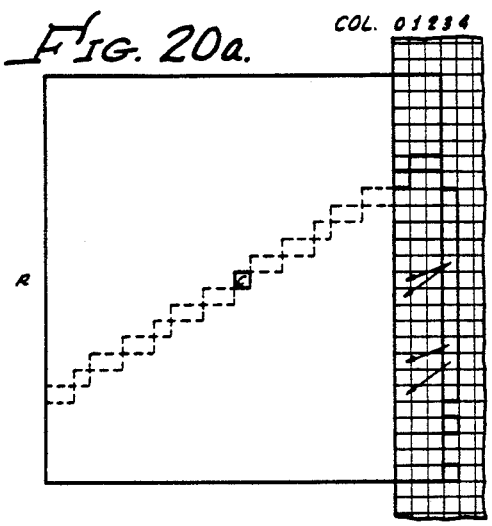
FIGS. 20a-e illustrate the slit summing for slit +2.

Turning now to FIGS. 20a–e and 31, the slit summing mechaniziation for the slit +2 may be seen. As is shown in FIG. 20a, the slit summing for the slit +2 employs output data from the column scanner 449 from six different rows. These correspond to rows R−1, R−2, R, R+4, R+5 and R+7 with the center data element C positioned in row R as shown in FIG. 20a. The output of the column scanner 449 for rows R−2 and R−1 form the input to a latching and arithmetic logic unit circuit 600 similar to the one described above with respect to slit +1, the output of which corresponds to the magnitude substrations between data elements in R−2, column $C_n$ and R−1, column $C_{n-3}$. The output of the column scanner 449 for row R−1 also forms the input, along with the output of the column scanner 449 for row R, to another latching and arithmetic logic unit circuit 601, the output of which is the magnitude subtraction between data elements in positions row R−2, column $C_n$ and row R, column $C_{n-3}$.

For slit sum +2, magnitude subtractions are summed together, as will be explained below, in groups of five. It will be seen in FIG. 20b that the first two magnitude subtractions summed together for an upper group of five are the output of the circuitry 600 and the output of the circuitry 601 one column earlier. Thus, the output of the circuitry 601 is latched in a latch 602 and added to the output of the circuitry 600 in an adder 603.

Returning to FIG. 20a, the lower group of magnitude subtractions are between the data elements in row R+4, column 3 and R+5, column 0, and R+5, column 3, and R+7, column 0 for the center data element C in the position shown in FIG. 20a. The outputs of the column scanner circuit 449 for rows R+4 and R+5 are fed to a latching and arithmetic logic unit circuit 604, the output of which is the magnitude subtraction for data elements in row R+4, column $C_n$ and R+5, column $C_{n-3}$. The outputs of the column scanner 449 for rows R+5 and R+7 are fed to a similar latching and arithmetic logic unit circuit 605, the output of which is the magnitude subtraction for the data elements in rows R+5, column $C_n$ and R+7, column $C_{n-3}$. It will be seen in FIG. 20b, that the first two magnitude subtractions summed together to form the lower group of magnitude subtractions is the output of the circuitry 605 for two succeeding column positions. Thus, the output of the circuitry 605 is latched in a latch 606 and added to the output of the circuitry 605 in an adder 607.

Figure 20D:
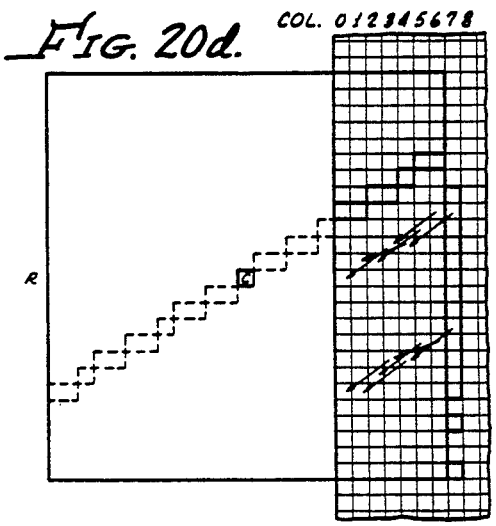
Figure 20B:
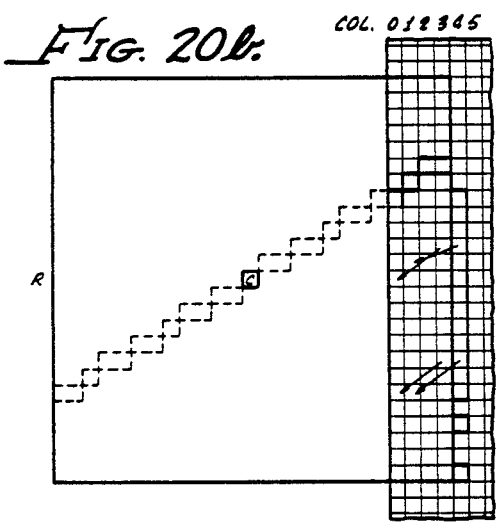
Figure 20E:
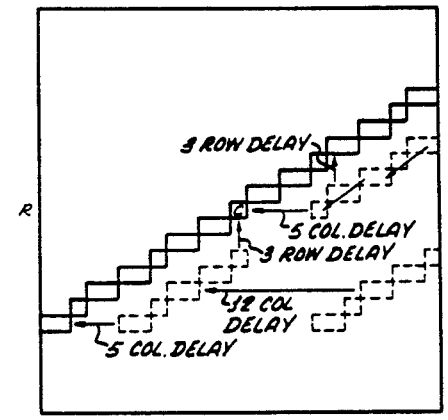
Figure 20C:
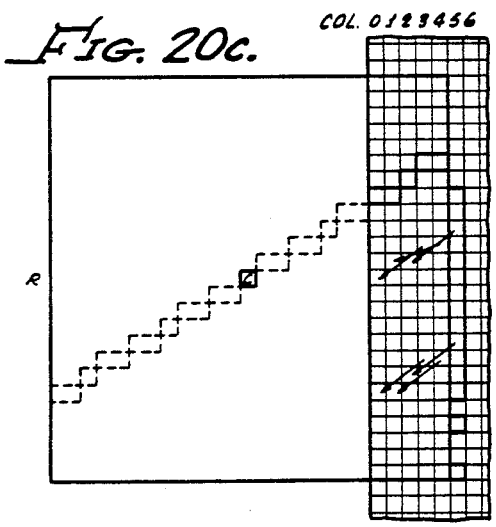

Turning now to FIG. 20c, it will be seen that to the upper group of two magnitude subtractions, formed as just explained, a magnitude subtraction for when the center data element of the scan window was one row above and two columns to the right of its present position is added. Thus, the output of the circutry 601 is passed through a one row less two column delay 608 and added to the output of the adder 603 in an adder 609. It will also be seen that for the lower group, the output of the circuitry 605 for when the center data element was one row above and one column to the right of its present position is added to the lower group. Thus, the output of the circuitry 605 is passed through a one row less one column delay 610 and added to the output of the adder 607 in an adder 611.

Turning now to FIG. 20d, the last two magnitude subtractions for each of the upper and lower groups are shown. For the upper group, these two include the magnitude subtractions between the data elements in row R−4, column 7 and row R−2, column 4 and for row R−4, column 6 and row R−2, column 3. It will be seen that the former of these is the output of the circuitry 601 when the center data element of the scan window was two rows above and two columns to the left of its present position. Therefore, the output of the one row less two column delay circuit 608 is delayed an additional row in delay circuit 612 and added to the output of the adder 609 by an adder 613. It will also be seen, that the other of the two last magnitude subtractions forming the upper group of five is the output of the circuitry 601 when the center data element of the scan window was two rows above and one column to the left of the position shown in FIG. 20d. Thus, the output of the delay circuit 612 is delayed for one clock period in a latch 615 and added to the output of the adder 613 in an adder 616, to form a sum of five magnitude subtractions.

It will be seen, that the first of the two final magnitude subtractions comprising the lower group shown in FIG. 20d constitutes the output of the circuitry 604 when the center data element was one column to the left of that shown in FIG. 20d. Thus, the output of the circuitry 604 is latched in a latch 614 and added to the output of the adder 611 in an adder 617. Similarly, it will also be seen, that the final magnitude subtraction for the lower group comprises the output of the circuitry 605 when the center data element was in a position two rows above its present position. Thus, the output of the one row delay circuit 610 is delayed an additional row in a delay circuit 618, the output of which is added to the output of adder 617 in an adder 619 to produce a sum of five for the bottom group, as shown in FIG. 20d.

Reference to FIG. 20d and FIG. 20e shows that when the scan window is moved one column to the right of its position shown in FIG. 20d, the upper group of five constitutes the group of five data elements which corresponds to the upper half of the right side of the slit +2 when the center data element is three rows below the position shown in FIG. 20e. In addition, this upper group of five will constitute the lower portion of the right side of slit +2 when the center data element has moved six columns to the right of its position shown in FIG. 20d, i.e., five columns to the right of the position shown in FIG. 20e. Thus, the output of the adder 616 constituting the upper sum of five is the input to a six column delay 620 and is also the input to a three row plus one column delay 621, the outputs of which are added in an adder 622 to comprise the sum of ten for the right side of slit +2 for the center data element in the position row R, column 0 as shown in FIG. 20d.

Similarly, it can be seen from FIGS. 20d and 20e, that the lower group of five data elements will comprise the bottom half of the left side of the slit +2 when the center data element has moved eighteen columns to the right of its present position shown in FIG. 20d. In addition, when the center data element has moved thirteen columns to the right of its present position shown in FIG. 20d and three rows down, the lower group of five data elements shown in FIG. 20d will comprise the upper half of the left side of the slit +2 for that location of the center data element C. Thus, with the center data element in the position row R+3, column 7, the lower group of five data elements shown in FIG. 20d is the upper half of the left side of the slit +2 and with the center data element in the position row R, column 13, the lower group of five data elements shown in FIG. 20d is the lower half of the left side of the slit +2.

Thus, the output of the adder 619, comprising the sum of the lower group of five data elements is the input to a three row plus thirteen column delay 623 and is also the input to an eighteen column delay 624. The output of the delay circuits 623 and 624 are added in an adder 625 to form a sum of ten for the left side of slit +2. The output of the adder 625 and the output of the adder 622 are added together in an adder 626. The output of the adder 626 during each clock period is, therefore, the slit sum for slit +2 for a respective position of the center data element in the image array 260.

5.b.7. Slit −2

Figure 21A:
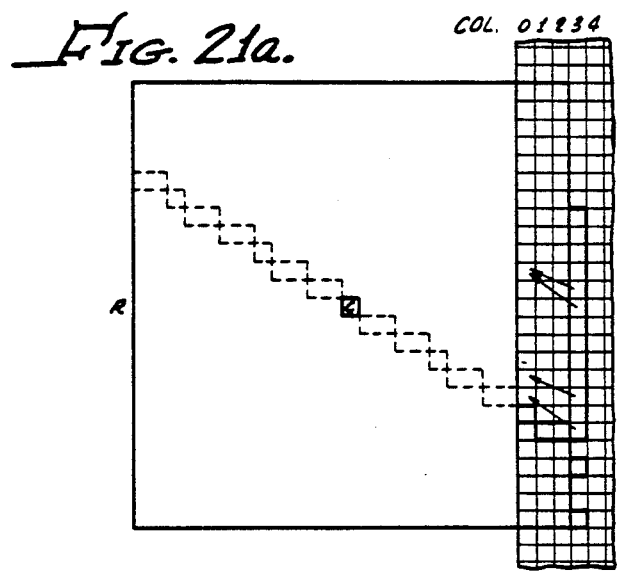
FIGS. 21a-c illustrate the slit summing for slit −2.
Figure 21B:
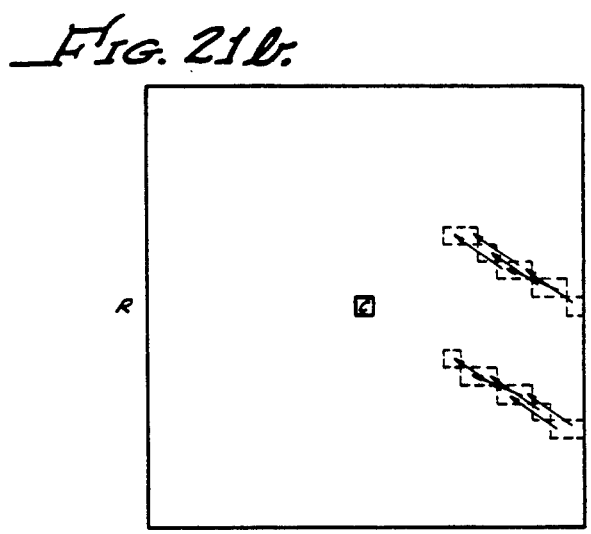
Figure 21C:
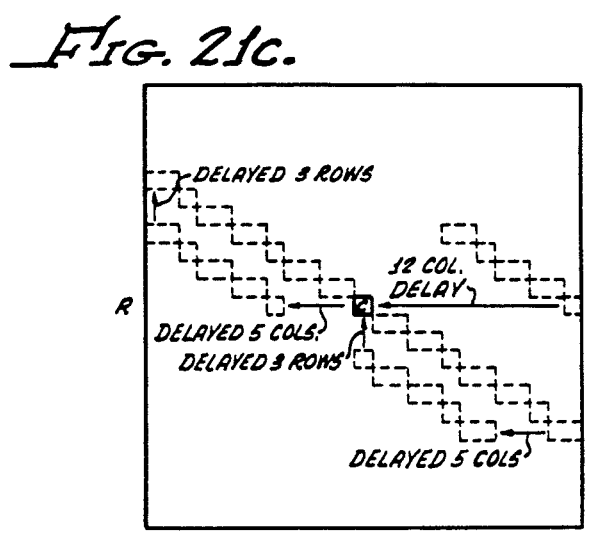

Turning now to FIGS. 21a–c, it will be seen that the slit sum for slit −2 is accumulated in a fashion very similar to slit +2. The circuitry for mechanizing the slit sum for the slit −2 is, therefore, not disclosed in detail. Six row locations from the column scanner 449 are employed as is shown in FIG. 21a, as was also the case with the slit summing for slit +2. These rows are R−2, R−1, R, R+4, R+5 and R+7. The magnitude subtractions are grouped, as shown in FIG. 21b, into upper and lower groups of five in a manner quite similar to that shown with respect to slit +2. As is shown in FIG. 21c, the upper group when delayed 12 columns comprises the lower half of the left side of the slit −2 for a center data element C as shown in FIG. 21c. Also, when delayed seventeen columns and three rows, the upper group comprises the upper half of the left side of the slit −2.

It will be seen from FIG. 21c that the lower group comprises the lower half of the right side of the slit −2 for the center data element shown in the position C in FIG. 21c. Also when delayed five columns and three rows the lower group comprises the upper half of the right side of the slit −2 for the center data element C as shown in FIG. 21c. The group of five output from an adder which is the final accumulation of the group of five for the upper group of five, as shown in FIG. 21b, forms the lower half of the left side of the slit −2. The final accumulation of the upper group of five is the input to a 12-column delay and the input to a 17-column and three-row delay, the outputs of which are added in an adder to form the sum of ten for the left half of slit −2.

5.b.8. Slit +3

Referring now to FIGS. 22a–d and 32, the slit summing for the slit +3 and the mechanization thereof are shown. The output of the column scanner 449 is sampled for row R+1, R+4, R+9 and R+12 as is shown in FIG. 22a. The output of the column scanner for rows R+1 and R+4 are fed into a latching and arithmetic logic unit circuit 630 similar to that shown in FIG. 30 for slit sum +1, with the resultant output being the magnitude subtractions for the row R+1, column $C_n$ minus a data element in R+4, column $C_{n-3}$. As is shown in FIG. 22b, this output is required to be added to the output of the circuit 630 when the center data element of the scan window was in a position one row above and one column to the right of the position shown in FIG. 22a. Thus, the output of the circuit 630 is the input to a one row, minus one column delay 632. The output of the delay circuit 632 is added to the output of the circuit 630 in an adder 633 to form an upper group of two magnitude subtractions.

The output of the column scanner for rows R+9 and R+12 are similarly fed into a latching and arithmetic logic unit circuit 631, the output of which is the magnitude subtraction for the data elements in row R+9, column $C_n$ and R+12, column $C_{n-3}$. It will be seen by looking at FIG. 22a in conjunction with FIG. 22b, that the first combination of magnitude subtractions performed in assembling a lower group of eight magnitude subtractions is accomplished by first forming a group of two by delaying the output of the circuit 631 by one row minus one column in a delay circuit 634 and adding the output of the delay circuit 634 to the output of the circuit 631 in an adder 635.

Referring to FIG. 22c, it can be seen that a lower group of eight magnitude subtractions may be obtained by first delaying the output of the adder 635 by two rows minus two columns in a delay circuit 636 and adding the output of the delay circuit 636 to the output of the adder 635 in an adder 637. Second, the output of the adder 637 is delayed four rows minus four columns in a delay 638 the output of which is added to the output of the adder 637 in an adder 639 to form a lower group of eight magnitude subtractions. As a final step in the procedure of forming the ten necessary magnitude subtractions for one-half of the slit +3, the upper group of two magnitude subtractions comprising the output of the adder 633 is delayed eight columns and added to the output of the adder 639. It will be seen by reference to FIGS. 22c and 22d, that by delaying the output of the adder 633 for eight columns in an eight column delay circuit 640 and combining this in an adder 641 with the output of the adder 639, the output of the adder 641 will comprise a sum of ten magnitude subtractions for data elements in a diagonal line coinciding with slit +3.

Reference to FIG. 22d shows that this output of the adder 641 comprises both the left-hand side of slit +3 for a center data element positioned twelve columns to the right of the position shown in FIG. 22d and the right side of the slit +3 for a center data element positioned in a position twelve rows below the position shown in FIG. 22d. Thus, the output of the adder 641 forms the input of a twelve row delay 642 and a twelve column delay 643. The outputs of which are added in an adder 644 to form the slit sum for the slit +3.

5.b.9. Slit −3

Figure 23A:
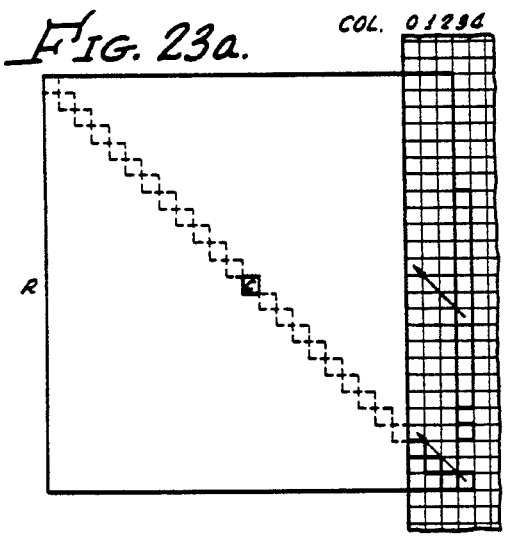
FIGS. 23a-d illustrate the slit summing for the slit −3.
Figure 23D:
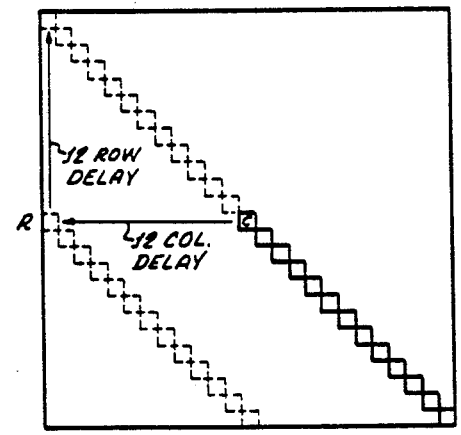
Figure 23B:
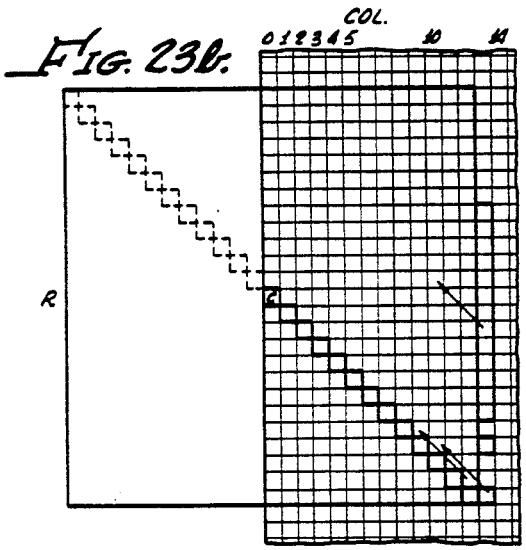
Figure 23C:
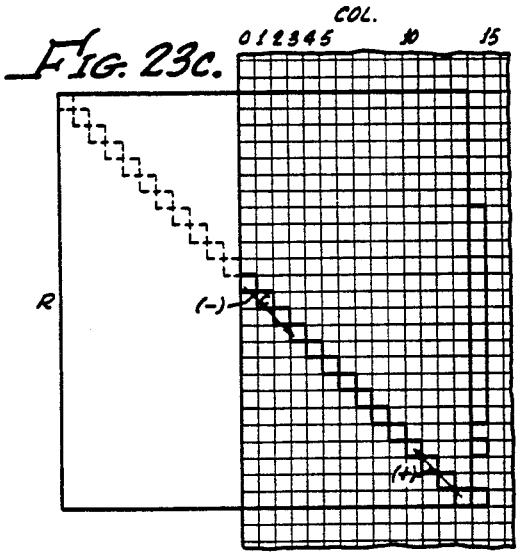

Referring now to FIGS. 23a–d and FIG. 33, the slit summing for the slit −3 and the mechanization thereof are illustrated. The sum for the slit −3 is calculated using the inputs from the column scan circuit 449 for rows R+9 and R+12 and rows R−1 and R+2 as shown in FIG. 23a. The output of the column scanner for rows R+9 and R+12 form the input to a latching and arithmetic logic unit circuit 649, the output of which is the magnitude subtraction for the data elements in row R+9, column $C_n$ minus row R+12, column $C_{n-3}$. This output is the input to a latch 650 which gives a one column delay. It will be seen that a second magnitude subtraction along the slit −3 is accomplished when the center data element of the scan window is one row below and one column to the right of the position in which it is shown in FIG. 23a. Thus, by accumulating the value for the magnitude subtractions when the center data element of the scan window was in the previous row and the previous column from its present position, and latching the output of the circuit 649 for one clock period in the latch 650, an accumulation of magnitude subtractions for data elements along the diagonal for the slit −3 may be made on a row-by-row basis. If, however, this were allowed to continue throughout the incrementing of the scan window through the data image, the value stored in memory would constitute an updated value for all magnitude subtractions for data elements along a diagonal running through the entire image. As has been explained above, the definition of the slit sum for purposes of the preferred embodiment of the present invention does not include the data elements which bracket the center data element. Thus, it is desirable to limit the accumulation of magnitude subtractions along the diagonal of the slit −3 to a total of ten. It will also be seen from FIGS. 23a–d that the magnitude subtraction output from the circuit 651, i.e., (row R+2, column $C_n$ minus row R−1, column $C_{n-3}$), when the center data element of the scan window is moved twelve columns to the right, is the magnitude subtraction which it is desired to remove from the accumulated magnitude subtractions in order to limit the sum of the magnitude subtractions to ten magnitude subtractions for a slit −3 with the center data element in row R, column 1 as shown in FIG. 23c.

The mechanization for the slit summing of slit −3 can be better understood by referring to the block diagram of FIG. 33. The output of the circuit 651 is the input to a twelve column delay 652, the output of which is subtracted from the output of the latch 650 in a subtractor 653. The output of the subtractor 653 forms one input to an adder 654. A second input to the adder 654 is from a transparent latch 656 which is enabled during the first half of each clock period. The transparent latch reads a memory location in a memory 655 corresponding to the sum of 10 computed at an earlier time when the center data element was one row above and one column to the left of its current location. The output of the adder 654 forms an input to an edge-triggered latch 657. The output of the edge-triggered latch 657 forms a sum of ten which is stored in a feedback buffer 658 which is enabled during the second half period of the clock period to give a one-column delay, and which then forms an input to be read into the memory location of the memory 655 at the column address from which the previous sum of ten was just read to give a one-row delay. In this manner, as illustrated in FIG. 23c, the sums of ten magnitude subtractions are accumulated and stored for each column of the data image during the scanning of each row with the stored data having the necessary offset of one row and one column.

This sum of ten magnitude subtractions, as can be seen from FIG. 23d constitutes the right-hand side of the slit −3 for the center data element shown in the position of FIG. 23d. Also FIG. 23d shows that the left-hand side of slit −3 was the output of the edge-triggered latch 657 when the center data element of the scan window was twelve columns to the left and twelve rows above the position shown in FIG. 23d. Thus, the output of the edge-triggered latch 657 is the input to a twelve column, twelve row delay circuit 660, the output of which is added to the output of the edge-triggered latch 657 in an adder 664 to form the slit sum −3.

5.b.10. Slit +4

Figure 24A:
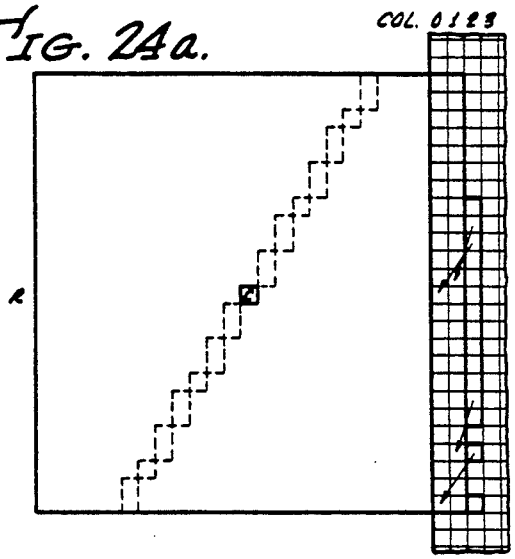
FIGS. 24a-c illustrate the slit summing for the slit sum +4.
Figure 24B:
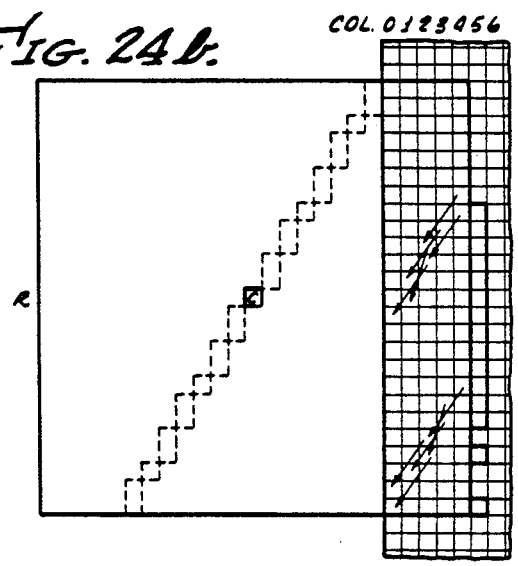

Turning now to FIGS. 24a–c and FIG. 34, the slit summing for the slit +4 is illustrated. It will be seen that the slit summing for slit +4 is accomplished in a manner quite similar to the slit summing for slit +2. The output of the column scanner 449 is read for the rows R−4, R−3, R−1 and R in order to form an upper group of five as explained earlier with respect to slit sum +4. In addition, the output of the column scanner 449 is read for the rows R+6, R+9 and R+12 in order to form a lower group of five magnitude subtractions in a manner described with respect to slit sum +4. These upper and lower groups of slit sums are illustrated in FIG. 24b.

Figure 24C:
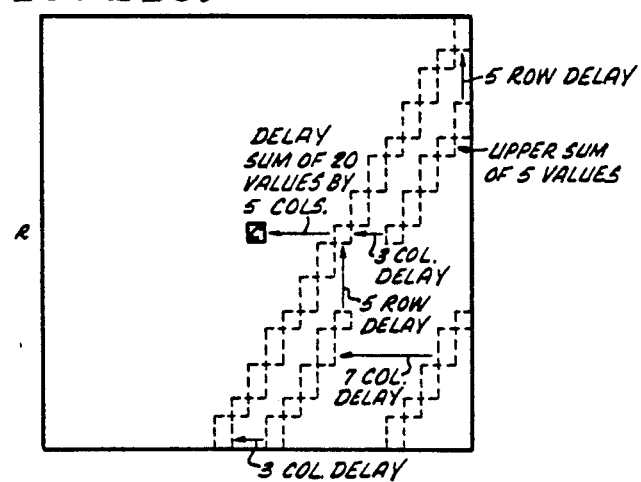

FIG. 24c illustrates that when the center data element of the scan window is in the position C shown in FIG. 24c, the lower sum of five constitutes the lower half of the left side of slit +4 for a center data element which is positioned fifteen columns to the right of the position shown in FIG. 24c. In addition, the lower sum of five values constitutes the upper half of the left side of the slit +4 for a center data element positioned five rows below and seven columns to the right of the position shown in FIG. 24c. Thus, by delaying the lower sum of five for a seven column, five row delay and for a ten column delay, the left-hand side of a slit +4 is formed. This is shown in FIG. 34 where the lower sum of five is the input to a seven column delay 670, the output of which is the input to a three column delay 671 and a five row delay 672 the outputs of which are added in an adder 675.

Similarly, the upper group of five can be seen to be brought into alignment with the left-hand side of a slit +4 by being delayed for three columns and also being delayed for five rows. Thus, the upper sum of five is the input to a five row delay 673 and a three column delay 674. The outputs of the delay circuits 673 and 674 are added in an adder 676. The output of the adders 675 and 676 are added in an adder 677 to form the sum of the twenty magnitude subtractions for the right-hand and left-hand sides of a slit +4. It will be seen from FIG. 24c that this value must be delayed a further five columns to form the magnitude subtractions for a slit +4 reflective about a center data element within a scan window. The output of the adder 677 is fed to a five column delay 678, the output of which is the slit sum for slit +4.

5.b.11. Slit +4

Figure 25:
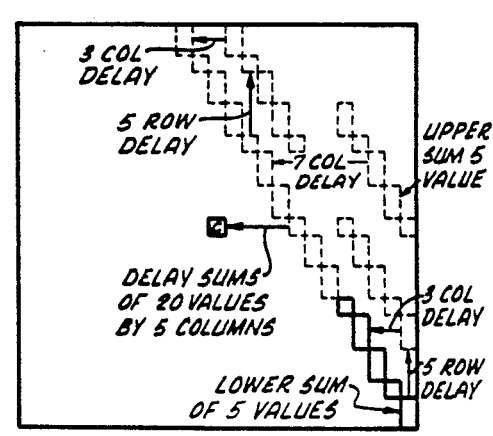
FIG. 25 illustrates the slit summing for the slit −4.

FIG. 25 illustrates the slit summing for the slit −4, which is similar to that of slit +4. The specific circuitry for the slit −4 is, therefore, not shown. The upper sum of five is seen to constitute the lower half of the left side of slit −4 when the center data element is moved seven columns to the right of the position shown in FIG. 25. It also comprises the upper half of the slit +4 when the center data element is moved ten columns to the right and five rows down. The lower group of ten comprises the lower half of the right side of the slit −4 for the center data element positioned as shown in FIG. 25. It also comprises the upper half of the right side of slit −4 when the center data element has moved five rows down and three columns to the right. Using suitable delay circuitry and adders, these four different groups of five are combined to form an aligned slit $-4$, which is then delayed by five columns to be aligned with a center data element of a scan window.

5.b.12. Slit $+5$

Figure 26A:
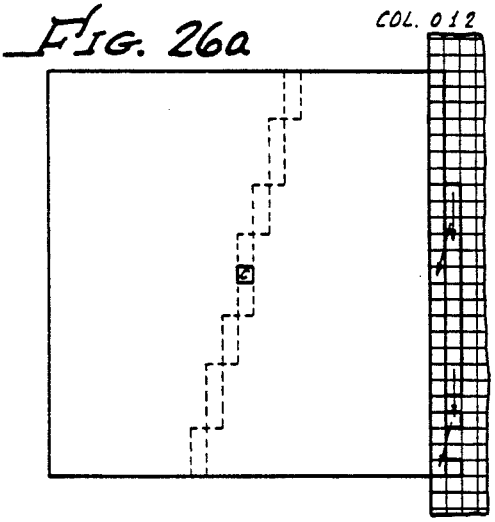
FIGS. 26a-d illustrate the slit summing for slit +5.
Figure 35:
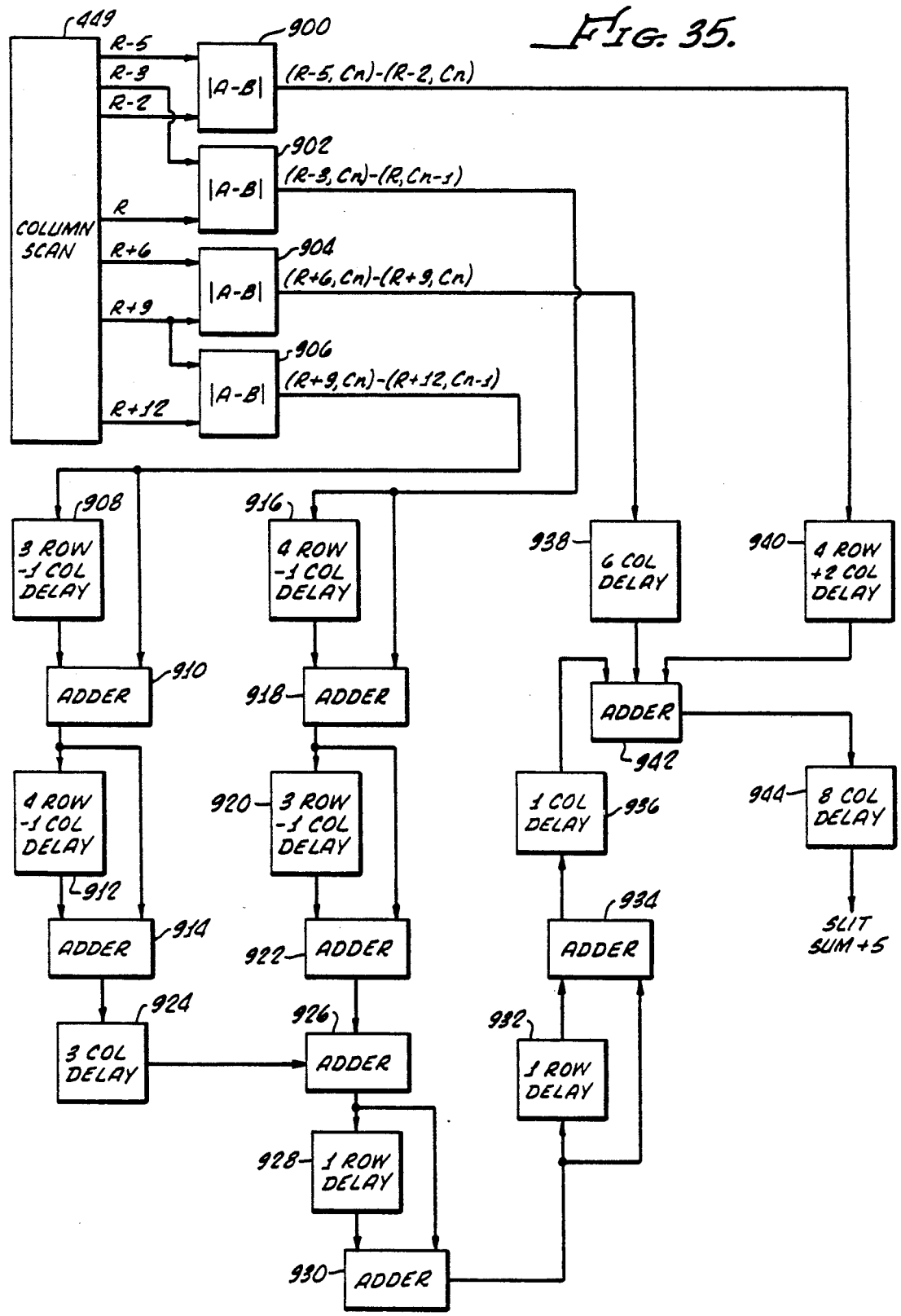
FIG. 35 shows the slit summing circuitry for slit +5.
Figure 36:
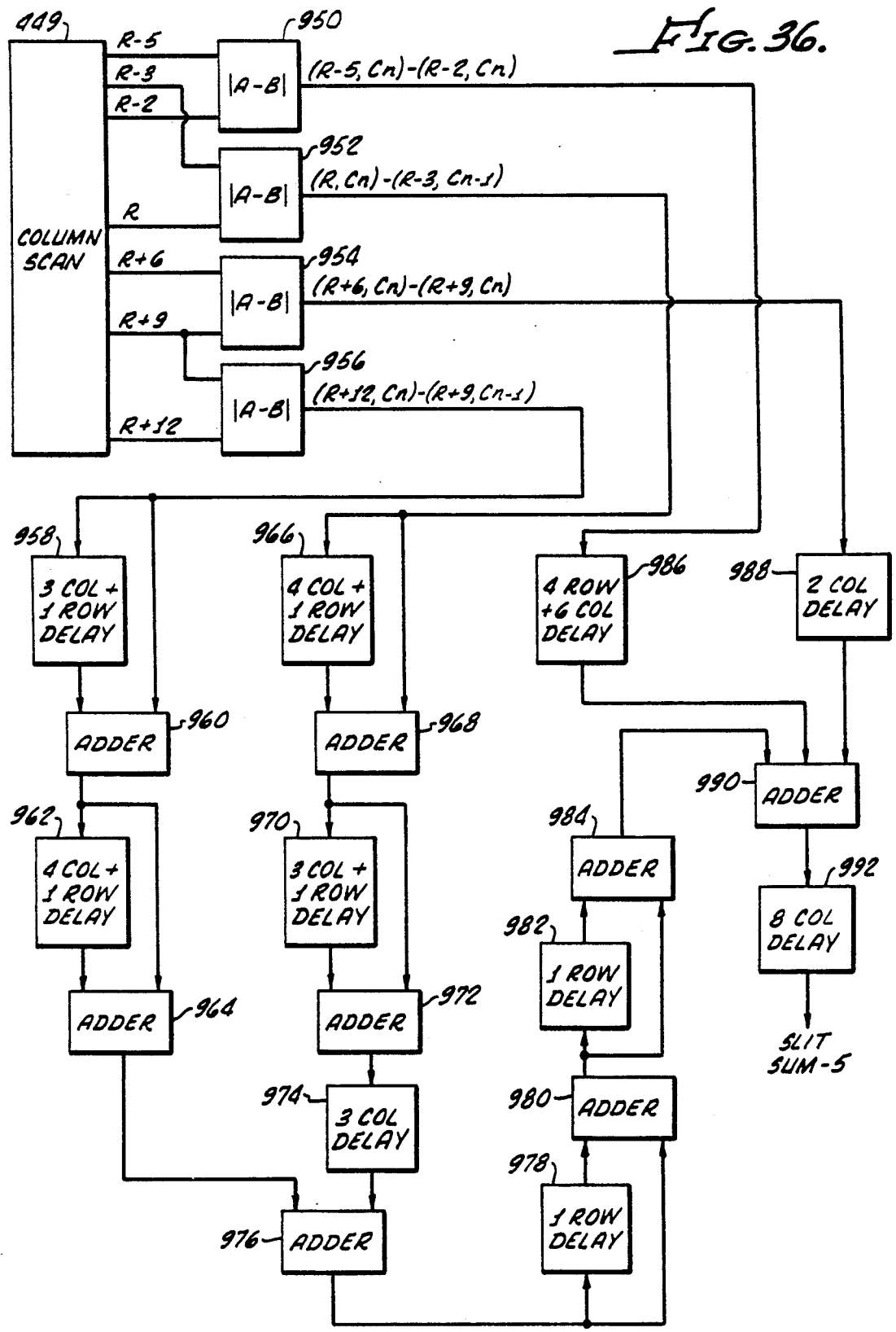
FIG. 36 shows the slit summing circuitry for slit −5.

Turning now to FIGS. 26a, b, c, d and e, and FIG. 35, the slit summing for slit $+5$ and the mechanization thereof are illustrated. The slit summing circuitry for slit $+5$ employs the output of the column scanner for rows $R-5$, $R-3$, $R-2$, R, $R+6$, $R+9$ and $R+12$. FIG. 26a shows that the magnitude subtractions employed are between rows $R-5$ and $R-3$, rows $R-2$ and R, rows $R+6$ and $R+9$, and rows $R+9$ and $R+12$. The outputs of the column scanner 449 for row $R-5$ and row $R-2$ form the inputs to an arithmetic logic unit 900, the output of which is the magnitude subtraction for the data elements in row $R-5$, column $C_n$ and $R-2$, column $C_n$. The outputs of the column scanner 449 for rows $R-3$ and R form the inputs to a latching and arithmetic logic unit 902, the output of which is the magnitude subtraction for the data elements in row $R-3$, column $C_n$, and row R, column $C_{n-1}$. The output of the column scanner for row $R+6$ and $R+9$ form the input to an arithmetic logic unit 904, the output of which is the magnitude subtraction for the data elements in row $R+6$, column $C_n$ and row $R+9$, column $C_n$. The output of the column scanner 449 for row $R+9$ and $R+12$ form the input to a latching and arithmetic logic unit 906, the output of which is the magnitude subtraction for the data elements in row $R+9$, column $C_n$ and row $R+12$, column $C_{n-1}$.

Figure 26D:
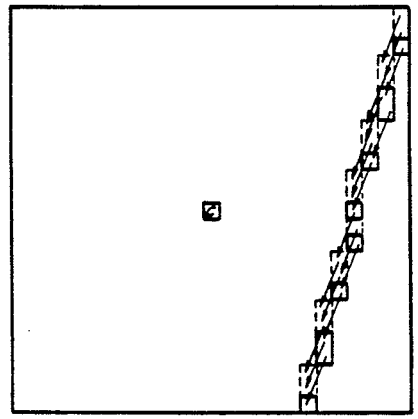
Figure 26B:
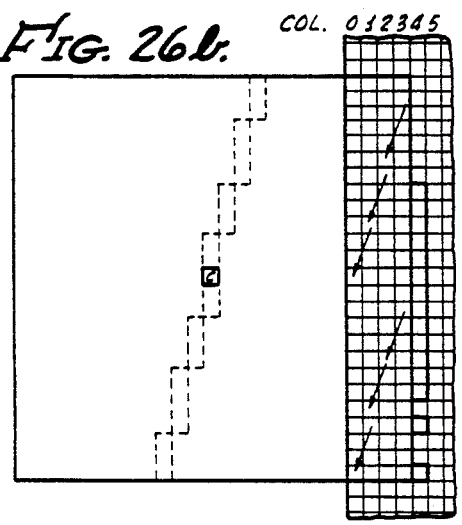

FIG. 26b illustrates that the slit sum for the slit $+5$ is formed by accumulating an upper group and a lower group in a manner previously described. The upper group of three magnitude subtractions comprises the output of the latching and arithmetic logic unit circuitry 902 for three positions of the center data element C. Thus, the output of the latching and arithmetic logic unit circuit 902 is the input to a three-row $-1$ column delay 908, the output of which is added in an adder 910 to the output of the arithmetic logic unit circuitry 906. The output of the adder 910 is the input to a four-row $-1$ column delay 912, the output of which is added in an adder 914 to the output of the adder 910. Similarly, the lower group of three is formed by inputting the output of the latching and arithmetic logic unit circuitry 902 to a four-row $-1$ column delay 916, the output of which is added in an adder 918 to the output of the latching and arithmetic logic unit circuitry 902. The output of the adder 918 is the input to a three-row $-1$ column delay 920, the output of which is added in an adder 922 to the output of the adder 918.

Figure 26E:
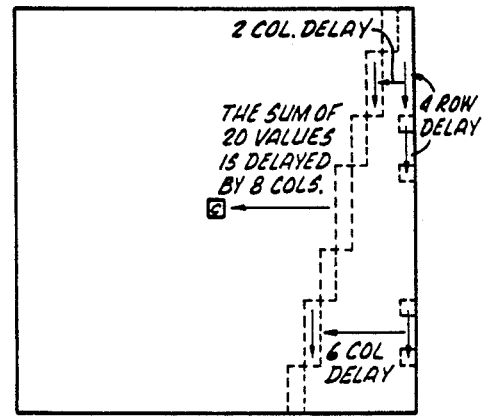
Figure 26C:
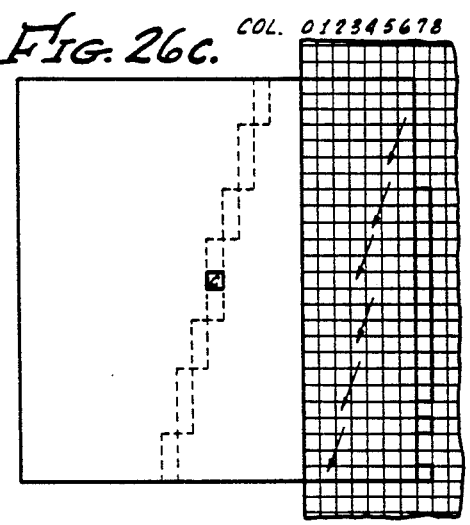

FIG. 26c illustrates that the output of the adder 914 forming a group of three magnitude subtractions for the lower half of the slit $+5$ must be delayed three columns in order to be properly aligned with the upper group of three magnitude subtractions to form magnitude subtractions within a particular slit $+5$. Thus, the output of the adder 914 is the input to a three-column delay 924, the output of which is added to the output of the adder 922 and an adder 926. FIG. 26d illustrates that the resulting group of six magnitude subtractions forming the output of the adder 926 can be assembled into a group of 18 magnitude subtractions forming 18 of the magnitude subtractions for the slit $+5$ by delaying the output of the adder 926 for one row in a one-row delay 928 and adding the output of the adder 926 to the output of the one-row delay 928 in an adder 930, and similarly delaying the output of the adder 930 in a one-row delay 932 and adding the output of the adder 930 to the output of the one-row delay 932 in an adder 934. The output of the adder 934 is delayed one column in a one-column delay 936 in order to align this to the same center data element as the output of delays 538 and 940 discussed below. It will be seen from FIG. 26e that the output of the arithmetic logic unit 900 comprises the magnitude subtraction for data elements in the slit $+5$ when delayed four rows and two columns. Thus, the output of the arithmetic logic unit 900 is the input to a four-row and two-column delay 940, the output of which is the input to an adder 942. The output of the one-column delay 936 forms another input to the adder 942. Similarly, the output of the arithmetic logic unit 904 is the magnitude subtraction for data elements within the slit $+5$ when delayed six columns as shown in FIG. 26e. Thus, the output of the arithmetic logic unit 904 forms the input to a six-column delay 938, the output of which is an input to the adder 942. The output of the adder 942 comprises the 20 magnitude subtractions for the slit sum for a slit $+5$ for the center data element C shown in FIG. 26e when delayed in an eight-column delay 944 for eight columns. The output of the eight-column delay 944 is the slit sum for the slit $+5$.

5.b.13. Slit $-5$

Turning now to FIGS. 27a–d and 36, there is shown the illustration of the slit summing for the slit $-5$ and the mechanization thereof. The slit summing for the slit $-5$ employs the output from the column scanner 449 for rows $R-5$, $R-3$, $R-2$, R, $R+6$, $R+9$ and $R+12$. As can be seen from FIG. 27a, the output of the column scanner 449 for rows $R-5$ and $R-2$ form a magnitude substraction in the same column. Thus, the output of the column scanner 449 for rows $R-5$ and $R-2$ form the input to an arithmetic logic unit 950, the output of which is the magnitude subtraction for the data elements in row $R-5$, column $C_n$ and row $R-2$, column $C_n$.

In addition, the output for row $R-3$ is delayed for one column and is part of the magnitude subtraction between the data element in row $R-3$ and the data element in row R in the next column. Thus, the output of the column scanner 449 for rows $R-3$ and R form the input to a latching and arithmetic logic unit 952, the output of which is the magnitude substraction for the data elements in row R, column $C_n$ and row $R-3$, column $C_{n-1}$. It will also be seen from FIG. 27a that the magnitude subtraction between the data elements in row $R+6$ and $R+9$ in the same column is a magnitude subtraction employed in the slit $-5$. Thus, the output of the column scanner 449 for the rows $R+6$ and $R+9$ form the input to an arithmetic logic unit 954, the output of which is the magnitude subtraction between the data elements in row $R+6$, column $C_n$ and row $R+9$, column $C_n$. Finally, the magnitude subtraction between the data element in row $R+12$ and the data element in row $R+9$, delayed by one column, also form a magnitude subtraction used in constructing the slit sum for the slit $-5$. Thus, the output of the column scanner 449 for the data elements $R+9$ and $R+12$ form the input to a latching arithmetic logic unit 956, the output of which is the magnitude subtraction for the data elements in row $R+12$, column $C_n$ and row $R+9$, column $C_{n-1}$.

Figure 27A:
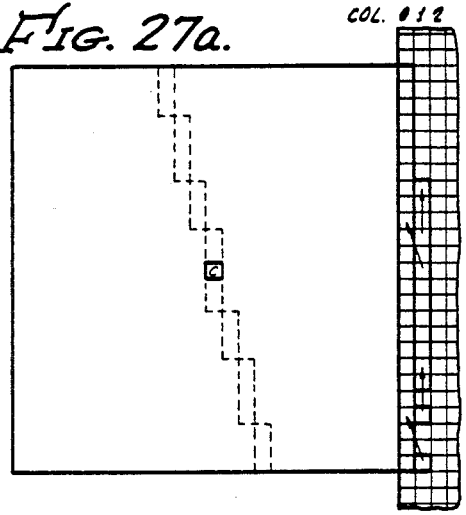
FIGS. 27a-d illustrate the slit summing for slit −5.
Figure 27D:
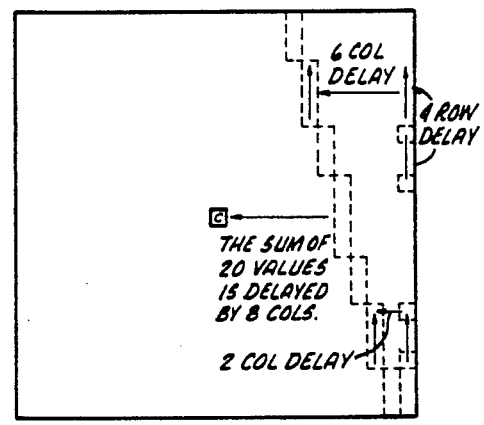
Figure 27B:
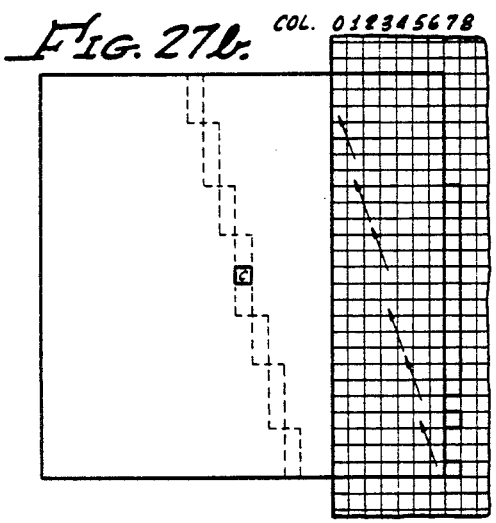
Figure 27C:
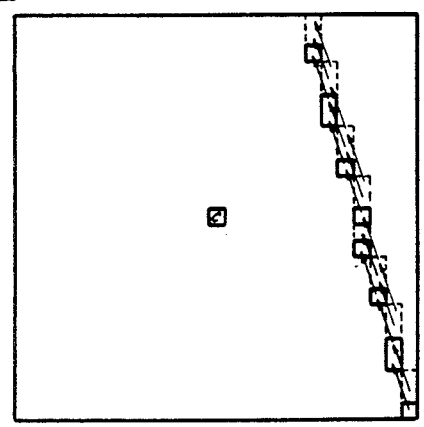
Figure 31:
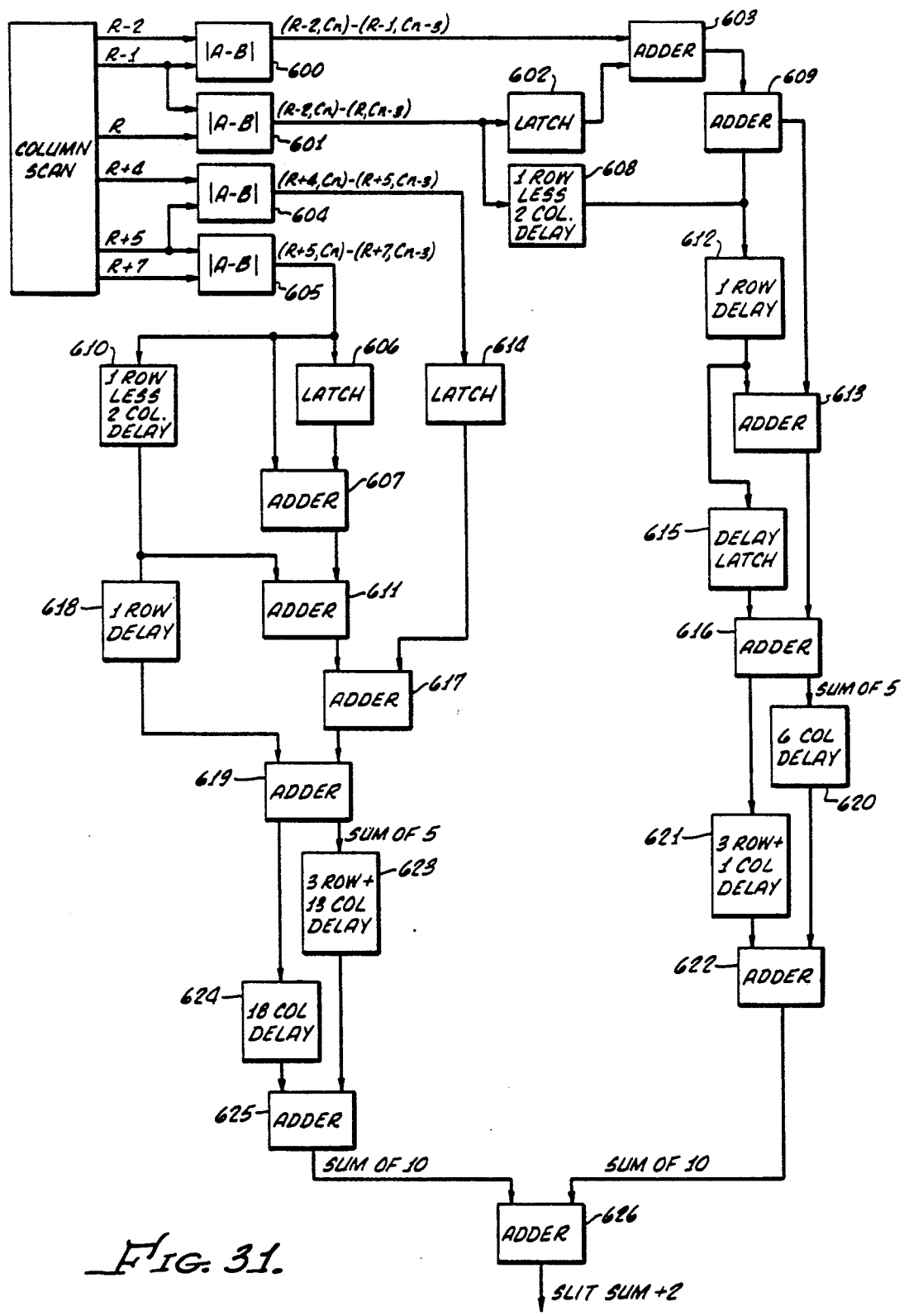
FIG. 31 shows the slit summing circuitry for slit +2.

FIG. 27b illustrates that the upper and lower groups of magnitude subtractions for the slit $-5$ are assembled in a fashion quite similar to the magnitude subtraction groups for the slit +5. Thus, the output of the latching and arithmetic logic unit 956 for the lower group is delayed in a three-column plus one-row delay 958, the output of which is added to the output of the latching and arithmetic logic unit 956 and an adder 960. The output of the adder 960 is delayed in a four column plus one row delay 962, the output of which is added to the output of the adder 960 and an adder 964. The output of the adder 964 is the group of three magnitude subtractions for the lower half of the slit −5 as shown in FIG. 27b. Similarly, the output of the latching and arithmetic logic unit 952 forms the input to a four-column plus one row delay 966, the output of which is added to the output of the latching and arithmetic logic unit 954 in an adder 968. The output of the adder 968 forms the input to a three-column plus one row delay 970, the output of which is added to the output of the adder 968 in an adder 972. The output of the adder 972 forms the group of three magnitude subtractions for the upper group, which must be delayed in a three-column delay 974 in order to align the upper group with the lower group as shown in FIG. 27b. As shown in FIG. 27c, the upper and lower groups may be combined with previous upper and lower groups in the previous two rows of the scanning of the preliminary direction estimate scan window. Thus, the output of the adder 976 is delayed by one row in a delay circuit 978, the output of which is added to the output of the adder 976 and an adder 980. The output of the adder 980 is also delayed one row in a one-row delay 982, the output of which is added to the output of the adder 980 in an adder 984. The output of the adder 984 forms a sum of 18 magnitude subtractions as shown in FIG. 27c and forms an input to an adder 990.

FIG. 27d illustrates that the output of the arithmetic logic unit circuit 950 forms a magnitude subtraction for a slit −5 when delayed four rows and six columns. Thus, the output of the arithmetic logic unit circuit 950 forms the input to a four-row plus six-column delay 986, the output of which is an input to the adder 990. Similarly, FIG. 27d illustrates that the output of the arithmetic logic unit 954 forms a magnitude subtraction for the slit −5 when delayed two columns. Thus, the output of the arithmetic logic unit 954 forms an input to a two-column delay 988, the output of which is another input to the adder 990. The output of the adder 990, as can be seen from FIG. 27d, must be delayed eight columns to form a slit sum for the slit −5 centered at a center data element C as shown in FIG. 27d. Thus, the output of the adder 990 is the input to an eight-column delay 992, the output of which is the slit sum for the slit −5.

5.c. Dynamic Range Computation

Figure 37:
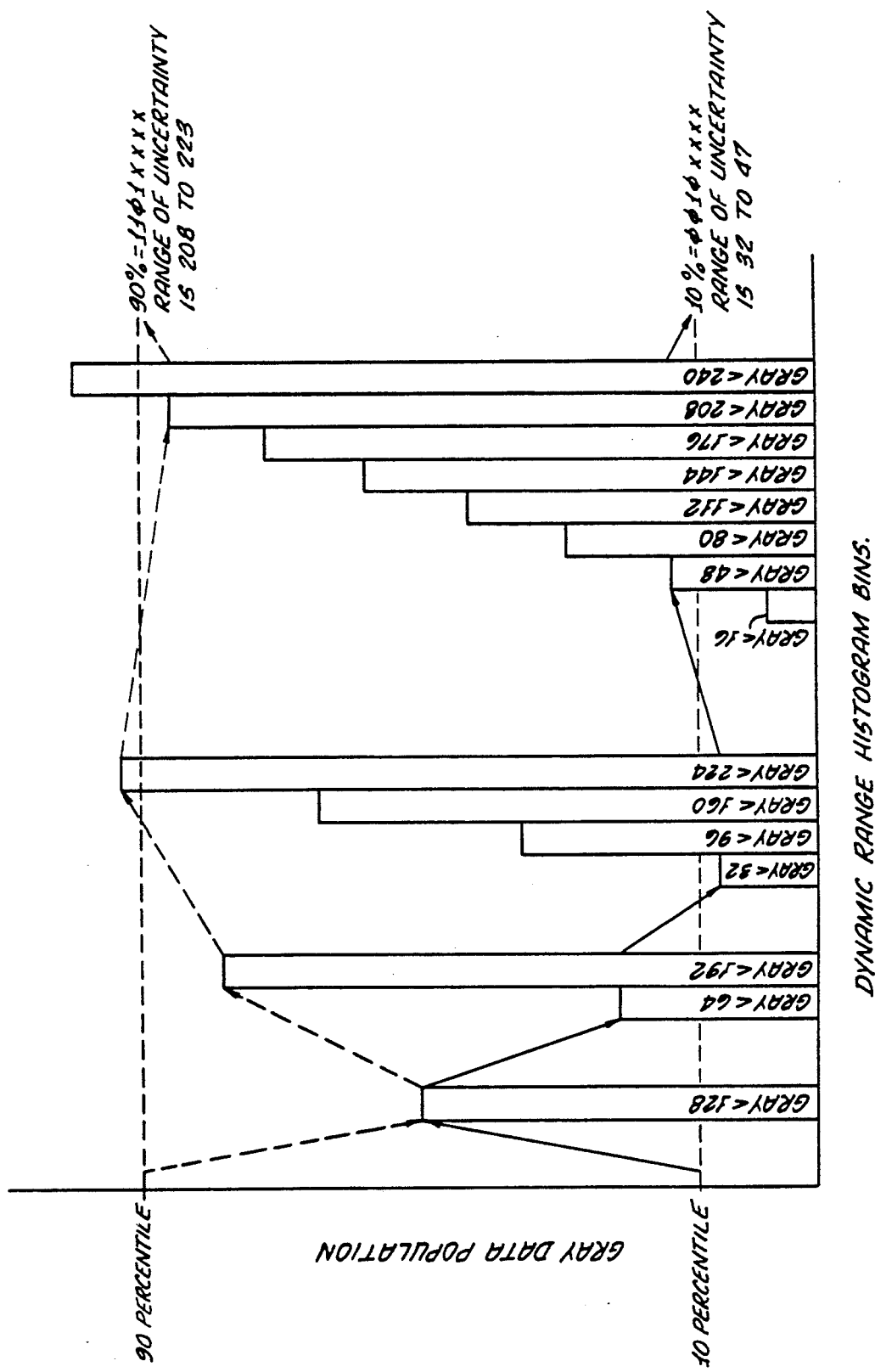
FIG. 37 illustrates a histogram employed in determining the dynamic range of intensity values for the data elements within a scan window.

In addition to the slit sum calculations, it is necessary according to the method and apparatus of the present invention to determine the dynamic range for all data elements within the scan window for each center data element in order to assign a preliminary direction estimate to the center data element. If the dynamic range within the scan window is insufficiently large, the locality of the center data element is quite likely one which does not have sufficient intensity contrast to confidently assign a direction to the center data element as a preliminary direction estimate. FIG. 37 shows graphically a manner in which the dynamic range is determined for each position of the scan window. The intensity values for each of the data elements in a 13×13 scan window centered on a center data element are formed into a histogram containing 15 bins, each representing the number of data elements having an intensity value less than a particular intensity value.

The dynamic range could be computed to the four least significant bits of data in the 8-bit byte, representing the full range of 0 to 255, by forming a histogram with 255 integrated bins. However, the dynamic range can be approximated to a sufficient degree of accuracy with less clock periods of computing time required and less computing operations required by forming a histogram as shown in FIG. 37. In the histogram of FIG. 37, the bin contents represent integrations of the number of data elements having intensity values less than each of the numbers represented by selected ones and zeros for the four most significant bits in the intensity data byte, disregarding the four least significant bits, which will be accounted for in a manner described below. As shown in FIG. 37, the histogram bins are arranged in groups according to the possible combinations of the most significant bit, the two most significant bits, the three most significant bits, and the four most significant bits, each with a 0 in the least significant bit position for the respective group. Thus, Group 1 as shown in FIG. 37 has as its contents all data elements within the scan window which have the most significant bit set to 0, i.e., are of a value in intensity of less than $$\frac{I_{max} - I_{min}}{2}.$$

In the case of 256 possible intensity values, this amounts to less than 128. Group 2 contains the possible combinations of the two most significant bits, with a 0 in the least significant of those two-bit positions, i.e., 00, corresponding to less than 64 and 10 corresponding to less than 192. In a similar fashion, Group 3 contains the possible combinations of the three most significant bits, again having a 0 in the least significant bit position of the three. That is, 000, corresponding to less than 32, 010, corresponding to less than 96, 100, corresponding to less than 160, and 110, corresponding to less than 224. The last group of bins includes the possible combinations of the four most significant bits having a 0 in the least most significant bit position, i.e., 0000, corresponding to less than 16, 0010, corresponding to less than 48, 0100, corresponding to less than 80, 0110, corresponding to less than 112, 1000, corresponding to less than 144, 1010, corresponding to less than 176, 1100, corresponding to less than 208, and 1110, corresponding to less than 240.

For purposes of the present invention, dynamic range is defined as the difference between the high percentile intensity value, below which lie some percent, for example, 90 percent, of the data elements within the scan window and the low percentile intensity value above which lie some percent, for example, 90 percent, of the data elements in the scan window. That is, the 10 percentile intensity value is subtracted from the 90 percentile intensity value.

An approximation of the dynamic range is obtained through the use of the histogram shown in FIG. 37. The histogram shown in FIG. 37 may be set up by a four-corner update as explained in relation to FIG. 39.

5.c.1. High and Low Percentile Valve Computation

The dynamic range is estimated by a trickle-down logic circuit employing a series of comparisons of contents of selected bins in each of the groups with the 90 percentile and 10 percentile value which will be explained below in relation to FIG. 40. Initially, the content of the bin in the first group, i.e., less than 128, is compared with the 90 percentile value of 153 and the 10 percentile value of 16. If the number of the count of data elements in the bin, having as its contents the number of data elements with an intensity of less than 128, exceeds the 10 percentile value, it is known that the intensity of the 10 percentile value is less than 128. Therefore, a 0 is retained for the most significant bit of the intensity estimate for the 10 percentile value, and a bin is selected in the second group of bins having a zero as the most significant bit for a further comparison with the 10 percentile value. As can be seen from the exemplary histogram in FIG. 37, this bin contains a count of the number of data elements having an intensity value less than 64, which also exceeds the 10 percentile value. Therefore, it is known that the intensity of the 10 percentile value is less than 64 and 00 is retained for the two most significant bits of the intensity estimate and a bin is selected in the third group of bins having 00 as its most significant bits for a further comparison. The number count of data elements in the bin selected in the third group according to the preceding steps, i.e., the less than 32 bin, is less than the 10 percentile value in the exemplary histogram of FIG. 37. It is therefore known that the 10 percentile value is an intensity value greater than or equal to 32. Therefore, 001 is retained as the three most significant bits for the intensity estimate, and a bin is selected in the fourth group of bins having 001 as the three most significant bits, i.e., the less than 48 bin is selected for comparison. The comparison of the less than 48 bin to the 10 percentile value of 16 in the illustrative histogram of FIG. 37 results in the number in the bin exceeding the 10 percentile value. It is therefore known that the 10 percentile value is an intensity greater than or equal to 32 but less than 48. Therefore, 0010 is selected for the four most significant bits of the estimated 10 percentile value.

Similarly, with the 90 percentile value, the number of data elements contained in the less than 128 bin in the first group is compared with the 90 percentile value, i.e., 153. If, as is shown in the representative histogram of FIG. 37, the number of the count of data elements in the bin in the first group is less than the 90 percentile value, it is known that the 90 percentile intensity value is greater than 128. Therefore, a 1 is retained for the most significant bit of the 90 percentile intensity estimate and the bin in the second group having a 1 in its most significant bit position is selected for a further comparison. Thus, the 10 bin, i.e., the less than 192 bin, is selected in the second group compared with the 90 percentile value. In the illustrative histogram of FIG. 37, the result of this comparison is that the number of the count of data elements in the less than 192 bin also is less than the 90 percentile value. Therefore, it is known that the 90 percentile value exceeds 192, and a 11 is retained as the most significant bits in the 90 percentile intensity estimate, and the bin having 11 as the most significant bits in the third group is selected for a further comparison. As is shown in FIG. 37, the count in the 110 bin, the less than 224 bin, exceeds the 90 percentile value. It is therefore known that the intensity value for the 90 percentile value is less than 224. Therefore, a 110 is retained as the most significant bits for the intensity estimate for the 90 percentile intensity and the bin in the fourth group of bins having a 110 as its three most significant bits is selected for comparison. This 1100 bin, the less than 208 bin, in the illustrative histogram of FIG. 37 has a count which is less than the 90 percentile value. It is therefore known that the 90 percentile intensity is greater than 208 and less than 224. Therefore, a 1101 is retained as the four most significant bits for the 90 percentile intensity estimate.

Employing only the four most significant bits out of the 8-bit byte for the intensity values to form the dynamic range histogram results in a possible inaccuracy of 16 intensity levels, i.e., the four least significant bits has a range of 0 to 15. Therefore, for each of the 90 percentile and 10 percentile intensity values determined according to the above procedure, one half of the possible error is added to the estimated percentile intensity value, i.e., 1000 is incorporated into the 90 percentile and 10 percentile intensity estimates as the four least significant bits. The 10 percentile intensity value is then subtracted from the 90 percentile value to obtain the dynamic range for the 13×13 scan window centered at a given center data element. It will be understood that the four least significant bits could simply be ignored in determining the dynamic range, since subtracting 1000 from 1000 results in 0000. Thus, the four most significant bits from the 10 percentile intensity estimate can be subtracted from the four most significant bits of the 90 percentile intensity estimate and the dynamic range formed by incorporating 0000 as the least significant bits of the dynamic range. The full eight bits are retained, however, for use in intensity enhancement as explained below.

5.c.2. Two-Axis Histogram Update

Figure 38A:
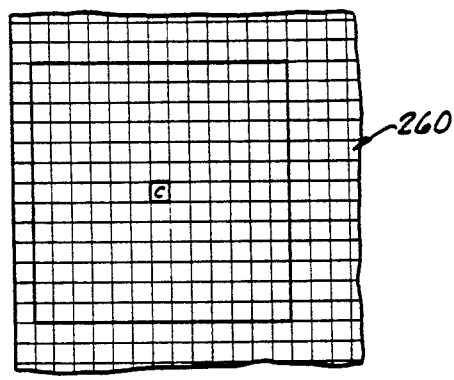
FIGS. 38a-g are illustrative of the explanation for the manner in which the compilation of the distribution of the data contained within the data elements in a particular scan window, for example, histogram contents, is updated for each new center data element location by examining the contents of only four data elements distributed at or near the corners of the immediately preceding scan window location, and employing the contents of those data elements to update the change in the histogram which was previously determined to be necessary when the scan window moved from a location one row above in the same column to the next column over.
Figure 38E:
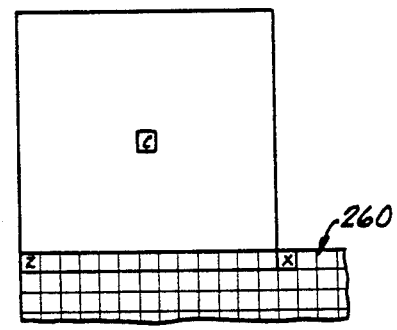

Referring to FIGS. 38a-g, it will be understood that the contents of the histogram such as that shown in FIG. 37 can be updated for each new position of a center data element in a data window, for example, the 13×13 dynamic range data element scan window, as illustrated in FIG. 38a, by incrementing into the histogram bins the appropriate values according to the output of the decoding logic for each of the thirteen data elements in the rightmost column of the scan window, and similarly decrementing the contents of the histogram bins according to the output of the decoding logic for each of the data elements contained in the column immediately to the left of the 13×13 data element scan window shown in FIG. 38a. That is to say, a new thirteen data element column has entered the window and a thirteen data element column has been removed from the window.

Figure 38B:
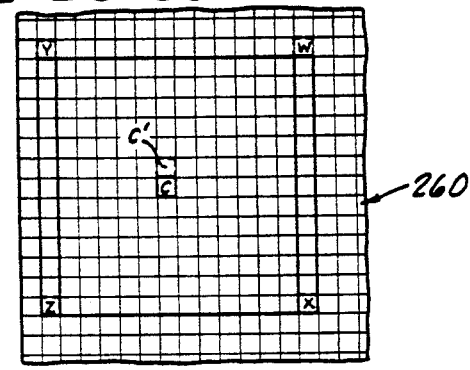

Software implementation of such a procedure may be accomplished. However, this is a somewhat cumbersome process, and the desired 4 megapixel throughput rate for the CEP filter 140, according to the present invention, is much too fast for such software implementation on conventional minicomputers or microprocessors. Applicants, therefore, have developed a unique hardware implementation for the updating of histogram data such as that shown in the histogram of FIG. 37, which can be explained by reference to FIGS. 38a, b, c, d, e, f and g. FIG. 38b shows a scan window having a center data element C. On the left-hand edge within the scan window is a column of thirteen data elements which will leave the window in the next clock period, assuming, as in prior descriptions, that the scan window moves toward the right, as viewed in the drawing, related to the data element matrix. On the right-hand edge adjacent the scan window is shown a column of thirteen data elements which will enter the scan window in the next clock period. In addition, there is shown a center data element C' which was the center data element for a preceding scan window when the scan window was one row above its present position in the same column. The difference between the left-hand column of data elements which will leave the scan window in the present position of the scan window, with the center data element C, and the thirteen data elements which left the scan window when the scan window was centered at center pixel C', is the contents of the lowermost data element in the present column of thirteen on the left, which is identified as Z, and the contents of the data element identified as Y. This data element Y is in the same leftmost column of thirteen data elements and one row above the top most data element in that column for the position of the scan window shown in FIG. 38b. Similarly, the difference between the column of thirteen data elements which will enter the window in the next clock period, with the center data element in the position identified as C, and the column of thirteen data elements which entered the scan window in the clock period immediately following the scan window being positioned with its center data element at C', is the contents of the lowermost data element in the column, which will enter the scan window, identified as X, and the contents of the data element in the same column immediately adjacent the uppermost data element in the column of thirteen, identified as W.

Thus, by knowing what the previous change, "delta," in the histogram was as a result of the movement of the scan window from the position shown in FIG. 38b, centered at center data element C', to the next column over, and updating that change by the change which will result from the four data elements W, X, Y and Z, a new "delta" comprising the change in the histogram for the next clock period can be determined. Thus, for the next clock period position of the center data element as shown in FIG. 38c, centered at center data element C, the contents of the histogram are incremented by stored previous delta values for the movement of the scan window from C' to the next adjacent column, as modified by an incrementation according to the contents of data element X, a decrementation according to the contents of data element W, and a decrementation according to the contents of data element Z and an incrementation according to the contents of data element Y. The signs are reversed for data elements Z and Y, with respect to the signs for data elements X and W, because of the fact that the column containing data elements Z and Y is leaving the scan window. Thus, the net effect on the difference between the prior delta change in the histogram and the present new delta change resultant from the movement of C to the next column, is a negative of the change resultant from data elements W and X. The prior delta combined with the changes due to data elements W, X, Y and Z to form the new delta is then retained and employed as the old delta when the scan window is one row below the present row in which the center data element is located as shown in FIG. 38c.

Figure 38F:
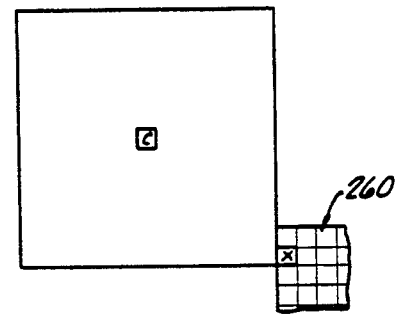
Figure 38C:
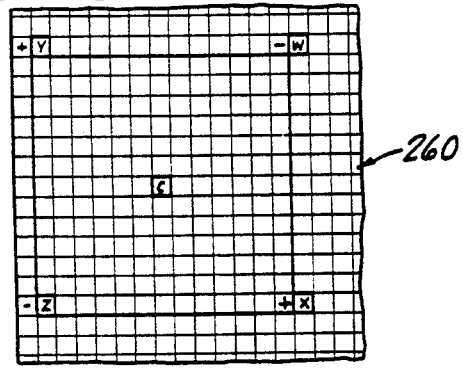
Figure 38G:
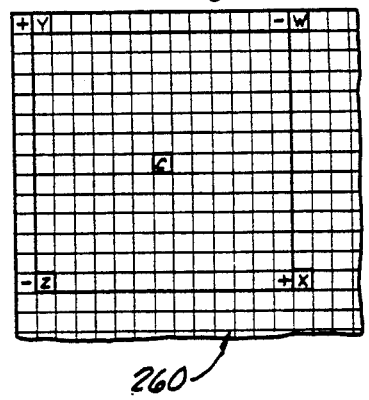
Figure 38D:
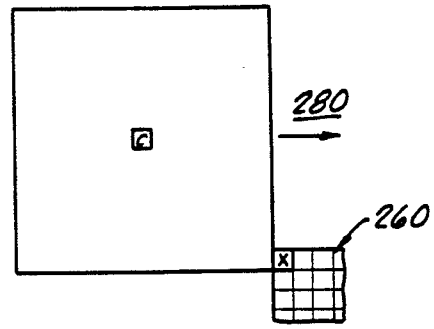

The operation of this two-axis histogram update may be further understood by reference to FIG. 38d. In FIG. 38d, the scan window is shown with a center data element C in the border 280 and the leading corner of the scan window about to enter the image 260. Up to this point, the contents of all of the histogram bins is 0. This is due to the fact that the border 280 is all white, i.e., each data element has an intensity value of 255.

Referring back to the histogram shown in FIG. 37, the largest number bin is less than 240. Thus, none of the bins contains a number indicating that the scan window contains data elements meeting the criteria set for any of the respective bins.

As the scan window enters the image in the next clock period, the histogram bins will be updated solely according to the contents of data element X, the first data element in the image at row 0, column 0. Assuming that this data element has an intensity value less than 240, at least one bin will now contain the number 1. For example, if the intensity value for the data element at row 0, column 0 has a value of 200, the bins in the first group, and second of the histogram of FIG. 37 will still register 0. None of the bins in the third group except for the less than the 224 bin will register a 1, and none of the bins in the fourth group, except for the less than 208 and less than 240 bins, will register a 1. Because, as explained above, the histogram bins are all initialized at 0 when the scan window is passing through the border, the change resultant in the previous row from the movement of the scan window from a position one column to the left of its present position as shown in FIG. 38d to the next column was a delta of 0. In addition, the changes resultant from the data elements in the positions W, Y and Z is no change at all since these data elements are all white, i.e., >240.

It can be seen, that as the scan window center data element C proceeds from column to column in its present row, the histogram is updated solely according to the contents of the data elements contained in row 1 of the image array 260. The data elements W, Y and Z having no effect, until the leading corner of the scan window is at column 12. At this point, shown in FIG. 38e, the content of the histogram for the scan window must account for the addition of the data element X in the next clock period and the removal from the scan window, and thus the histogram, of the content of the data element Z in the column about to leave the scan window. The addition of the contribution to the histogram of the data element X and the subtraction of the contribution of the data element Z continues as the scan window proceeds across the image with its bottom row in the top row of the image, row 0.

Turning now to FIG. 38f, the scan window is shown with the center data element one row below that shown in FIGS. 38d and e. As the scan window moves into the image array 260 in the next clock period, the histogram contents will be updated from the presently initialized 0 values, according to the contents of the data element X in row 1, column 0 and the contents of the data element in row 0, column 0. It will be remembered, that delta, the update of the histogram when the scan window entered the image array 260 as shown in FIG. 38d, was also the contents of the data element X at row 0, column 0. This delta was stored and is now incorporated along with the change resultant from the data element X in column 0, row 1. It will also be seen that as the scan window moves across the image array 260, with its bottom row in row 1 of the image array 260, the resulting update in the histogram occurs as a result of the contents of the data element X, plus the data element immediately above data element X, which in fact was the delta for the histogram update when the center data element was one row above its present position. Also, it will be seen that after the leading corner of the scan window is in column 12, the update to the histogram will be the addition of data element X and the data element immediately above data element X, and the subtraction of data element Z and the data element immediately above data element Z. This turns out to be the previous delta from the scan window being in a position with its center data element one row above its present position, plus the addition of data element X and the subtraction of data element Z in the bottom row of the scan window.

This process continues with the delta being stored for each column position of the scan window through the image. The cumulative delta value is stored for each such column position in the preceding row and updated row by row, until the center data element moves down to row 7 as shown in FIG. 38g. Now, as the scan window enters the image array 260, the histogram is updated by the previous delta for the change from the center data element location in column −7 and one row above in that column, to the next column, plus the addition of data element X. The previous delta accounts for the update of the histogram for each of the data elements in column 0 between row 0 and row 12. In reality, what has been stored is, for the example of the dynamic range histogram, a plurality of values between ±13 for each of the bins of the histogram of FIG. 37. It will be seen, that the maximum change for any bin due to the introduction of thirteen data elements from a new column and the removal of thirteen data elements from a column previously existing in the scan window is ±13. Thus, the introduction of data element X, as the scan window moves into column 0 of the image will modify none, some or all of the stored delta values according to the contents of data element X.

In addition, it can be seen that the effect of data element W on the update of the histogram contents is now felt. The content of data element W must be removed from the previous delta value, as is shown by the negative sign to data element W. This is so because the effect of data element W was incorporated in the delta value when the center data element was one row above the position it will occupy in the next clock period in the present row.

It will also be seen that, as the center data element continues across the image in the row +7 to the position in which it is shown in FIG. 38g, the net change to the histogram contents in each new column position of the center data element is the addition of the data element X plus the previous delta value, less the effect of data element W. Also, it can be seen, that when the leading corner of the scan window is in column 12, the next change to the histogram contents must include the previous delta plus the change resultant from the content of data element X, less the change resultant from the content of data element W, and also less the change resultant from the content of the data element Z, plus the change resultant from the content of data element Y.

This four-corner update of the histogram according to the content of the data elements throughout the scan window, by use of the two-axis histogram update as described above, has been described with respect to the dynamic range histogram, which is in fact an integrated histogram. It will be seen, however, that the same technique may be employed to update the analysis of data contained in a scan window whenever the analysis depends only upon the distribution of data within the scan window which represents like values, for example, of intensity or direction, and does not depend upon the sequence of the operations performed in the analysis of the data or the particular location of the data elements within the scan window which contain the data representative of like values. Thus, as will be explained below, the present technique is also employed in the apparatus and method according to the present invention when other analysis of the data within the scan window, for example, the mean value is being computed. When the mean of the data elements in the scan window is the operation performed, however, the initialization of the window contents must be achieved by setting the mean equal to 255 until the scan window leading corner enters the data array 260 at column 0, row 0. The four-corner/two-axis update is also used with histograms which do not represent integrated quantities, as discussed below with respect to the direction enhancement histogram.

5.c.3. Dynamic Range Histogram Update Circuitry

Figure 39:
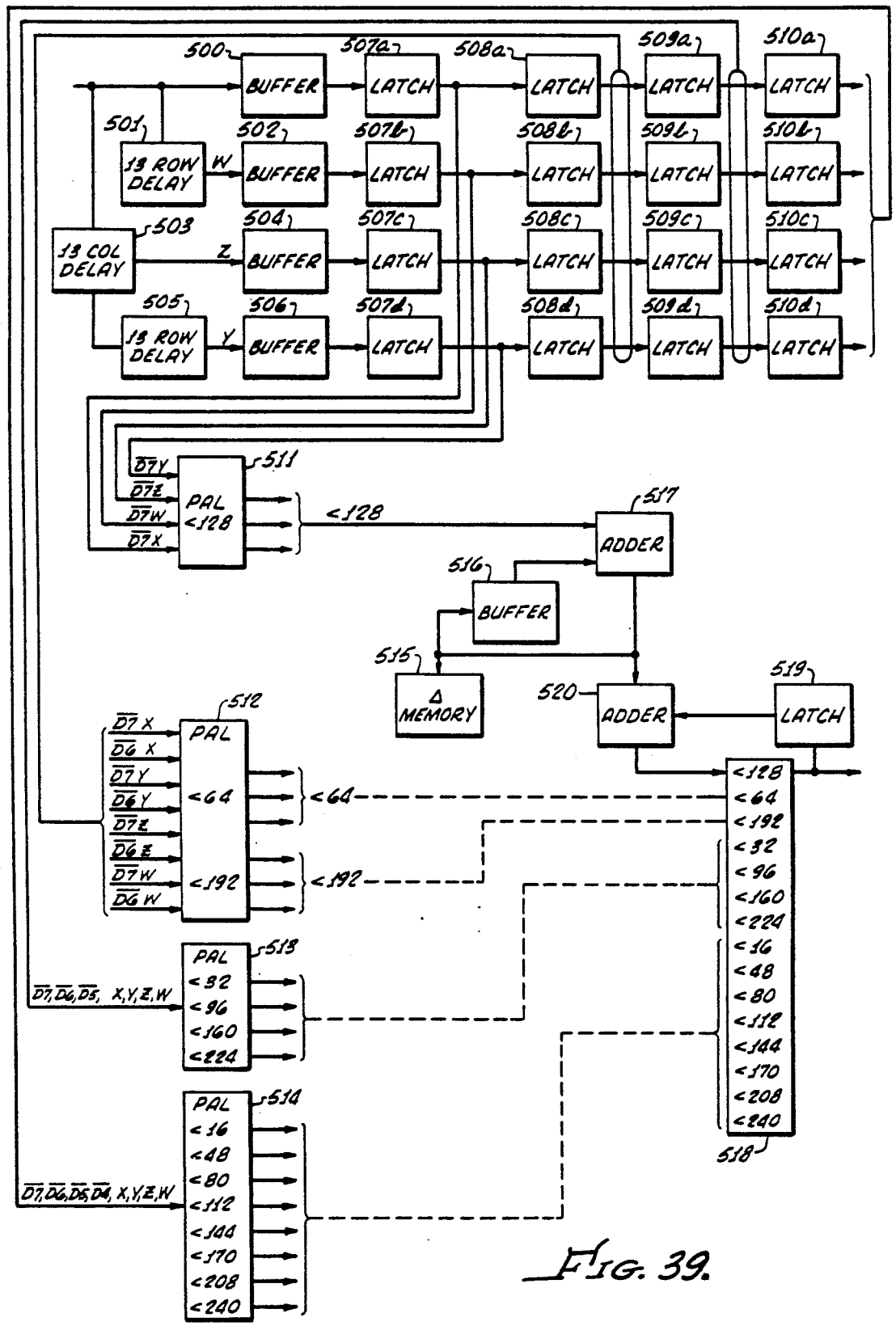
FIG. 39 shows the circuitry employed in dynamic range histogram updating, according to the present invention.

Turning now to FIG. 39, there is shown a circuit for generating the histogram of FIG. 37 according to the four-corner update illustrated in FIGS. 38a-g. The output of the column scanner 449 for a data element in the column and row position which will enter the preliminary direction estimate scan window is delayed for six rows and six columns and is then the data element designated as data element X in FIGS. 38a-g for a 13×13 dynamic range scan window concentric with a particular direction estimate scan window center data element. It has its four most significant bits stored in a buffer 500. It will be seen that this data element X was the data element W shown in FIGS. 38a-g, thirteen rows previously in the same column. The four most significant bits for data element X are thus held in a 13-row delay 501 the output of which is the input to a buffer 502. Similarly, the four most significant bits of a data element X are held in a 13-column delay 503, the output of which is the four most significant bits for the data element Z illustrated in FIGS. 38a-g and is stored in a buffer 504. Likewise, the output of the 13-column delay 503 forms the input of a 13-row delay 505, the output of which is the four most significant bits for the data element designated Y in FIGS. 38a-g. This is stored in a buffer 506.

The contents of the buffers 500, 502, 504 and 506 are then latched in latches 507a, 507b, 507c and 507d. The contents of the most significant bits of the data latched in the latches 507a-d forms an input to a programmable array logic 511. The programmable array logic 511 is programmed with the contents of the lookup table in two's complement according to Table 1 below.

| ≤128 HISTOGRAM ACCELERATION SIGNALS | | | | | | | |
|---|---|---|---|---|---|---|---|
| X | Y | W | Z | D2 (SIGN) | D1 | D0 | DECIMAL |
| $\overline{D7}$ 0 | 0 | 0 | 0 | 0 | 0 | 0 | 0 |
| $\overline{D7}$ 0 | 0 | 0 | 1 | 1 | 1 | 1 | −1 |
| $\overline{D7}$ 0 | 0 | 1 | 0 | 1 | 1 | 1 | −1 |
| $\overline{D7}$ 0 | 0 | 1 | 1 | 1 | 1 | 0 | −2 |
| $\overline{D7}$ 0 | 1 | 0 | 0 | 0 | 0 | 1 | +1 |
| $\overline{D7}$ 0 | 1 | 0 | 1 | 0 | 0 | 0 | 0 |
| $\overline{D7}$ 0 | 1 | 1 | 0 | 0 | 0 | 0 | 0 |
| $\overline{D7}$ 0 | 1 | 1 | 1 | 1 | 1 | 1 | −1 |
| $\overline{D7}$ 1 | 0 | 0 | 0 | 0 | 0 | 1 | +1 |
| $\overline{D7}$ 1 | 0 | 0 | 1 | 0 | 0 | 0 | 0 |
| $\overline{D7}$ 1 | 0 | 1 | 0 | 0 | 0 | 0 | 0 |

-continued

| <128 HISTOGRAM ACCELERATION SIGNALS | | | | | | | |
|---|---|---|---|---|---|---|---|
| | X | Y | W | Z | D2 (SIGN) | D1 | D0 | DECIMAL |
| $\overline{D7}$ | 1 | 0 | 1 | 1 | 1 | 1 | 1 | −1 |
| $\overline{D7}$ | 1 | 1 | 0 | 0 | 0 | 1 | 0 | +2 |
| $\overline{D7}$ | 1 | 1 | 0 | 1 | 0 | 0 | 1 | +1 |
| $\overline{D7}$ | 1 | 1 | 1 | 0 | 0 | 0 | 1 | +1 |
| $\overline{D7}$ | 1 | 1 | 1 | 1 | 0 | 0 | 0 | 0 |

It will be seen that, according to the contents of the most significant bit for each of the latched values for the data elements corresponding to the positions X, Y, Z and W, the programmable array logic 511 generates three bits of data indicating the Δ value for the <128 histogram bin. These outputs are on the D0, D1 and D2 outputs of the programmable array logic 511 and correspond to a sign bit at D2 and two bits of data indicating a change between +2 and −2. How this data, which represents an acceleration value for the change in the contents of the histogram bin corresponding to <128, is used to update the histogram bin is also shown in FIG. 39, and will be explained below.

In the next clock period, the contents of the latches 507a-d are loaded into the latches 508a-d. The contents of the two most significant bits $\overline{D7}$ and $\overline{D6}$ for the data latched in the latches 508a-d form the input to a programmable array logic 512. The programmable array logic 512 has a lookup table similar to that shown above in Table 1, with the exception that the lookup table now incorporates the possible combinations of the two most significant bits, and the output of the programmable array logic 512 is selected, according to the composition of the D7 bit, as a "1" or a "0" to indicate the acceleration value for the <192 histogram bin in the former case and the <64 histogram bin in the latter case. Each of these outputs again are in the form of a sign bit and two bits of acceleration value indicating a Δ between −2 and +2. In the next clock period, the contents of the latches 508a-d are loaded into the latches 509a-d. The contents of the latches 509a-d form inputs representative of the three most significant bits for each of the data elements W, X, Y and Z. The programmable array logic 513 is programmed to give an output representative of the acceleration value Δ for each of the <32, <96, <160 and <224 histogram bins in the dynamic range histogram accumulator 518, in a fashion similar to that explained above with respect to programmable array logic 512.

Finally, the contents of the latches 509a-d are loaded into the latches 510a-d in the next clock period, with all four most significant bits forming the inputs for each of the data elements W, X, Y and Z into a programmable array logic 514, the output of which is the acceleration values for the <16, <48, <80, <112, <144, <170, <208 and <240 dynamic range histogram bins in the dynamic range histogram accumulator 518. It will be understood that the programmable array logics 512, 513 and 514 could be made up of separate programmable array logics as in the case of programmable array logic 511, with each separate programmable array logic being dedicated to one of the histogram bins.

Considering the update of the <128 bin in the dynamic range histogram accumulator 518, the manner in which each of the histogram bins is updated will be explained. As shown in FIG. 39, the current Δ (the acceleration value) for the <128 bin, which is the output of the programmable array logic 511, forms the input to an adder 517. An additional input to the adder 517 is the previous Δ which is read from a memory 515 at the address of the column in which the dynamic range scan window leading corner is located, and which, during the first half of the CEP filter 140 clock period, is read from that memory location and stored in a buffer 516. The output of the adder 517 thus comprises the new Δ which is the input to an adder 520 and which is also, during the second half of the clock period, read back to the memory location for the column address. The previous contents of the <128 histogram bin is latched in a latch 519, the output of which forms a second input to the adder 520. The output of the adder 520 is the new value for the <128 histogram bin in the dynamic range histogram accumulator 518. This, then, is latched in the latch 518 for the next update in the next clock period.

5.c.4. High/Low Percentile Computation Circuitry

Figure 40:
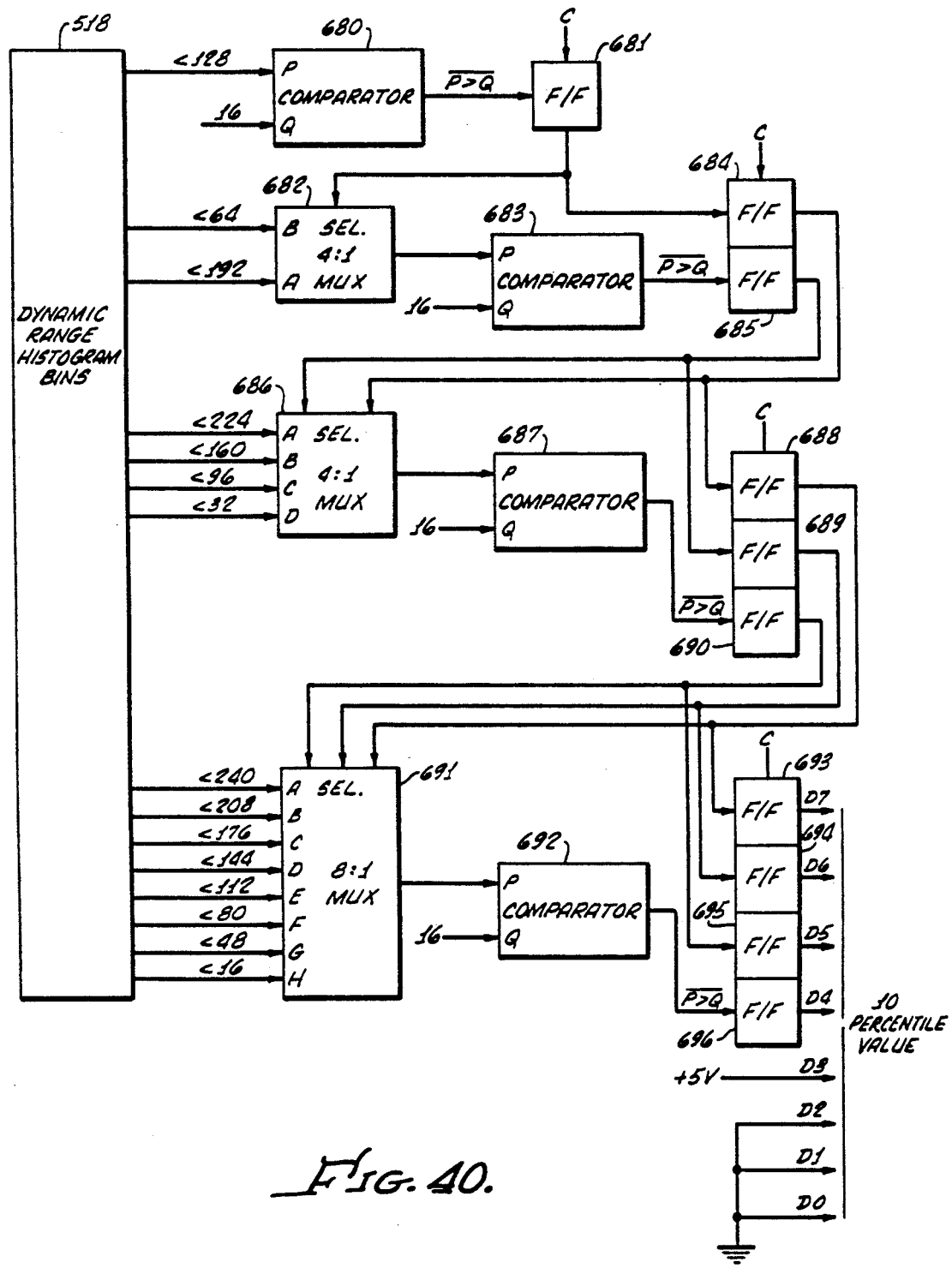
FIG. 40 shows a portion of the dynamic range computation circuitry for determining the 10 percentile value of the data elements in the dynamic range histogram according to the present invention.

Turning now to FIG. 40, the manner in which the trickle-down solution for the 90 percentile and 10 percentile values is used to compute the dynamic range will be explained with relation to the 10 percentile value only. The contents of the <128 bin in the dynamic range histogram accumulator 518 form the input to a comparator 680. A second input to the comparator 680 is the 10 percentile value, i.e., 16. The output of the comparator 680, $P>Q$, forms the input to a flip-flop 681. The output of flip-flop 681 clocked out in the next clock period controls a 2 to 1 multiplexer 682 which selects between the inputs A and B, comprising the <192 bin contents and the <64 bin contents, such that if the <128 bin content is <16, then the <64 bin is selected. That is to say, if the output of the flip-flop 681 is low, the <64 bin content is selected, and if the output of the flip-flop 681 is high, the <192 bin content is selected. The 2 to 1 multiplexer 682 passes the selected bin content to a comparator 683, where it is compared with the 10 percentile value 16. The content of the flip-flop 681 is also clocked into a flip-flop 684 which is paired with a flip-flop 685. Flip-flop 685 receives the output of the comparator 683. The outputs of the flip-flops 684 and 685 control the selection from among four channels, A, B, C and D, corresponding to <224, <160, <96, and <32 histogram bins, which selection is made by a 4 to 1 multiplexer 686 in the next clock period.

Referring to the exemplary bin contents in FIG. 37, the <32 bin would be selected, since the contents of the two flip-flops 684 and 685 would each be 0. The output of the 4 to 1 multiplexer 686, assuming the exemplary bin contents of FIG. 37, would be the <32 bin contents which is a value <16. The output of the comparator 687 forms an input to a flip-flop 690 which is part of a group of three flip-flops, including flip-flops 688 and 689. Flip-flop 688 receives the content of the flip-flop 684 and flip-flop 689 receives the content of flip-flop 685. The three outputs of the flip-flops 688, 689 and 690 control the selection in an 8 to 1 multiplexer 691 between eight channels comprising the <240, <208, <176, <144, <112, <80, <48 and <16 bin contents.

Again referring to the exemplary bin contents shown in FIG. 37, the channels would be selected according to the contents of flip-flops 688, 689 and 690, i.e., 001, would be the <48 channel. It is seen in FIG. 37 that the exemplary bin contents include a number in the <48 bin, which exceeds 16. Therefore, the output of 8 to 1 multiplexer 691 is a value which exceeds 16, so that the output of the comparator 692, which compares this value to 16, is a high value which is loaded into flip-flop 696. Flip-flop 696 is part of a group of four flip-flops, including flip-flops 693, 694 and 695. Flip-flop 693 receives the content of flip-flop 688, flip-flop 694 receives the content of flip-flop 689, and flip-flop 695 receives the content of flip-flop 690. The output of flip-flops 693, 694, 695 and 696, therefore form the four most significant bits, D7, D6, D5 and D4 for the 10 percentile value of the dynamic range histogram. As explained above, the four most significant bits have added to them a 1000, representing the number 8, which is accomplished by providing the D3 bit with a +5 volts and grounding the D2, D1 and D0 bits.

5.d. Preliminary Direction Estimate Circuitry

Figure 41:
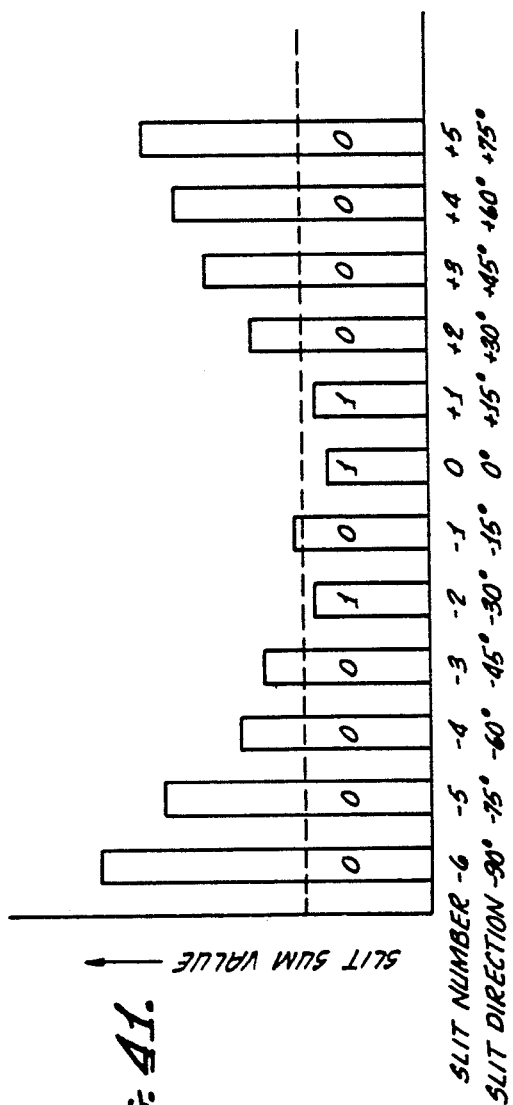
FIG. 41 shows an example of a histogram of slit sums for the slits within a scan window.

Turning now to FIG. 41, there is shown a histogram employed in the preliminary direction estimate portion of the apparatus and method of the present invention. Once the scan window of 25×25 data elements is moved to a position with the center data element in row 0, column 0 of the image 260, at that clock period and each clock period thereafter, there will be an output from the slit summing circuitry representing the slit sum for each of the twelve slits in the scanning window centered about the position of the center data element of the scan window in that clock period. It will be understood that at this point, as the scan window center data element enters the image 260, the slit sums are still not fully valid, and only after the center data element is positioned in row 12, column 12 will the slit sums begin to comprise slit sums with all slit data elements within the image array 260. The slit sums are arranged sequentially in the histogram by slit number, with the histogram bin contents equaling the respective slit sum.

Figure 42:
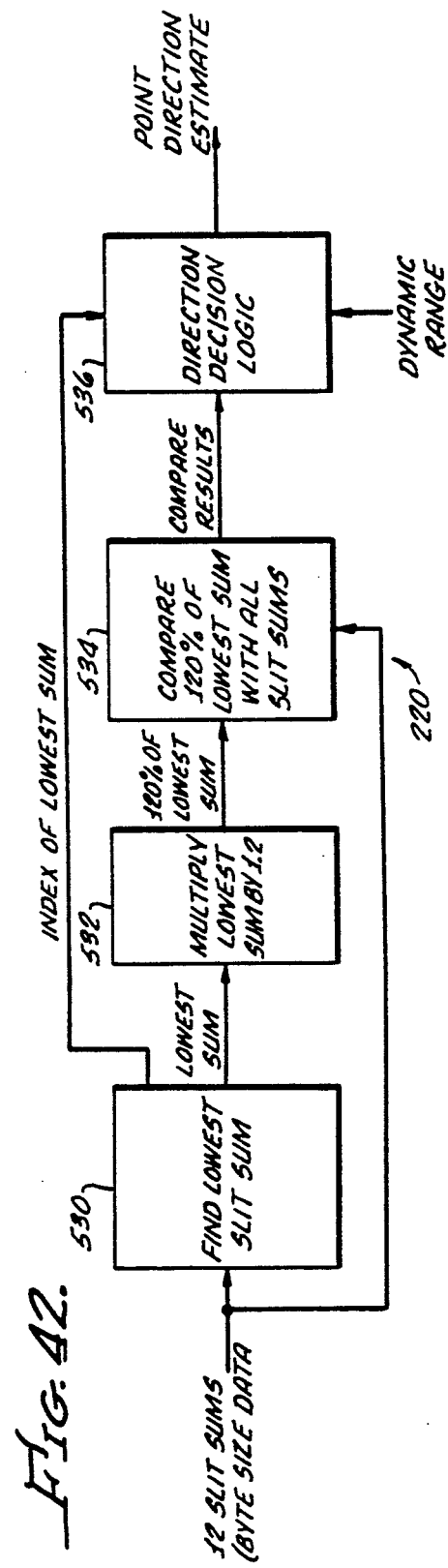
FIG. 42 shows a block diagram of the preliminary direction estimate circuitry for selecting the minimum slit sum for all the slits within a scan window and assigning a preliminary direction estimate accordingly.

As is shown in FIG. 42, the preliminary direction estimate circuitry 220 determines which of the slit sums is the lowest in block 530 of the schematic block diagram of the preliminary direction estimate circuitry 220. The lowest sum "MIN" is then multiplied by a factor K greater than 1 in block 532 of the preliminary direction estimate circuitry 220. In the preferred embodiment K is equal to 1.2. This "MIN," equal to 120 percent of the lowest slit sum value, is then compared with the values of all the slit sums in block 534. The output of block 534 is twelve bits entered in parallel into preliminary direction estimate decision logic circuitry 536. The output of the preliminary direction estimate logic circuit 536 is the preliminary direction estimate, which is either the direction of the slit having the low slit sum or a direction estimate comprising "no direction."

5.d.1. Low Slit Sum Determination Circuitry

Figure 43:
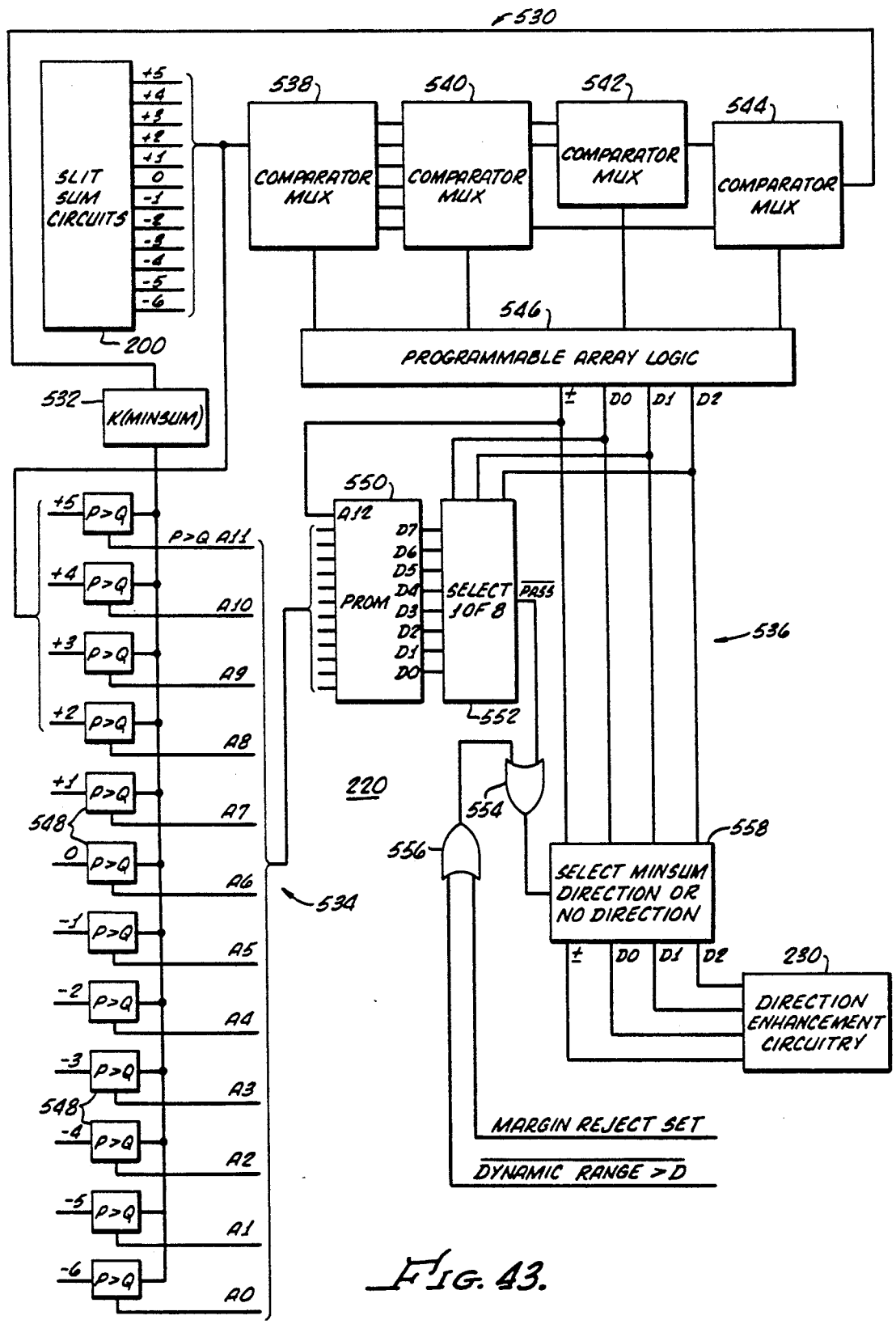
FIG. 43 shows in greater detail the preliminary direction estimate circuitry and logic employed in the present invention.

FIG. 43 shows in greater detail the preliminary direction estimate logic circuitry 220 used to find the lowest slit sum and make the preliminary direction estimate decision. The circuitry 220 includes the low slit sum, MIN, determination circuitry 530. The MIN determination circuitry includes a plurality of six multiplexed comparators 538 which compare the values in the adjacent slits of FIG. 12. The outputs of the comparators in the multiplexed comparators 538 control six multiplexers which select the six slit sums which were found to be lower than the respective slit sum with which they were compared. The six slit sums are then fed to a second set of multiplexed comparators 540, with the resulting output being the three lower slit sums. Two of these are fed to a multiplexer/comparator 542 with the resulting output being the lower of the two, and the third, along with this output of the multiplexer/comparator 542, is fed to a multiplexer/comparator 544. The resulting output is the lowest slit sum ("MIN") of the twelve initial slit sums. The comparators 538, 540, 542 and 544 are also connected to a programmable array logic unit 546 which provides an output indicating the index of the lowest slit sum, i.e., identifies the direction from −6 to +5 of the slit having the lowest slit sum.

5.d.2. Preliminary Direction Estimate Decision Logic

FIG. 43 also shows the circuitry 534 employed for the slit sum comparison of the slit sums with the augmented lowest slit sum, having been multiplied by the factor K in the multiplication circuitry 532, i.e., KMIN. The value KMIN is an input to each of a plurality of 12 comparators 548. A second input to each of the comparators 548, is a respective one of the slit sums +5 to −6 from the slit sum circuits 200. Each particular output A11 to A0 is set high when KMIN is equal to or exceeds the slit sum with which is being compared in the respective comparators 548 shown in FIG. 43. Each particular output A11 to A0 is set low when the particular slit sum exceeds KMIN. As shown in FIG. 43, the outputs A11 to A0 form twelve inputs to a PROM 550 contained in the direction decision logic 536. The PROM 550 is programmed as is shown in FIG. 44 to produce on each of its outputs D7 to D0 a 1 or 0, depending upon the sign bit from the programmable array logic 546, which forms the address bit A12 for the PROM 550, and also based upon the comparison of the states of the input bits A0 to A11 to the contents of the PROM 550 as shown in the graphical illustration of FIG. 44. For each row of the PROM 550, as is shown in FIG. 44, if any of the five address bits in the X'd boxes are set equal to one, or if four or more of the six address bits in the open boxes are set equal to one, then the PROM 550 output on the corresponding output bit D0–D7 is set equal to 0. Otherwise, the PROM 550 output bit on the respective D0–D7 is set equal to 1, except in the default cases noted.

It can be seen from FIG. 44 that with the address bit A12 set at 0, the PROM 550 output D0 corresponds to the row to be checked when the index of MIN is 0. Similarly, with the address bit A12 set at 0, the output bits D1 through D5 of the PROM 550 correspond to the rows which are addressed in the output of the PROM 550 for the MIN indexes of +1 to +5. With the address bit A12 of the PROM 550 set equal to 1, the output bits D2, D3, D4, D5, D6 and D7 correspond, respectively, to the rows in the PROM 550 which are checked when the index of MIN is −6, −5, −4, −3, −2 and −1. A selector circuit 552 selects which output is to be read from the PROM 550 from one of D0 to D7 depending upon the values for D0, D1 and D2 from the programmable array logic 546. The values of D0, D1 and D2 from the programmable array logic 546 correspond to the index of the MIN slit, in three bit binary form. The selector 552 is not sensitive to the sign bit for the MIN index. However, −1 binary for a three bit binary number is equivalent to the sign bit set to 1 and the bits D0, D1 and D2 set to 1. Similarly, −2 binary is the sign bit set to 1 and D0 a 0, D1 a 1 and D2 a 1. It can be seen that the respective three bit binary codes for −3, −4, −5 and −6 are 101, 100, 011 and 010. These latter four selector 552 codes correspond to the selector 552 codes for the output bits D5, D4, D3 and D2 from the PROM 550. Thus, it can be seen that the selector 552 reads the output bits from the PROM 550, as follows: D0 when the selector 552 code is 000, D1 when the selector code is 001, D2 when the selector 552 code is 010, D3 when the selector code is 011, D4 when the selector 552 code is 100, D5 when the selector code is 101, D6 when the selector 552 code is 110, and D7 when the selector 552 code is 111. Therefore, the sign bit on the address input A12 to the PROM 550 controls the output of the PROM 550 to be on D0, D1, D2, D3, D4 or D5 for a positive sign bit of 0 for each of the slit analyses corresponding to slits 0 through +5. When the address bit A12 to the PROM 550 is set, indicating negative slits, the PROM 550 is controlled to place the outputs for the slit −6 on D2, −5 on D3, −4 on D4, −3 on D5, −2 on D6 and −1 on D7. This will result in a selector 552 selecting the appropriate output D0 through D7 based upon the three bit binary code representing the slit number, without the need to consider a sign bit.

Returning to FIG. 43, the PROM 550 is programmed to produce a not pass, i.e., a fail bit, which is a 1, on the appropriate output D0-D7 when the contents of the address bits A0 through A11 fail to pass the criteria tests as illustrated in FIG. 44 and explained above. In effect, the PROM 550 is checking to see if any of the slit sums for slits separated by more than 45° from the MIN slit have a slit sum which fails to exceed KMIN, or if four or more of the more nearly aligned slits, having slit directions within less than 45° of the direction of the MIN slit, fail to exceed KMIN.

Looking in FIG. 44 at the row for the index of the MIN slit being 0, for example, if any of the bits A0, A1, A2, A10 or A11 is a 1, or if four or more of the bits A3, A4, A5, A7, A8 and A9 are 1's, than the fail bit 1 is the output of D0. This output on D0 is read by the selector 552 when the slit sum index from the programmable array logic 546 is 000, which indicates the MIN slit index is slit 0. By way of another example, for slit −3, the input address bits A0-A11 are compared with the −3 row in the PROM 550. If any of the bits A7-A11 is a 1 or if four or more of the bits A0-A2 and A4-A6 is a 1, then then the "pass" 1 output bit appears on the PROM 550 output D5. The output D5 of the PROM 550 is read by the selector circuit 552, because the index code for slit −3 is 101, which is also the index code for slit +5.

The output of the selector 552 is passed to a direction selector circuit 558 through an OR gate 554. The direction selector circuit 558 passes the sign bit and D0, D1 and D2 of the MIN slit index, from the programmable array logic 546 when the output of the OR gate 554 is low. The direction selector circuit 558 passes an output of 1000, i.e., −8 when the output of the OR gate 554 is high. This designates a direction estimate of "no direction."

The OR gate 554 is also connected to the output of another OR gate 556 which receives inputs indicating either the margin reject is set at 1 or the dynamic range is less than some threshold value D, e.g., usually equal to 80 shades of gray. Either of these events will provide an output from the OR gate 556 which causes an output from the OR gate 554, regardless of the pass/fail status indicated by the bit output from the selector circuit 552. Thus, when the margin reject is set or the dynamic range is not greater than a selected threshold, −8, i.e., "no direction" is the output of the direction selector circuitry 558.

The output of the direction selector circuitry 558 provides an input to the direction enhancement circuitry 230 for the center data element of the scan window which has just been processed through the preliminary direction estimate circuitry 220. As explained above, this input is a direction from −6 to +5, or a −8 indicating "no direction." It is in the form of a sign bit and a three bit binary direction number.

6. Direction Enhancement

FIG. 45 shows a direction enhancement scan window, comprising a 13×13 data element array within image array 260. The direction enhancement scan window also shows the designation of data elements within the 13×13 scan window which identify the slit directions from −6 to +5 employed in an intensity enhancement scan window. As will be explained below, a similar 13×13 intensity enhancement scan window is employed for intensity enhancement, which will employ data contained in all the data elements in the 13×13 scan window, or data contained in one of the various slits, in its logic circuitry for performing intensity enhancement of the intensity data in the center data element in the 13×13 intensity enhancement scan window.

6.a. Direction Enhancement Histogram

Figure 46:
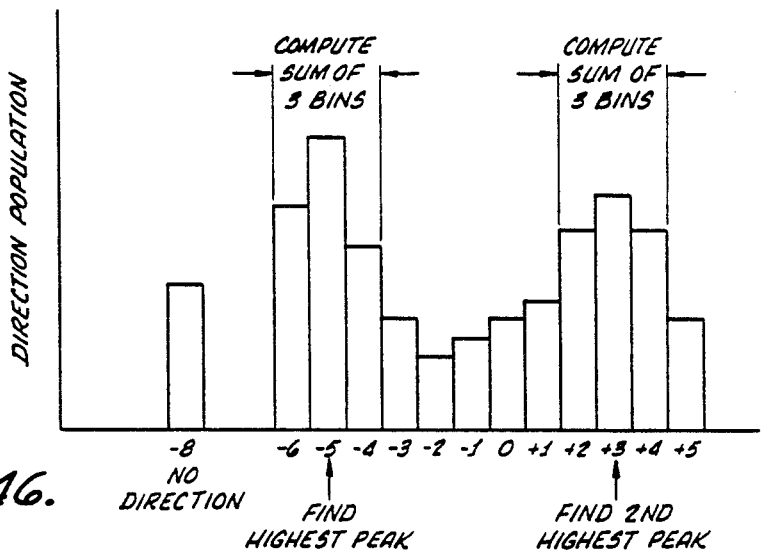
FIG. 46 shows a representation of a histogram employed in the direction enhancement according to the present invention.

The direction enhancement apparatus and method according to the present invention employs a histogram 560, as shown graphically in FIG. 46. It will be seen that the two axis histogram update explained above, with respect to the dynamic range histogram, using a stored delta and the contents of the data elements W, X, Y and Z to update the histogram, is equally applicable to the direction enhancement histogram 560 shown graphically in FIG. 46. The only difference is that the histogram bins in the histogram 560 of FIGS. 46, and 47 which are updated each clock period, contain a count of data elements in the scan window having one of the directions from −6 to +5 or −8 ("no direction"), whereas the histogram of FIG. 37 is an integrated histogram of data elements whose data represents a value less than some discrete quantity for each bin.

The output of the preliminary direction estimate circuitry 230 provided on a data element by data element basis from the direction selection circuitry 558 provides the data element X input data for the two axis histogram update, as explained above. The four bits sampled by the decode logic, as above explained, are the sign bit and the three bit binary direction, with the output of the decode logic updating the direction enhancement histogram as explained above with respect to the dynamic range histogram.

For each center data element location of the 13×13 scan window shown in FIG. 45, there is obtained the direction enhancement histogram 560, an example of which is graphically shown in FIG. 46. This direction enhancement histogram, shown illustratively in FIG. 46 has thirteen bins, including twelve bins, each of which contains the number of data elements within the 13×13 scan window which have a preliminary direction estimate assigned to them corresponding to one of the twelve possible directions from −6 to +5, and a bin containing the number of data elements within the 13×13 scan window which have "no direction" assigned to them. The "no direction" bin is designated as −8 in FIG. 46.

6.b. HIGH 3 SUM and SECOND HIGH 3 SUM Computation Circuitry

Figure 47:
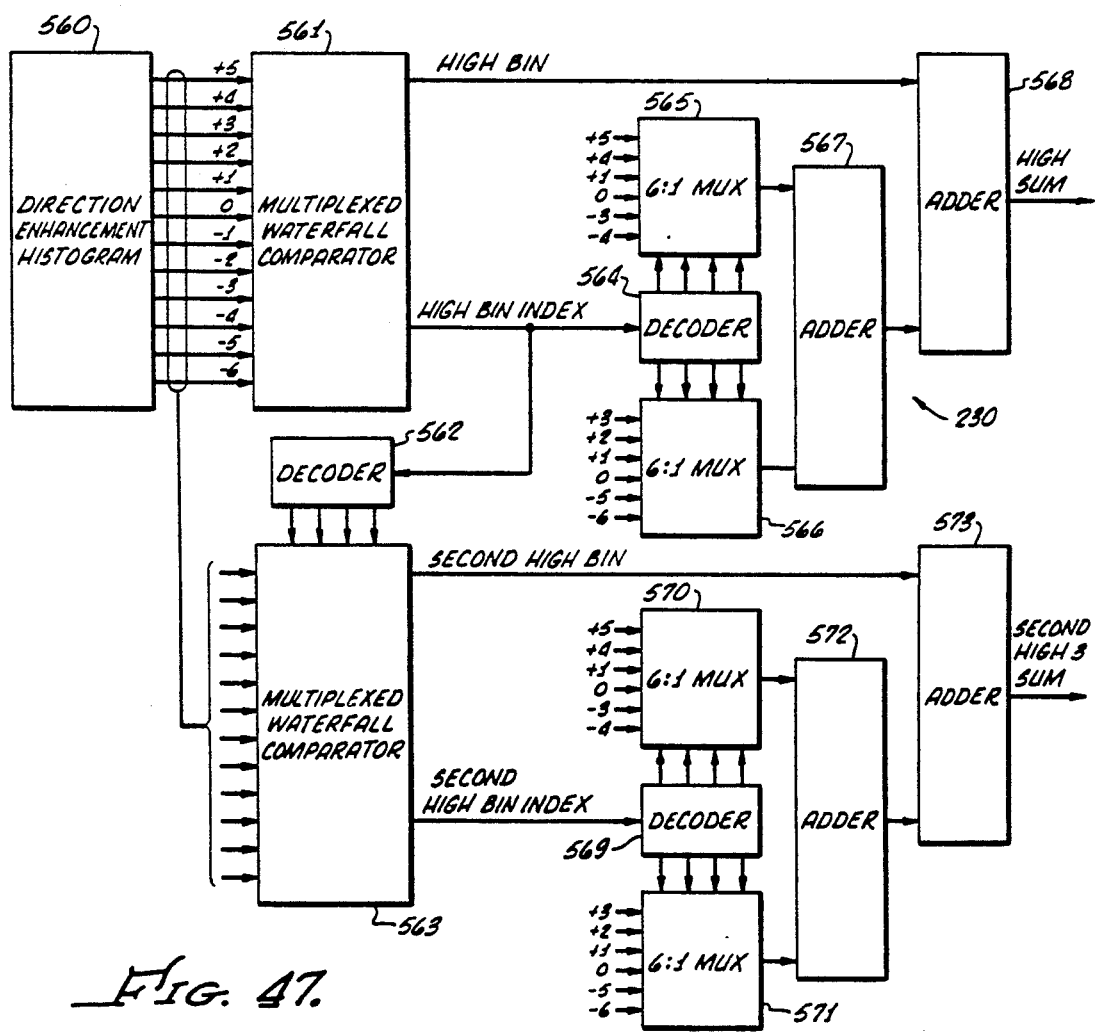
FIG. 47 shows circuitry employed in computing the sum of the number of data elements in the bin of the histogram of FIG. 46 which contains the largest number and the number in the bins corresponding to the directions immediately adjacent the direction of the bin having the highest number, and the similar sum for the bin having the second largest number and its adjacent bins.

The direction enhancement circuitry 230 contains a portion shown in FIG. 47 which first determines the HIGH 3 SUM and the SECOND HIGH 3 SUM. The HIGH 3 SUM is defined as the count of the number of data elements contained in the bin having the highest number of data elements ("HIGH SUM") summed with the count of the number of data elements contained in the bins adjacent in direction to the HIGH SUM bin direction.

The count in each of the bins corresponding to slit directions −6 through +5 is loaded from the direction estimate histogram 560 into a multiplexed waterfall comparator 561. The multiplexed waterfall comparator 561 is similar to the multiplexed waterfall comparator shown above in FIG. 43, with the exception that the comparisons are made to determine the higher of the two data values being compared. The output of the multiplexed waterfall comparator 561 is the number contained in the bin, corresponding to one of the slit directions −6 to +5, which contains the highest number. A second output from a programmable array logic associated with the multiplexed waterfall comparator 561 is the index of the high bin. The index of the high bin is passed to a decoder 562 which inhibits the high bin in a second multiplexed waterfall comparator 563. The second multiplexed waterfall comparator 563 receives the contents of the bins from the direction enhancement histogram 560. An output of the multiplexed waterfall comparator 563 is the second high bin, which constitutes the number of data elements contained in the bin having the second highest number of data elements. A second output from the second multiplexed waterfall comparator 563 is the index of the second high bin.

The index of the high bin is passed to a decoder 564 which addresses one output of a 6:1 multiplexer 565 and one output of a second 6:1 multiplexer 566. The outputs of the 6:1 multiplexer 565 are the outputs from the direction enhancement histogram 560 for selected paired adjacent bins, for example, +5 and +4, +1 and 0, −3 and −4. It will be seen that whatever the high bin index indicates the location of the high bin to be, one of its adjacent bins will be an output of the 6:1 multiplexer 565. Similarly, the 6:1 multiplexer 566 contains the outputs from the direction enhancement histogram 560 for the other bins not selected for input into the 6:1 multiplexer 565, and which are also paired adjacent bins. The other one of the bins which is adjacent the high bin will be one output of the 6:1 multiplexer 566. The number counts contained in each of these adjacent bins are passed through the 6:1 multiplexers 565 and 566 and added in an adder 567 with the sum forming an input, along with the high bin number, to an adder 568. The output of the adder 568 is the sum of the high bin and its adjacent bins, which is designated the HIGH 3 SUM.

In a similar fashion, the SECOND HIGH 3 SUM is found by using the output of the second multiplexed waterfall comparator 563, a decoder 569, receiving the second high bin index, a pair of 6:1 multiplexers 570 and 571, and adders 572 and 573.

6.c. Direction Emhancement Decision Logic

Figure 48:
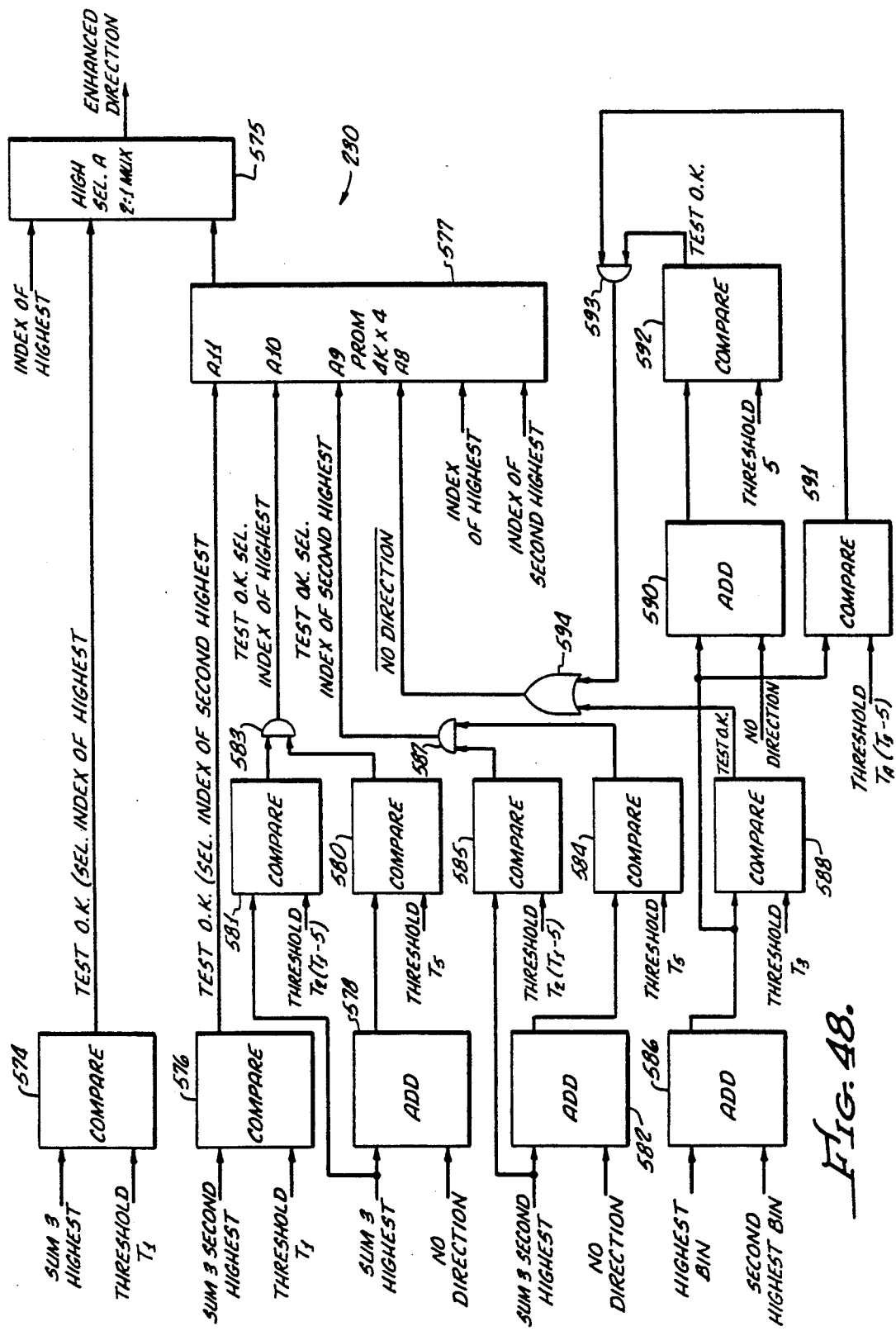
FIG. 48 shows the direction enhancement decision logic.

The HIGH 3 SUM, the SECOND HIGH 3 SUM, the "no direction" bin content, the content of the high bin and second high bin and the directions of the high bin and second high bin are then passed to direction enhancement decision logic as shown in FIG. 48. The HIGH 3 SUM is compared with a threshold $T_1$ in a comparator 574. $T_1$ is selected to be 50, based upon emperical study. If the HIGH 3 SUM is found to exceed $T_1$ a 2:1 multiplexer 575 passes the index of the high bin as an enhanced direction estimate for the center data element in the scan window currently being analyzed.

If the HIGH 3 SUM is not greater than threshold $T_1$, a second comparator 576 compares the SECOND HIGH 3 SUM with the threshold $T_1$. The output of the comparator 576 is an input to a 4K×4 bit PROM 577. The program of PROM 577 is shown below:

| PROM 577 PROGRAMMING |
|---|
| CASE 1    A11 A10 A9 A8 = 1XXX <br> OUTPUT = 2ND Hi DIR |
| CASE 2    A11 A10 A9 A8 = 01XX <br> OUTPUT = Hi DRI |
| CASE 3    A11 A10 A9 A8 = 001X <br> OUTPUT = 2ND Hi DIR |
| CASE 4    A11 A10 A9 A8 = 0001 <br> OUTPUT = −8(NO DIRECTION) |
| CASE 5    A11 A10 A9 A8 = 0000 <br> & \|Hi DIR − 2ND Hi DIR\| ≦ 4 <br> OUTPUT = $\left[\dfrac{\text{Hi DIR} + \text{2ND Hi DIR} + 1}{2}\right]$ INTEGER ARITHMETIC |
| CASE 6    A11 A10 A9 A8 = 0000 <br> & \|Hi DIR − 2ND Hi DIR\| ≧ 8 <br> OUTPUT = $\left[\dfrac{\text{Hi DIR} + \text{2ND Hi DIR} + 13}{2}\right]$ INTEGER ARITHMETIC <br> IF OUTPUT > +5 THEN <br> OUTPUT = (OUTPUT −12) |
| CASE 7    A11 A10 A9 A8 = 0000 <br> & 4 < \|Hi DIR − 2ND Hi DIR\| < 8 <br> OUTPUT = −8(NO DIRECTION) |

The HIGH 3 SUM is added to the no direction number by an adder 578. The output of the adder 578 is compared in a comparator 580 to a threshold $T_5$ which is selected to be 126 by empirical study. The HIGH 3 SUM is also compared in a comparator 581 to a threshold $T_2$ which is less than $T_1$ by a selected amount. $T_2$ is selected to be $T_1−5$ (i.e., 45) by empirical study. The output of the comparators 580 and 581 provide inputs an AND gate 583, the output of which is an input to the PROM 577 on A10. The SECOND HIGH SUM is added with the no direction number in an adder 582 and compared with the threshold $T_5$ in a comparator 584. The SECOND HIGH SUM is also compared in a comparator 585 to threshold $T_2$. The outputs of the comparators 584 and 585 provide inputs to an AND gate 587, the output of which is an input to the PROM 577 at A9. The high bin number and the second high bin number are added in an adder 586 and compared to a threshold $T_3$ in a comparator 588. $T_3$ is selected to be 67 by empirical study. The output of the comparator 588 provides one input to a OR gate 594. The sum of the high bin number and the second high bin number are compared in a comparator 591 to a threshold $T_4$, which is less than $T_3$. $T_4$ is selected to be $T_3−5$ by empirical study (i.e., 62). The output of the comparator 591 provides an input to an AND gate 593. The high bin number, second high bin number and no-direction number are added in an adder 590 and the sum compared in a comparator 592 with threshold $T_5$. The output of the comparator 591 provides an input to the AND gate 593. The output of the AND gate 593 provides an input of the OR gate 594, the output of which provides a fourth input to the PROM 577 at A8. A fifth input to the PROM 577 is the index of the high bin and a sixth input to the PROM 577 is the index of the second high bin.

The PROM 577 is programmed to pass the index of the high bin or the second high bin according to an order of priorities, and in some instances according to a comparison of the index of the high bin to the index of the second high bin. If the output of the comparator 576 indicates that the SECOND HIGH 3 SUM exceeds the The above is summarized in the table below in conjunction with the table relating to the contents of PROM 577:

| Test Sequence | Quantity Tested | Threshold (Limit) Used | Commonly Used Limit Value | Enhanced Direction Assigned | | |
|---|---|---|---|---|---|---|
| | | DIRECTION ENHANCEMENT TESTS | | | | |
| 1 | Highest value plus its adjacent values | Greater than threshold $T_1$ | 50 | Direction of Highest value | | |
| 2 | Second highest value plus its adjacent values | Greater than threshold $T_1$ | 50 | Direction of second highest value | | |
| 3 | Highest value plus its adjacent values | Greater than threshold $T_2$ ($T_1 -5$) | 45 | Both pass | Direction of highest value | |
| | Highest value plus its adjacent values plus number in no-dir. bin | Greater than threshold $T_5$ | 126 | | | |
| 4 | Second highest value plus its adjacent values | Greater than threshold $T_2$ ($T_1 -5$) | 45 | Both pass | Direction of second highest value | |
| | Second highest value plus its adjacent values plus number in no-dir. bin | Greater than threshold $T_5$ | 126 | | | |
| 5 | Highest value plus second highest value | Greater than threshold $T_3$ | 67 | | | |
| | Highest value plus second highest value | Greater than threshold $T_4$ ($T_3 -5$) | 62 | Both pass | Either pass and direction of highest = direction of second highest ±60° | Average direction of highest and second highest with roundoff |
| | Highest value plus second highest value plus no-dir. value | Greater than threshold $T_5$ | 126 | | | | threshold $T_1$, then the index of the second high bin is passed to the 2:1 multiplexer 575. That is if the inputs to the PROM 577 on A11 is a one, the second high bin index is passed, regardless of the status of bits A10, A9 and A8. If this is not done, i.e., A11 is a 0, and the output of the comparator 580 indicates that the sum of the HIGH 3 SUM and the no direction number exceeds the threshold $T_5$, and the output of the comparator 581 indicates that the HIGH 3 SUM exceeds $T_2$, i.e., A10 is a 1, then the index of the high bin is passed to the multiplexer 575, regardless of the status of A9 and A8. If this is not done, i.e., A11 and A10 are both 0, and the output of the comparator 584 indicates that the SECOND HIGH 3 SUM plus the no direction number exceeds the threshold $T_5$, and the output of the comparator 585 indicates that the SECOND HIGH 3 SUM exceeds $T_2$, then the index of the second high bin is passed to the multiplexer 575. That is A11 is 0, A10 is 0 and A9 is 1, disregarding A8. Finally, if either the sum of the high bin number and the second high bin number exceeds the threshold $T_3$, or the sum of the high bin number and the second high bin number exceeds a threshold $T_4$ plus the sum of the high bin number the second high bin number and the no direction number exceeds the threshold $T_5$, i.e., A11-A8 are all 0, then the average of the indices of the high bin and the second high bin is passed as the enhanced direction to the 2:1 multiplexer 575, provided that the absolute magnitude of the difference between the direction of the high bin number and the direction of the second high bin number is less than 5. It is taken into account, for purposes of this analysis, that the bins −6 and +5 are considered adjacent bins. Otherwise, if these tests fail, i.e., A11, A10, A9, A8 is 0001, or the absolute value of the difference between the high bin index and second high bin index is too large, then −8 ("no direction") is passed as the direction.

7. Intensity Enhancement

The output of the multiplexer 575 thus provides an enhanced direction for each center data element of a 13×13 direction enhancement scan window. This forms the input in each clock period of a new data element for the 13×13 intensity enhancement scan window and its associated logic circuitry shown generally in FIG. 49.

7.a. Intensity Enhancement Scan Window

Returning now to FIG. 45, the enhancement of the intensity data for each center data element will be discussed with relation to the 13×13 data element window shown in FIG. 45. Intensity enhancement is performed for each center data element within the image array 260 depending on whether or not it has an enhanced direction assigned to it, other than "no direction." Intensity enhancement is performed by an analysis of the contents of the data elements comprising a slit having one of the directions −6 to +5 as shown in FIG. 45, which is the same as the enhanced direction of the center data element. For each of these data elements neighboring the center data element in the respective slit, a correction factor for the intensity of the center data element of the scan window is generated. This correction factor depends upon the relationship of the intensity data for the respective neighboring slit data element and the adjusted mean intensity for the entire scan window, and the relationship between the enhanced direction assigned to each respective neighboring slit data element and the enhanced direction of the center data element.

As will be described in further detail below with respect to the logic circuitry 704, shown in more detail in FIG. 52, which is employed in generating each intensity correction value, the intensity correction values are proportional to the difference between the intensity value of the neighboring slit data element and the adjusted mean intensity for the scan window. When the neighboring slit data element has an intensity greater than the adjusted mean intensity, the sign of the intensity correction related to that neighboring slit data element is such as to increase the center data element intensity value when the difference in the enhanced direction for the center data element and the neighboring slit data element is less than a selected number of degrees. The sign is such as to decrease the center data element intensity value when the difference in direction between the enhanced direction of the respective neighboring slit data element and the center data element exceeds a selected number of degrees. When the neighboring slit data element has an intensity value less than the adjusted mean intensity for the scan window, the intensity correction has a sign such as to decrease the intensity value of the center data element, when the difference in direction between the respective neighboring slit data element and the center data element is less than a selected number of degrees. The sign is such as to increase the intensity value for the center data element when the difference in direction between the enhanced direction of the respective neighboring slit data element and the center data element exceeds a selected number of degrees. When the neighboring slit data element has an enhanced direction of "no direction," an intensity correction factor of 0 is accumulated according to the above noted relationships for that neighboring slit data element with respect to the center data element. The sum of all of the intensity correction factors for each of the neighboring slit data elements in the slit, comprising the slit aligned with the enhanced direction of the center data element, is combined with the center data element intensity to form the enhanced center data element intensity.

7.b. Intensity Enhancement Circuitry Overview

Figure 49:
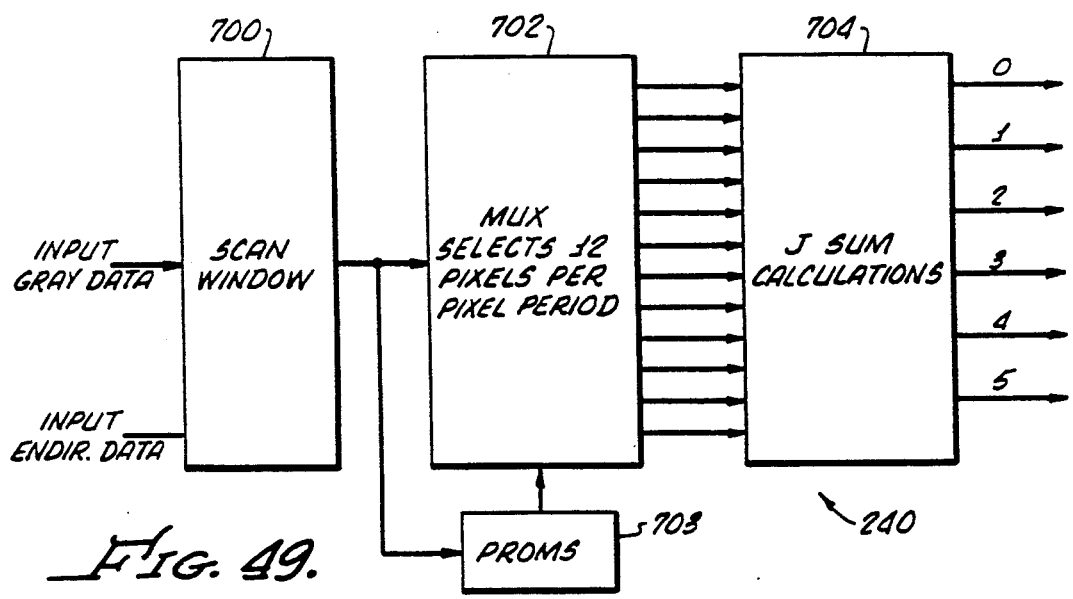
FIG. 49 shows a block diagram of the intensity enhancement intensity correction computation circuitry according to the present invention.

FIG. 49 shows a block diagram of the intensity enhancement circuitry 240 according to the present invention. Intensity data and enhanced direction data are input into the intensity enhancement circuitry 240 from a scan window sampling circuit 700. The output of the scan window sampling circuitry 700 is an input to a 25:1 multiplexer section 702. The 25:1 multiplexer 702 section, under control from a PROM or PROM's 703, selects twelve data elements from those within the scan window during each clock period. The contents of these data elements are the inputs to JSUM calculation circuitry 704, which will be described in further detail below.

It will be understood, that the logic and arithmetic functions performed in the intensity enhancement portion of the method and apparatus according to the present invention may be easily implemented in a programmed minicomputer or microprocessor. However, for the purpose of improving the speed of the data enhancement method and apparatus according to the present invention, the applicants have provided an improved apparatus and method as will be further described.

7.c. Intensity Enhancement Folded Scan Window

Figure 50A:
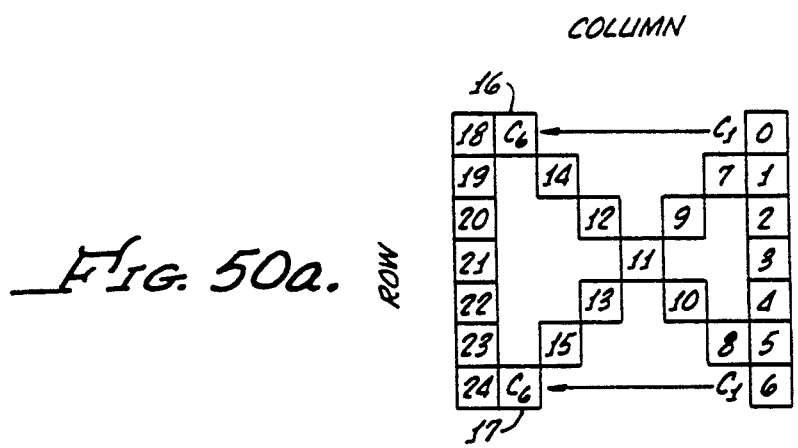
FIG. 50a shows the JSUM scan window according to the present invention.
Figure 50B:
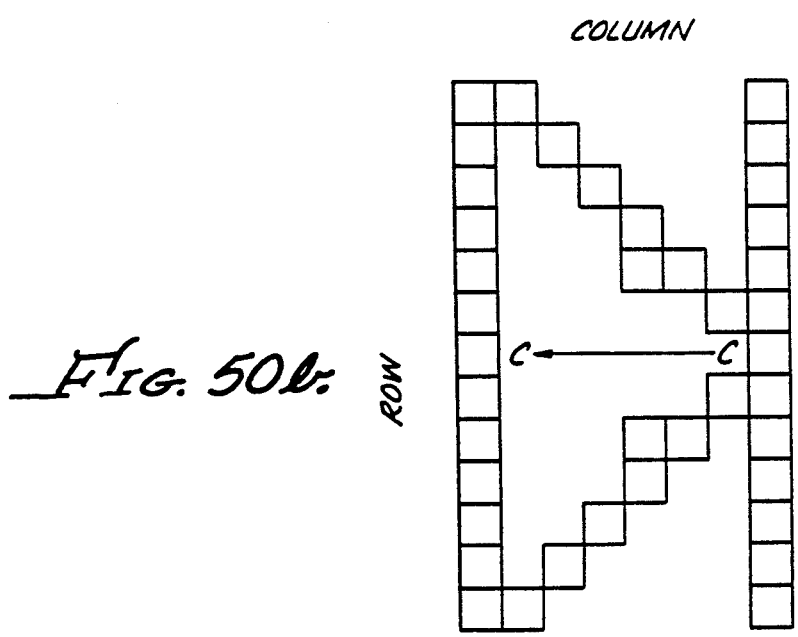

Turning to FIGS. 50a and 50b, there is shown an intensity enhancement folded scan window, and its derivation. The folded scan window shown in FIG. 50a will be seen to be only eight columns of data elements wide and seven rows of data elements high. In addition, not all of the data elements within the 7×8 matrix contained within the folded scan window of FIG. 50a are necessary for the purposes of computing the intensity enhancement correction factors. Looking at FIG. 50b, it can be seen, that assuming the center data element of a 13×13 scan window is centered at a position C, as indicated in FIG. 50b with a right-hand position $C_1$ and a left-hand position $C_6$ connected by an arrow, as the scan window is incremented to the right such that the center data element C occupies each position along the arrow and the leftmost position shown $C_6$, the indicated data elements positioned in the locations shown in FIG. 50b are sufficient to compare the center data element with each of two data elements above and below the position of the center data element C in each clock period, which data elements are within the appropriate slit as shown in FIG. 45. Thus, after six clock periods the necessary comparisons with the neighboring data elements in the respective slit are completed. The selected data elements in each location between $C_1$ and $C_6$ are selected to comprise data elements on the upper (or left-hand) side of a slit and on the lower (or right-hand) side of a slit.

Returning now to FIG. 50a, it can be seen that the scan pattern defined in FIG. 50b can be compressed. In the folded scan window shown in FIG. 50a, as the center data element is positioned in one of the positions between the C's ($C_1$–$C_6$) in the bottom row, and subsequently positioned in one of the positions between the C's ($C_1$–$C_6$) in the top row, each of the comparisons which were possible in the intensity enhancement scan window shown in FIG. 50b are available. Therefore, by generating and storing the intensity correction factors when the center data element of a 13×13 intensity enhancement scan window is in the bottom row of the folded scan window shown in FIG. 50a, and generating a second value when the center data element of a 13×13 scan window is in the top row of the folded scan window as shown in FIG. 50a, the combination of these two accumulated correction factors is the total correction factor for the intensity enhancement.

Such an intensity enhancement folded scan window may be stored, and updated during each clock period by the addition of the intensity and enhanced direction data corresponding to the data element in the lower right corner of the folded scan window shown in FIG. 50a. The column immediately above the newly-entered data element may be stored with a Jacob's ladder memory arrangement, similar to that described above with respect to the column scanner employed in the slit summing circuitry 200. The contents of what was in that column, and preceding column positions for the selected data element positions identified by the boxes shown in FIG. 50a may be stored, as for example, by latching, or with delay circuits, in order to form, for each clock period, a plurality of outputs each corresponding to a particular data element location in the folded scan window of FIG. 50a for a particular center data element location of the 13×13 intensity enhancement scan window.

Turning again to FIG. 50a, a further understanding of the JSUM calculations may be had. By way of example, the JSUM computations will be explained. This illustrative example assumes that the enhanced direction data for the center data element position $C_1$, to the far right of the trailing (top) row of the abbreviated scan window pattern shown in FIG. 50a is +3, and the direction data for the center data element $C_1$, to the far right in the leading (bottom)row of the abbreviated scan window pattern is −6. In the clock period shown in FIG. 50a, the JSUM circuit input for the center data element position $C_1$, in the trailing row, would be the data element in location 24 as listed in Table 2. In that same period, the JSUM circuitry input for the center data element position $C_1$, in the leading edge, would be the data element in location 8. In this same clock period, the selection circuitry selects a particular data element for each of the center data element positions $C_1$–$C_6$ in the leading row and $C_1$–$C_6$ in the trailing row according to control signals from the PROM's 703 during a respective one of the six phases of the clock period established by the clock splitter 732. During the next normal clock period, the abbreviated window shown in FIG. 50a will have been incremented one column to the right. For the center data element position $C_2$ in the trailing row, which in the last clock period was in position $C_1$ in the image array, the data element selected will be in location 23. In the next normal clock period the portion of the incremental scan window at location 22 is sampled. Then location 21, 20 and 19 are selected in succeeding clock periods. This will give the left-hand side of the diagonal slit +3 (the lower half) centered at the center data element position at $C_1$ in the first clock period as shown in FIG. 50a. It will be understood that when the same image array data element which is occupied by $C_1$ in the trailing row of the intensity enhancement scan window was in the leading row at $C_1$, a similar sequence of selections occurred according to the contents of one of the PROM's 703, to select the right-hand (upper) half of the slit +3 centered at that particular center data element within the image array.

Looking at the selections for the upper half of slit −6 in the clock period shown in FIG. 50a for the center data element $C_1$, in the leading row, the data element in location 8 is selected, then locations 10, 11, 12, 14 and 16 for succeeding clock periods. This provides the data elements positioned in the upper half of slit −6 for a center data element of the intensity enhancement scan window positioned at $C_1$ in the leading row of the image array during the initial clock period of the respective six selections.

It will be understood that for each clock period a selection is made of twelve data elements positioned in the current position of the intensity enhancement folded scan window at that clock period. Each of the twelve selected corresponds to a neighboring slit data element for one of upper and lower $C_1$–$C_6$ positions. Each is an input to a respective one of six separate JSUM channels as explained below. These twelve are divided into data elements in the lower halves of the six slits centered at a respective one of the positions $C_1$–$C_6$ in the trailing row of the intensity enhancement scan window of FIG. 50a and the upper halves of the six slits centered at a respective one of the positions $C_1$–$C_6$ in the leading row of the window of FIG. 50a. There are, in actuality twelve separate tables in the PROM 703 (or perhaps twelve separate PROMS 703). Each of these has as an input the enhanced direction of either a $C_1$ in the leading row or a $C_1$ in the trailing row. Another input is the count in a modulo-6 counter. These inputs determine which address in the 25:1 multiplexer 705 or 710 is selected for each clock period according to the table shown below in Table 2. The six leading row PROMS 703 and the six trailing row PROMS 703 are each offset by one count. Thus, a pipeline effect illustrated in FIG. 53 occurs. During each clock period six separate channels each produce an output to a respective Δ JSUM circuit 704 within the intensity enhancement decision logic circuit shown in FIG. 54 (one of which circuits 704 is shown in more detail in FIG. 52). Looking at FIG. 53, it can be seen that the output on channel 5 in the clock period shown is the output of the PROM 703 table dependent upon a new $C_1$ in a respective one of the leading and trailing rows of the intensity enhancement scan window for a given modulo-6 count, for example 1. The output from channel 4 is the last one needed to complete the ΔJSUM's for either the leading or trailing row position $C_6$, i.e., for a $C_1$ six clock periods earlier. Its modulo-6 count would be 0. Similarly the channel 3 modulo-6 count is 5, the channel 2 modulo-6 count is 4, the channel 1 modulo-6 count is 3, and the channel 0 modulo-6 count is 2. The same pipeline effect applies to the ultimate intensity enhancement solutions as explained below, resulting in an enhanced intensity solution for one center element each clock period. To do these selections and solutions on a programmed computer, at the rate of 4 megapixels per second, would require the execution of several billions of instructions per second.

7.d. Scan Window Data Element Selection Circuitry

Turning now to FIG. 51, the data element selection circuitry 702 is shown in further detail. Twenty-five 12-bit words, comprising 8 bits of intensity data and 4 bits of direction data, each corresponding to one of the data element locations in the folded scan window of FIG. 50a for a particular clock period form the output of the data element scan window circuit 700. These are input into a pair of 25:1 multiplexers 705 and 710. A PROM 703 (or multiple PROM's 703), controls the multiplexers 705 and 710 to each select the appropriate six of these 25 inputs during each clock period. The input to the PROM 703 is the output of a module 6 counter (not shown), and the enhanced direction of the center data elements located at $C_1$ in either of the leading and trailing rows of the window as shown in FIG. 50a. The contents of the PROM 703 are shown in Table 2 below. The modulo 6 count corresponds to the center data element position within the data array 260 being located in one of the locations $C_1$–$C_6$ as the folded scan window of FIG. 50a is incremented through the data array 260.

TABLE 2

| | PROM 703 CONTENTS | | | | | | | | | | | |
|---|---|---|---|---|---|---|---|---|---|---|---|---|
| | MULTIPLEXER ADDRESS (CENTER PIXEL IN BOTTOM ROW) | | | | | | MULTIPLEXER ADDRESS (CENTER PIXEL IN TOP ROW) | | | | | |
| SLIT DIREC- | CENTER PIXEL POSI- TION IN WINDOW | | | | | | CENTER PIXEL POSI- TION IN WINDOW | | | | | |
| TION | $C_1$ | $C_2$ | $C_3$ | $C_4$ | $C_5$ | $C_6$ | $C_1$ | $C_2$ | $C_3$ | $C_4$ | $C_5$ | $C_6$ |
| +5 | 3 | 0 | 9 | 13 | 15 | 14 | 7 | 11 | 13 | 12 | 24 | 23 |
| +4 | 4 | 2 | 1 | 0 | 11 | 15 | 9 | 13 | 34 | 23 | 21 | 19 |
| +3 | 5 | 4 | 3 | 2 | 1 | 0 | 24 | 23 | 22 | 21 | 20 | 19 |
| +2 | 5 | 5 | 4 | 4 | 3 | 2 | 22 | 21 | 20 | 20 | 19 | 19 |
| +1 | 6 | 6 | 5 | 5 | 5 | 4 | 20 | 19 | 19 | 19 | 18 | 18 |
| 0 | 6 | 6 | 6 | 6 | 6 | 6 | 18 | 18 | 18 | 18 | 18 | 18 |
| −1 | 22 | 23 | 23 | 23 | 24 | 24 | 0 | 0 | 1 | 1 | 1 | 2 |
| −2 | 20 | 21 | 22 | 22 | 23 | 23 | 1 | 1 | 2 | 2 | 3 | 4 |
| −3 | 18 | 19 | 20 | 21 | 22 | 23 | 1 | 2 | 3 | 4 | 5 | 6 |
| −4 | 10 | 12 | 18 | 19 | 21 | 23 | 2 | 4 | 5 | 6 | 11 | 14 |
| −5 | 8 | 11 | 12 | 13 | 18 | 19 | 3 | 6 | 10 | 12 | 14 | 15 |
| −6 | 8 | 10 | 11 | 12 | 14 | 16 | 7 | 9 | 11 | 13 | 15 | 17 |

The six 12-bit data words passed by each of the multiplexers 705 and 710 are loaded into respective latches 720, 722, 724, 726, 728 and 730 attached to the output of multiplexer 710, and latches 721, 723, 725, 727 and 731 connected to the output of the multiplexer 705. The latches 720, 722, 724, 726 and 730 and the latches 721, 723, 725, 727, 729 and 731 are loaded in sequence during each one-sixth of a clock period, by the provision of six phase clock pulses from a split clock 732, which divides the clock pulse into six separate pulses. In addition, the latches 720, 722 and 724, and the latches 721, 723 and 725 are enabled during the first half of the normal clock pulse, and the latches 726, 728 and 730, and the latches 727, 729 and 731 are enabled on the second half of the normal clock pulse, by the provision of an inverted clock pulse from inverters 734 and 735, respectively. The contents of the latches 720, 722 and 724 and the contents of the latches 721, 723 and 725 are read from the latches to form output channels 0–5 of the data element selection circuitry 702, during the first half of the normal clock pulse. The contents of latches 726, 728 and 730, and the latches 727, 729 and 731, are read from the latches during the second half of the normal clock pulse to provide outputs on the channels 0–5, respectively, during the second half of the clock pulse.

The modulo 6 count is syncronized with the split clock 732 output, so that each of the latches 720, 722, 724, 726 and 728 is loaded with the data as the multiplexer 710 address selected from the respective PROM 703 table for a $C_1$ enhanced direction (defining the appropriate slit being sampled) and a modulo 6 count from 0 to 5 for each channel.

7.e. Δ JSUM Computation Logic Circuitry

Figure 52:
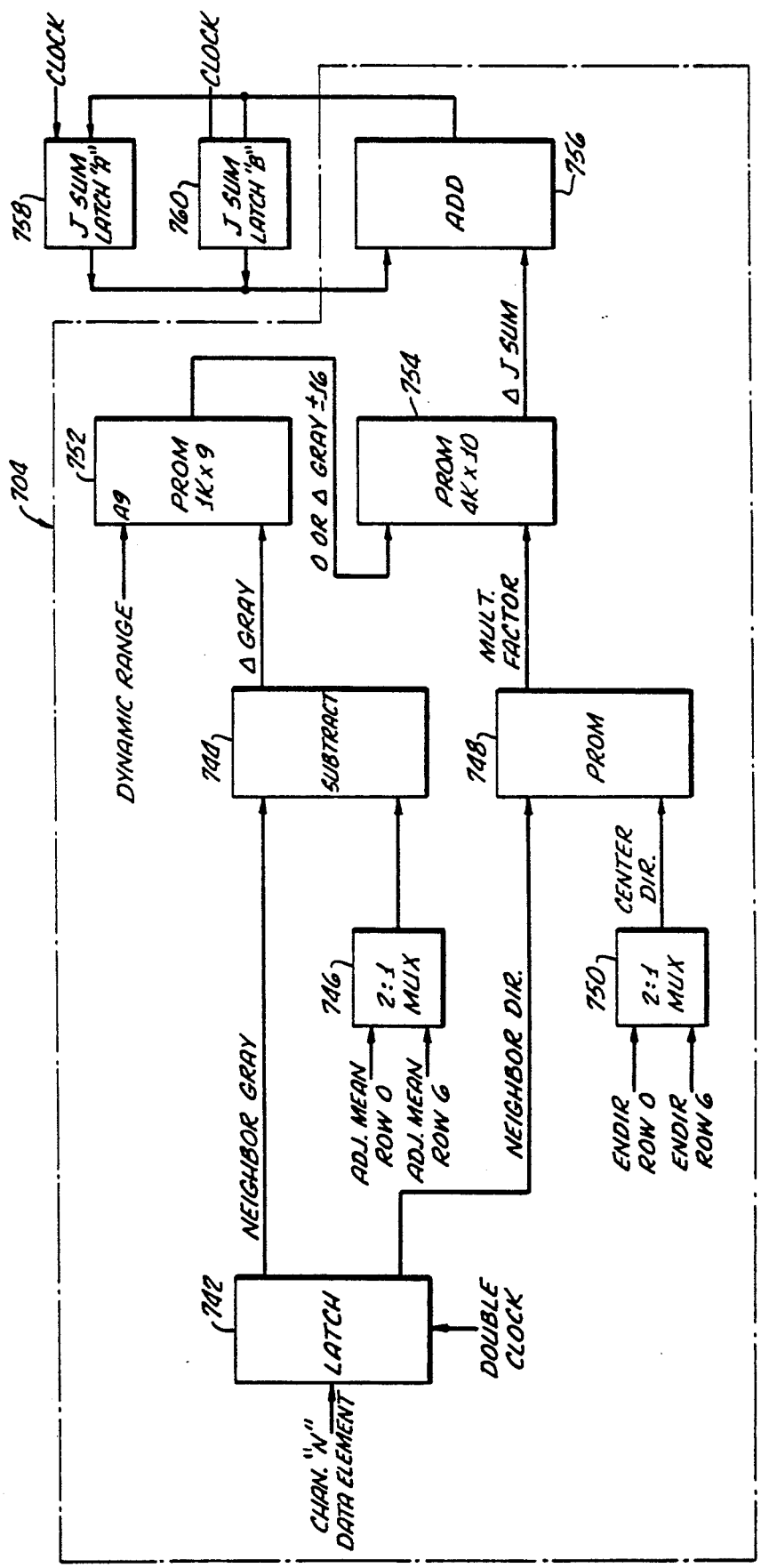
FIG. 52 shows a channel of the JSUM determination logic circuitry according to the present invention.

The outputs of the data element selection circuitry 702 on channels 0–5 for each half of the normal clock period, form the inputs to each of a plurality of six JSUM circuits, one of which is shown in FIG. 52. These 12 bits of data are stored in a latch 742. The 8 bits representing the intensity value are input into an arithmetic logic unit 744. A second input to the arithmetic logic unit 744 is the output of a 2:1 multiplexer 746 which receives as its input the value for the adjusted means intensity for the specific center data element positioned in the trailing row as shown in FIG. 50a, and the adjusted mean intensity for the specific center data element positioned in the leading row as shown in FIG. 50a. The multiplexer 746 selects the appropriate adjusted means intensity value to be compared with the neighboring slit data element intensity value, and provides that as an input to the arithmetic logic unit 744. The arithmetic logic unit 744 subtracts the neighboring slit data element intensity value from the appropriate adjusted means intensity value, and provides 9 bits of data as an output. This output represents the amount (Δ GRAY) by which the neighboring slit data element differs from the appropriate adjusted means intensity value, and the sign of the difference. This output forms an input into a PROM 752, which has another input at its address bit A9. The address bit A9 set to a one indicates the dynamic range is greater than 128, and set to 0 indicates that the dynamic range is not greater than 128. The PROM 752 is programmed to pass the intensity difference value, unless the dynamic range is large (≧128) and the difference value is relatively small, in which event a 0 is passed to a PROM 754. Thus if address bit A9 is 0 or the Δ GRAY input is less than 32, the PROM 752 output is a 0. If the address bit A9 is a 1 and Δ GRAY is greater than or equal to 32, the output of PROM 752 is Δ GRAY, plus 16 if Δ GRAY is a negative quantity or Δ GRAY minus 16 if Δ GRAY is a positive quantity.

At the same time, a multiplexer 750 selects between the enhanced direction value for the center data element in the trailing row and the enhanced direction value for the center data element in the leading row, and passes this 4 bits of data (comprising a sign and three bits of direction data) to a PROM 748. The PROM 748 also receives the 4 bits representative of direction data output from the latch 742. If the enhanced direction data for the neighboring slit data elements is −8, i.e., "no direction," the PROM 748 passes a multiplication factor of 0 to the PROM 754. Otherwise the PROM 748 is programmed to compare the data identifying the center data element direction and the neighboring slit data element direction. If the two differ by less than or equal to 15°, the output of the PROM 748 is a multiplication factor of 2. If the two differ by greater than 15° but less than or equal to 30°, the output is a multiplication factor of 1. If the difference equals 45°, the output is a multiplication favor of 0. If the difference is greater than 45° but less than or equal to 60°, the output is −1, and if the difference is greater than or equal to 75°, the output is −2. This is conveniently done by a look up table in the PROM 748 with the addresses defined by the possible combinations of direction data bits for the center data element and the neighboring slit data element.

The PROM 754 multiplies the output of the PROM 752 by the multiplication factor received from the PROM 748. This is also conveniently done with a lookup table with addresses corresponding to the possible combinations of bits identifying the multiplication factor and the output of PROM 752. The output of the PROM 754 is a Δ JSUM comprising 9 bits of intensity data and a sign bit.

7.f. JSUM Computation Circuitry

During the first half of the clock period, the Δ JSUM output of the PROM 754 is added to the contents of a JSUM latch A 758. During the second half of the clock period the Δ JSUM output of the PROM 754 is added to the contents of a JSUM latch B 760, each in an adder 756. The latch A 758 accumulates the Δ JSUM values for a particular channel for the leading row of the intensity enhancement scan window. The latch B 760 accumulates the Δ JSUM values for the particular channel for the trailing row of the intensity enhancement scan window.

It will be seen that the accumulated six Δ JSUM values in latch A comprise the sum of the Δ JSUM comparisons for the slit defined by a center data element at $C_6$ in the trailing row of the intensity enhancement scan window shown in FIG. 50a. Also, the accumulated Δ JSUM values in latch B comprise the sum of the Δ JSUM comparisons for a slit defined by a center data element at $C_6$ in the leading row of the intensity enhancement scan window. As is shown in FIG. 54 to align the summed Δ JSUM the latched accumulated value in the latch A 758 are delayed by six rows and added in an adder 718 to the latched accumulated value in the latch B 760. This is done on a channel-by-channel basis in response to the modulo-6 counter's effect on the Δ JSUM circuitry 704.

The sum of the Δ JSUM's for the entire slit is thus the output of adder 718 for a particular slit centered at a particular center data element during each regular clock period of the CEP filter 140. This output, with the least significant bit truncated, as shown in FIG. 45 in the input to an 8K × 9 bit PROM 720. Truncating the least significant bit of the output of the adder 718 results in summing the inputs to the adder 718 and dividing the sum by 2. The JSUM value has a round off value of four added to it if positive and subtracted if negative and is then divided by 6 in PROM 720.

7.g Intensity Enhancement When the Enhanced Direction of the Center Data Element Is "No Direction"

Figure 55:
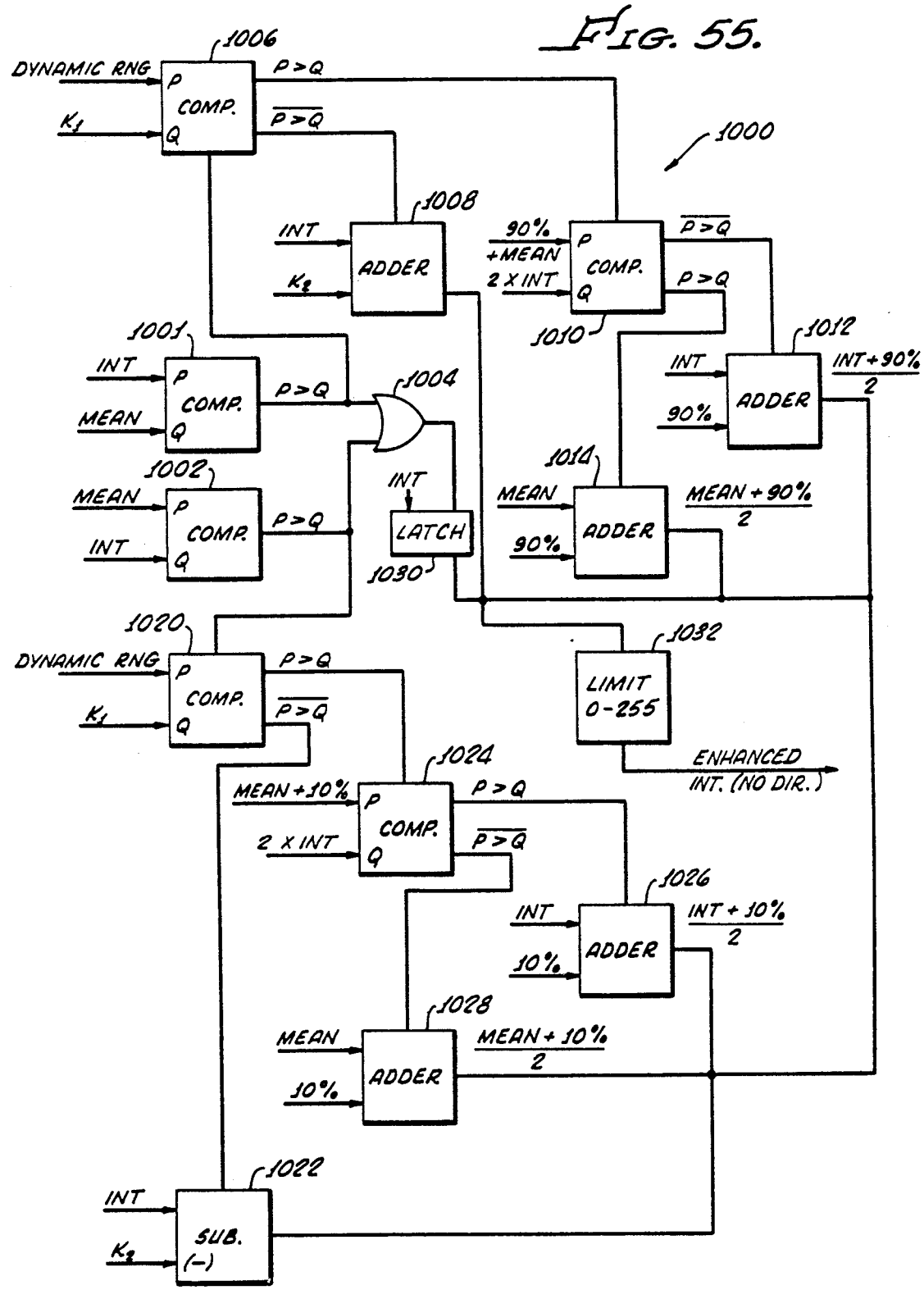
FIG. 55 shows the enhanced intensity calculation where the center data element has a direction of "no direction"

When the center data element is in the position of $C_1$ in the leading row of the folded scan window shown in FIG. 50a, the intensity of the center data element, and the mean, dynamic range and the 10 percentile and 90 percentile values for the data elements in the intensity enhancement 13×13 scan window, are the inputs to a "no direction" intensity enhancement logic circuit 1000 shown in FIG. 55. This circuit 1000 computes an intensity enhancement value which will be used if the enhanced direction of the center data element is "no direction." It computes this value regardless of the actual enhanced direction direction of the center data element, and a selection between the output of this circuit 1000 and the intensity enhancement correction factor circuitry shown in FIG. 54 is made based upon whether the center data element in question has a direction or "no direction."

The circuitry 1000 has a comparator 1001 and a comparator 1002. The inputs to each comparator 1001 and 1002 are the intensity data for the center data element and the mean for the intensity enhancement scan window. In comparator 1001 the intensity is on input P and the mean is on input Q, and vice versa in comparator 1002. Thus, the P>Q output of comparator 1001 indicates that intensity is greater than the mean, and the P>Q output of the comparator 1002 indicates the mean is greater than the intensity. These two outputs form inputs to a NOR gate which provides an output when neither P>Q nor Q>P, i.e., when the intensity equals the mean.

When the P>Q output of comparator 1001 is high, this enables a comparator 1006. The inputs to the comparator 1006 are dynamic range at P and a constant K, (set at 128) on Q. The P>Q output of comparator 1006 indicates that the dynamic range is $\leq 128$. The $\overline{P \leq Q}$ output of comparator 1006 enables an adder 1008. The inputs to the adder 1008 are the intensity value and a constant $K_2$ (set at 32).

The P>Q output of the comparator 1006 set high indicates the dynamic range is >128. This output enables a comparator 1010. The inputs to the comparator 1010 are the sum of 90 percentile value and the mean at P and the intensity at Q, with the intensity data shifted one bit to the left to form a nine bit data word with the eight initial bits forming the eight most significant bits and the least significant bit a "0," thereby multiplying the original intensity value by two. The P>Q output of the comparator 1010 indicates that the 90 percentile value plus the mean is greater than two times the intensity. The $\overline{P>Q}$ output indicates that the sum of the mean and the 90 percentile value is less than or equal to two times the intensity. The $\overline{P>Q}$ output of the comparator 1010 enables an adder 1012. The inputs to the adder 1012 are the intensity value and the 90 percentile value. The output of the adder 1012 has its least significant bit truncated, thereby resulting in an output equal to the sum of the intensity plus the 90 percentile value, divided by two.

The logic diagram of FIG. 55 is exemplary of the logic operations performed. In actuality no comparator 1006 is used. Instead, the intensity value is the input to a decode logic, which has a high or low output depending on whether the second most significant bit of the intensity is set at 1, i.e., $\geq 128$ or 0, i.e., <128. When the output of the decode logic is set high, the comparator 1010 is enabled, and when set low, the adder 1008 is enabled.

The P>Q output of the comparator 1010 enables an adder 1014. The inputs to the adder 1014 are the mean and the 90 percentile value. The output of the adder 1014 has its least significant bit truncated to thereby result in the sum of the mean and 90 percentile value divided by two.

P>Q output of comparator 1002 enables a comparator 1020. The inputs to the comparator 1020 are the dynamic range at P and the constant K, at Q. It will be understood this is really a decode logic as explained above. The $\overline{P>Q}$ output of comparator indicates that the dynamic range is $\leq 128$. This output enables a subtractor 1022. The inputs to subtractor 1002 are the intensity and the constant $K_2$. The output of subtractor 1022 is the intensity minus $K_2$.

The P>Q output of the comparator 1020, indicating that the dynamic range is >128, enables a comparator 1024. The inputs to the comparator 1024 are, at P, the intensity multiplied by two, as explained above, and the sum of the mean and 10 percentile value at Q. The P>Q output, indicating that two times the intensity is greater than the mean plus the 10 percentile value enables an adder 1026. The inputs to the adder 1026 are the intensity and the 10 percentile value. The output of the adder 1026 has its least significant bit truncated to divide the output sum by two. The $\overline{P>Q}$ output of the comparator 1024 enables an adder 1028. The inputs to the adder 1028 are the mean and the 10 percentile value, with the output having its least significant but truncated to give the sum of the mean plus the 10 percentile value divided by two as the output.

The output of the NOR gate 1004 enables a latch 1030, which contains the value of the intensity, to pass that value.

It will be seen that only one output is possible for a given set of values for the intensity, mean, dynamic range and 10 percentile and 90 percentile values. That output will be either from the latch 1030, or one of the adders 1008, 1012, 1014, 1022, 1026, 1028. This output is passed through a limiter circuit 1032 to limit the value to between 0 and 255.

Rather than provide a separate memory to store this output of limiter circuit 1032 while the JSUM calculations are ongoing for the particular center data element, this output is substituted for the adjusted gray value input into the multiplexer 746 when the particular center data element has a direction of "no direction." This will then invalidate the JSUM calculations, but, this does not matter since the JSUM calculations are ignored when the particular center data element has a direction of "no direction."

This is accomplished in a 2:1 multiplexer 1040 shown in FIG. 54. During the clock period when the output of limiter circuit 724 is the enhanced intensity for a particular center data element as computed using the JSUM calculations, the address of the multiplexer is the enhanced direction data for the particular center data element. If that direction is other than "no direction," the multiplexer 1040 passes the output of limiter circuit 724. If the direction is "no direction," the multiplexer 1040 passes the value for the adjusted gray value. It will be remembered that the adjusted gray value was set at the output of the limiter circuit 1032 for the case where the center data element in question had an enhanced direction of "no direction."

In this manner, the circuitry of the present invention assigns an enhanced intensity value based upon the logic of the circuitry 1000 when the center data element has a direction of "no direction" and based upon an analysis of the intensities and directions of the neighboring data elements in the slit having the direction of the enhanced direction of the center data element when the center data element has an enhanced direction other than "no direction."

8. Overall Scan Window Registration

Figure 56:
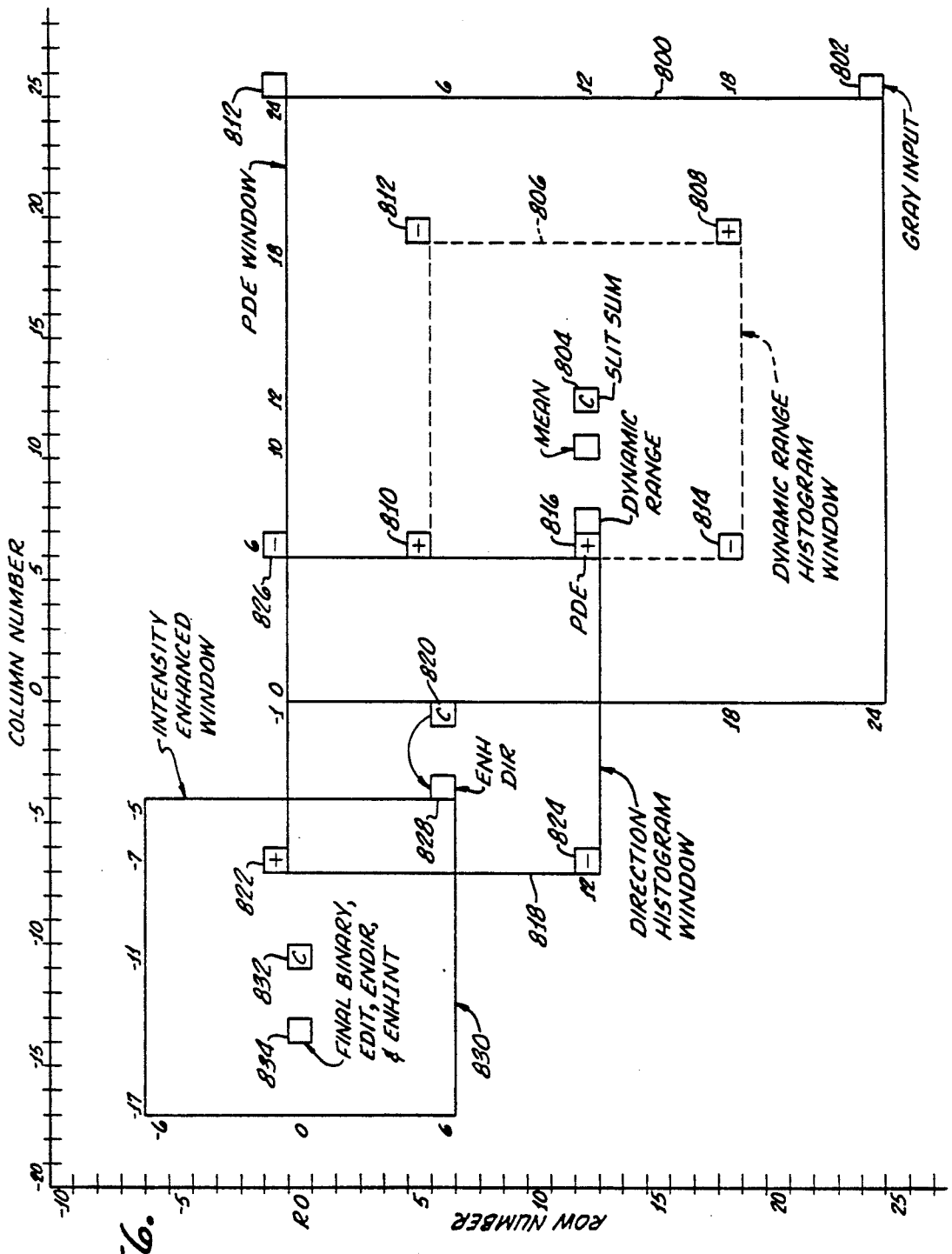
FIG. 56 illustrates the overall image registration of the scan windows passing through the matrix data array according to the present invention.

Turning now to FIG. 56, the overall operation of the apparatus and method according to the present invention may be visualized by considering the movement of the various scan windows through the image array 260. The slit summing scan (PDE) window 800 is shown in a position with its leading corner in a row arbitrarily defined as row R+24 and a column arbitrarily defined as column C+24. It will be seen that the upper left-hand corner of the slit sum scan window 800 is in row R, column C. The window is moving from column to column, toward the right. During the next clock period, the intensity data for the data element 802 in row R+24, column C+25 will enter the slit sum scan window 800. As explained above, the column scanner 449 is updated according to the contents of data element 802. In this next clock period, the slit sum circuitry provides the slit sums for slits −6 to +5 for the scan window 800 in a position with its center data element C 804 one column to the right of the position in which it is shown in FIG. 56.

Also shown is a dynamic range histogram window 806, which is updated, as explained above, in the next clock period according to the previous stored histogram update, and the contents of data elements 808, in row R+18, column C+19, 810 in row R+5, column C+6, 812 in row R+5, column C+19, and 814 in row R+18, column C+6.

The dynamic range histogram circuitry output is the dynamic range for the center data element 804 when it was located in row R+12, column C+7. The stored values for the slit sums for that center data element, along with the dynamic range are input into the preliminary direction estimate logic circuitry 220, which produces a preliminary direction estimate for the center data elements 804 when it was located in the position row R+12, C+6. This preliminary direction estimate is the input data element 816 for the direction enhancement histogram window 818 having a center data element C 820, during the next clock period. The direction enhancement histogram is updated according to the contents of data element 816 and data element 822, located in row R−1, column C−7, data element 824, located in row R+12, column C−7, data element 826, located in row R−1, column C+6, along with the stored prior histogram update delta value for when the direction enhancement histogram window was located one row above the position shown in FIG. 56.

The mean is computed by circuitry (not shown) which comprises a PROM (not shown). The input to the mean computing PROM is the content of a mean histogram bin, a one bin histogram. The mean histogram bin is updated by the four corner update as explained above. The content of the mean histogram is the updated sum of all the intensity values with the respective 13×13 intensity enhancement scan window, as updated by the four corner update. The PROM has 43,095 memory locations. This is the maximum possible value for the sum of all 169 data elements in the intensity enhancement scan window, and a memory location for each possible value of that sum from 43,095 down to 0. Stored in each memory location is the result of dividing the respective sum by 169 (i.e., the mean) to the nearest whole number. Thus, the output of the mean computing PROM is the mean for each respective input which addresses the location where the respective mean is stored.

The output of the direction enhancement histogram circuitry 210 during this clock period is the enhanced direction data for a data element 828 located in row R+6, column C−4. This data element 824 forms the next data element to be entered into the intensity enhancement folded scan window during the next clock period for the intensity enhancement window 830 having a center data element C 832 at row R, column C−11. The intensity enhancement scan window is represented as a 13×13 window, as is shown in FIG. 45. It will be remembered, however, that this is mechanized by use of the 7×8 folded scan window shown in FIG. 50a. The output from the intensity enhancement circuitry during the clock period illustrated in FIG. 56 is the final binary, and enhanced direction data for a data element located in row 0, column C−14.

It can be seen that during each clock period a new data element enters each of the preliminary direction estimate window, enhanced direction window and intensity enhancement window. With respect to the direction enhancement window and the intensity enhancement window, the new data elements are the output from the enhancement steps carried out in the preceding window. Also during each clock period, a data element 834 is generated containing the final binary, edit and enhanced direction data to be provided to the circuits connected to the contextual enhancement processor filter 140 of the present invention as described above. The contextual image enhancement processor filter 140 according to the present invention, thus takes a serial stream of data in 8-bit bytes representing data element intensity, and produces a serial output of 6-bit bytes representing a binary 1 or 0 for intensity, an edit bit, and 4 bits of enhanced direction. The binary 1 or 0 is generated in circuitry (not shown) which compares the enhanced intensity data output of the intensity enhancement multiplexer 1040 with 128. If the enhanced intensity is less than 128, the binary intensity is set at zero and if the enhanced intensity equals or exceeds 128 the binary intensity is set to 1. If the enhanced direction is "no direction," the edit bit is set to 1 by circuitry (not shown). Both the binary intensity conversion and the setting of the edit bit can conveniently be done with a look-up table in a PROM, similarly to such look-up table operations described above.

It will be understood by those skilled in the art, that the intensity enhancement process according to the present invention is adapted to drive the intensity value of each data element away from the mean and toward either 0 or 255 according to the contents of the neighboring data elements in the slit having the enhanced direction of the center data element or to a statistical analysis when the enhanced direction is "no direction." In this manner, when the binary image is made, as few as possible data elements will have values near the mean, which would make their binary selection of some doubt on the average.

SUMMARY OF THE SCOPE AND ADVANTAGES OF THE PRESENT INVENTION

The CEP Image Enhancement Processor Filter, according to the present invention, is an electronic assembly that receives digitized image data from either one or two electronic cameras and processes these data to provide an enhanced image to improve the quality of the image. The data comprising the enhanced image is a binary intensity, an edit bit and an enhanced direction for each data element in the image. These data are then subjected to a feature extraction process to identify those characteristics which are used for fingerprint identification and classification. The output data are formatted into an array which is compatible with a user's storage format and are transmitted to a host system for retention.

The system also provides a sub-sampled array of image data as an output to the user's Image Storage and Retrieval System (ISRS). This sub-sampled array is positioned with the primary features of the image centrally located within the ISRS image array.

The system contains a display processor which provides a composite video output for driving an external 811-line black-and-white CRT monitor.

The system can be configured in one of two ways. If it is desirable to operate the system using two electronic cameras, the Image Processor system would be configured with all the basic components as shown in FIGS. 1a and b. This configuration has the capacity to process images at the maximum achievable rate for the system. If, however, processing speed is not a consideration or if only one camera is available, then one of the camera interface boards and its associated image buffer can be removed from the system.

The system is designed using a pipeline architecture. This means that data from more than one image may be acted upon at different processing stages at any one time. The first stage of the process consists of receiving the data from a camera and of storing the data in an image buffer. As these data are received and stored, gray level data values are accumulated to construct a histogram of the entire image and to find the approximate center of the image.

When the histogram and gray level data have been received and analyzed, the image data can be read from the image buffer and passed to the next processing stage. As the shades-of-gray data are read serially from the buffer memory, the byte representing each pixel is sent to a look-up table to determine the recalibrated gray value for that pixel. This recalibration function expands the dynamic range of the data without distorting the image.

The CEP filter section of the image processor performs a series of enhancement functions to improve the quality of the image. The filter section also determines the direction of ridge flow in the vicinity of each data element in the image array and develops a binary image (i.e., designates each image data element as being either black or white).

As the data elements are passed through the CEP filter, a slit summing operation is performed and a localized histogram is constructed. The slit summers compute the amount of gray contrast that exists along a set of twelve discrete directions (called slits) in a square windowed portion of the image. The histogram board determines the distribution of data values within a similar, collocated square windowed portion of the image. The histogram data are then analyzed to find the 10 percentile and the 90 percentile gray values, the difference between which is called the dynamic range for the localized area. The slit sum results and the dynamic range data are then passed to the direction calculations section. It will be understood by those skilled in the art, that the slits selected are illustrative of the preferred embodiment. A larger slit sum scan window could be used and/or more than twelve slit directions selected. In addition, the location of the data elements defining each slit could be modified. The inventors believe that optimum results are achieved by the slits as defined in the present invention. However, detailed comparison with other possible slit data element selections has not been done. It may be, for example, that selecting the slit data elements to be nonreflective about the center data element may be adequate. By doing so, it is possible to simplify the slit summing circuitry so that, e.g., four groups of five of the same shape and relative distribution are able to be assembled for every slit, not just some slits, as noted in the specification. This possibly could simplify the slit summing circuits by, e.g., shortening certain delay pipelines. It probably would not affect the overall system speed of filter operation.

The direction calculations section analyzes the set of slit sums and the dynamic range data. This calculation gives a result that is called a preliminary direction estimate. If the data within the window areas have a large enough dynamic range and the slit sums satisfy certain pass/fail criteria, the preliminary direction estimate is the direction of the slit which is most nearly parallel to the local fingerprint ridge flow in the fingerprint image. If the data fail to satisfy the test criteria, a special direction value is assigned which is called "no direction." The preliminary direction estimate is then assigned to the center data element in the window and this data passed to the direction enhancement section. The two windows are then advanced to the next adjacent column in the image. At each new location, a preliminary direction estimate calculation is performed and the windows are again advanced. This continues until an entire row of data elements has been scanned. At the end of the row, the windows are returned to the left edge of the image but are centered on the next lower row. This row is then scanned from left to right. This scanning process continues until every data element in the image has, at one time, appeared in the center of the windows.

In the direction enhancement section, a statistical analysis is made of the preliminary direction estimate values in a localized area. The first step of the analysis is to construct a histogram of the preliminary direction estimate values within another square window portion of the image. This histogram is analyzed to find the slit direction which is most representative of the ridge flow direction within the window area. This slit direction is then assigned as the enhanced direction for the center data element in the window. If none of the twelve directions satisfy the pass criteria, then a "no direction" value is assigned to the center data element. The enhanced value is then passed to the intensity enhancement section and to a binary/direction memory (not shown) for storage as an output image array. The window is then scanned across the entire image in the same manner as that described above.

The input data to the intensity enhancement section are the gray data for each image data element, the enhanced direction data, and the dynamic range data. The gray data and the enhanced direction data are formed into another square window portion of the image and are analyzed. This analysis is performed in one of two ways.

If the enhanced direction assigned to the center pixel in the window is "no direction," then analysis is performed using the gray value of the center data element, the mean gray value within the window and the 10 percentile and 90 percentile gray values for the window area. These four values are analyzed in circuitry (not shown) to find the amount of adjustment, if any, that is to be made to the intensity (gray) value for the center data element in the window. This becomes the enhanced intensity value of the center pixel for the case where the center pixel has "no direction".

If the center data element in the window has an assigned enhanced direction, the intensity enhancement analysis is performed based on the gray value of the twelve closest neighboring data elements located along a line which passes through the center and has the same direction as that of the center data element. For each of these neighboring data elements whose direction differs from that of the center data element by less than 45 degrees, the intensity of the center data element is adjusted upward if the intensity of the neighbor is greater than the mean intensity or is adjusted downward if the intensity of the neighbor is less than the mean intensity. For each neighbor whose direction differs from that of the center data element by more than 45 degrees, the intensity is adjusted downward if the intensity of the neighbor is greater than the mean intensity or is adjusted upward if the intensity of the neighbor is less than the mean intensity. If the neighboring pixel has "no direction" or if the direction of the neighbor differs from that of the center data element by exactly 45 degrees, no adjustment is made to the intensity of the center data element. After all adjustments have been made, this value becomes a correction value to apply to the intensity of the center data element to form the enhanced intensity value of the center data element for the case where the center data element has a direction.

The enhanced intensity value for the center data element in the window is then passed to Image Buffer "C" to be stored in an output image array. If the enhanced intensity value is greater than 127, a binary value of 1 is assigned to the center data element or, if the enhanced intensity value is less than or equal to 128, a binary value of zero is assigned. Also, if the center data element has "no direction," an edit bit is set for this data element. The binary bit and the edit bit are then passed to the binary/direction memory for storage in an image array.

After the above calculations have been complete, the window is advanced across the image as described above until the entire image has been scanned.

If the image has not been adequately enhanced by the first pass through the CEP filter, the gray data may be read from an image buffer and again passed through the filter. This process may be repeated until the quality of the enhanced image is deemed to be acceptable but is not to exceed a total of five passes.

After the final pass through the CEP filter, the binary, edit, and direction data may be read serially from the output image memory board and then passed through the binary processing group and the direction processing group in parallel.

The foregoing detailed description is to be clearly understood as given by way of illustration and example only, the spirit and scope of this invention being limited solely by the appended claims.

What is claimed is:

1. A method of enhancing intensity data for each of a plurality of data elements in an N×M matrix of data elements each including data representative of an intensity within a range of intensities and data representative of a feature flow direction or "no direction," comprising the steps of:

forming an I×I intensity enhancement window of data elements within the N×M matrix, with I<N, I<M, and having a center data element, determining the mean of the intensity values of the intensity data for the data elements within the scan window;

selecting a plurality of data elements within the intensity enhancement scan window defining a direction slit having the direction represented by the feature flow direction data of the center data element;

modifying the intensity value of the intensity data of the center data element according to the relationship of the intensity data of each data element in the direction slit to the mean, and the relationship of the direction represented by the direction data in each data element in the direction slit to the direction represented by the direction data of the center data element.

2. The method of claim 1, wherein the modification of the intensity value for the center data element comprises the steps of:

for each of the data elements in the direction slit having the direction represented by the direction data in the center data element, where the center data element has other than "no direction" as its direction data, comparing the intensity data to an augmented mean, proportional to the mean of the intensity data of all the data elements in the intensity enhancement scan window, and comparing the direction represented by the direction data of the center data element to the direction represented by the direction data of each respective direction slit data element;

generating an intensity correction with a magnitude dependent upon the absolute difference between the intensity data of the respective direction slit data element and the augmented mean and, when the direction represented by the direction data of the respective direction slit data element is within a selected number of degrees from the direction represented by the direction data of the center data element, having a sign to decrease the value of the intensity data of the center data element when the intensity of the respective direction slit data element exceeds the augmented mean, and having a sign to increase the intensity of the center data element when the intensity of the respective direction slit data element is less than the augmented mean, and, when the direction represented by the direction data of the respective direction slit data element is not within a selected number of degrees from the direction represented by the direction data of the center data element, having a sign to increase the value of the intensity data of the center data element when the intensity of the respective direction slit data element exceeds the augmented mean, and having a sign to decrease the intensity of the center data element when the value of the intensity of the respective direction slit data element is less than the augmented mean.

3. The method of claim 2, further comprising the steps of:

incrementing the I×I intensity enhancement scan window through the N×M matrix until each data element in the N×M matrix is a center data element in the I×I direction enhancement scan window.

4. The method of enhancing data contained in an N×M matrix of data elements each including data representative of a first parameter, comprising the steps of:

incrementing a first Q×Q scan window, having a center data element with Q<N, Q<M, through the N×M matrix and assigning a second parameter value to each center data element position of the Q×Q scan window within the N×M matrix based upon the contents of selected ones of the data elements in the Q×Q scan window representative of the first parameter;

subsequently incrementing a second Q'×Q' scan window, having a center data element with Q<N, Q<M, through an N×M matrix of data elements containing data representative of the second parameter, and assigning an enhanced second parameter value to each center data element position of the Q'×Q' scan window within the N×M matrix based upon the contents of selected ones of the data elements in the Q'×Q' scan window representative of the second parameter;

subsequently incrementing a Q"×Q" scan window, having a center data element, with Q"<N, Q"<M, through the N×M matrix and assigning an enhanced first parameter value to each center data element position of the Q"×Q" scan window within the N×M matrix based upon the contents of selected ones of the data elements in the Q"×Q" scan window representative of at least one of the first parameter and the enhanced second parameter.

5. The method of claim 4, wherein the first parameter is intensity and the second parameter is direction.

6. The method of claim 5, wherein the direction value is assigned based upon the direction of selected data elements defining a slit in which the contrast in intensity between data elements of the slit, spaced apart by a selected number of data elements, is least pronounced.

7. The method of enhancing data contained in an N×M matrix of data elements each containing data representative of an intensity value within a range of intensity values, comprising the steps of:

incrementing a Q×Q scan window, having a center data element, through the N×M matrix and assigning to each center data element position of the Q×Q scan window in the N×M matrix an estimated direction based upon the direction of selected data elements within the Q×Q scan window defining a slit in which the contrast in intensity values between data elements in the slit, spaced apart by a selected number of data elements, is least pronounced, subsequently incrementing a Q'×Q' scan window, having a center data element, through the N×M matrix and assigning an enhanced direction value to each center data element position of the Q'×Q' scan window within the N×M matrix, based upon the predominance of an estimated direction and its adjacent directions, or an estimated direction and its adjacent directions and "no direction," or an average of a first estimated direction and a second estimated direction based upon the predominance of the first direction and the second direction, or the first direction, the second direction and "no direction";

subsequently incrementing a Q"×Q" scan window, having a center data element, through the N×M matrix and assigning an enhanced intensity value to each center data element position of the Q"×Q" scan window within the N×M matrix based upon the relationship of the intensity value of each data element within the Q"×Q" scan window defining a direction slit having the direction of the enhanced direction of the center data element, and the mean of the intensity values of all data elements in the Q"×Q" scan window, and based upon the relationship of the enhanced direction data of the center data element and the enhanced direction data in each data element within the direction slit.

8. A data enhancement apparatus for performing the comparison between the data in a center data element of an S×S scan window, being incremented through an N×M matrix of data elements, with s being an odd number, and the data elements defining a slit, from among a plurality of slits generally equally spaced through the S×S window and passing through the center data element, and enhancing the data in the center data element according to the comparison comprising:

scanning and delay circuit means for selecting an abbreviated scan window having a plurality of selected data elements in a selected pattern within a J×J matrix in the leading corner of the S×S scan window with $$J = \frac{s-1}{2};$$

control means connected to the scanning and delay circuit means for reading the direction data in the incoming data element incremented into the abbreviated scan window and storing that direction data for J−2 incrementation periods, and for controlling the selection of one of the data elements within the abbreviated scan window for each of a plurality of center data element positions within the leading row of the abbreviated scan window, and one of the data elements within the abbreviated scan window for each of the plurality of center data element positions within the trailing row of the abbreviated scan window, according to the direction data in the respective center data element position, such that after a number of incrementation periods, equal to the number of data elements in the slit within the S×S scan window on one side of the center data element, each of the data elements on one side of the slit having the direction of a respective one of the center data element positions is selected for the center data element positions in the leading row of the abbreviated scan window, and each of the data elements on the other side of the slit having the direction of the respective center data element position is selected for the center data element positions in the trailing row of the abbreviated scan window;

comparator and logic means for comparing the data in the selected data element within the abbreviated scan window to the data in the respective center data element position in the leading row or the trailing row of the abbreviated scan window to form a correction factor based upon the comparison;

correction factor summing means for summing the output of the comparator means for each respective center data element position, to form a correction factor for each respective center data element position;

data enhancement means for applying the correction factor to the data in the respective center data element position.

9. A data enhancing filter for enhancing data contained in an N×M matrix of data elements, each containing data representative of a first parameter, comprising:

first scanning and incrementing means for incrementing a first Q×Q scan window, having a center data element, with Q<N, Q<M, through the N×M matrix;

second parameter assignment means for assigning a second parameter to each center data element of the first Q×Q scan window within the N×M matrix based upon the contents of selected ones of the data elements in the Q×Q scan window representative of the first parameter;

second scanning and incrementing means for incrementing a second Q'×Q' scan window having a center data element, with Q'<N, Q'<M, throughan N×M matrix of data elements containing data representative of the second parameter;

second parameter enhancement means for enhancing the data representative of the second parameter for each center data element position of the second Q'×Q' scan window based upon the contents of selected ones of the data elements in the second Q'×Q' scan window representative of the second parameter;

third scanning and incrementing means for incrementing a third Q"×Q" scan window, having a center data element, with Q"<N, Q"<M, through an N×M matrix of data elements having data representative of the first parameter and the enhanced second parameter;

first parameter enhancement means for enhancing the data representative of the first parameter for each center data element of the third Q"×Q" scan window within the N×M matrix based upon the contents of selected ones of the data elements within the Q"×Q" scan window representative of the first parameter and the enhanced second parameter.

10. The apparatus of claim 9, wherein the first parameter is intensity and the second parameter is direction.

11. The apparatus of claim 10, further comprising:

the second parameter assignment means includes means for assigning a direction to the center data element of the first Q×Q scan window based upon the direction of selected data elements within the first Q×Q scan window defining a slit in which the contrast in intensity between data elements within the respective slit, spaced apart by a selected number of data elements, is least pronounced.

12. A data enhancement filter for enhancing data contained in the data elements of an N×M matrix of data elements representative of an intensity value within a range of intensity values, comprising:

first scanning and incrementing means for incrementing a first Q×Q scan window, having a center data element, with Q<N, Q<M, through the N×M matrix of data elements;

direction estimate means for assigning a direction estimate to each center data element position of the first Q×Q scan window within the N×M matrix, based upon the direction of selected data elements defining a slit in which the contrast in intensity values between data elements in the slit, spaced apart by a selected number of data elements in the slit, is least pronounced;

second scanning and incrementing means for incrementing a second Q'×Q' scan window, having a center data element, with Q'<N, Q'<M, through an N×M matrix of data elements having data representative of an assigned direction from one of a plurality of possible assigned directions, including "no direction";

direction enhancement means for enhancing the data representative of the assigned direction for each center data element position of the second Q'×Q' scan window within the N×M matrix of data elements, based upon the preponderance of data elements having an estimated direction and having directions adjacent that direction, or the preponderance of data elements of an estimated direction and having "no direction," or upon the average of a first and second direction, based upon the preponderance of data elements having the first direction and the second direction, or the first direction, the second direction and no direction;

third scanning and incrementing means for incrementing a third Q"×Q" scan window, having a center data element, with Q"<N, Q"<M, through an N×M matrix of data elements having data representative of intensity and enhanced direction;

intensity enhancement means for enhancing the data in each center data element position of the third Q"×Q" scan window representative of intensity, based upon the relationship of the intensity value of each data element within the third Q"×Q" scan window defining a direction slit having the direction of the enhanced direction of the center data element, to the mean of the intensity values for all of the data elements in the third Q"×Q" scan window, and based upon the relationship of the enhanced direction data of the center data element and the enhanced direction data of each data element in the direction slit.

13. The method of classifying and identifying fingerprints comprising the steps of:

enhancing data contained in an N×M matrix of data elements each containing data representative of an intensity value within a range of intensity values, each data element representing an image pixel received from a digitized camera image of a fingerprint, by performing an enhancing step comprising the steps of:

incrementing a Q×Q scan window, having a center data element, through the N×M matrix and assigning to each center data element position of Q×Q scan window in the N×M matrix an estimated direction based upon the direction of selected data elements within the Q×Q scan window defining a slit in which the contrast in intensity values between data elements in the slit, spaced apart by a selected number of data elements, is least pronounced, subsequently incrementing a $Q' \times Q'$ scan window, having a center data element, through the $N \times M$ matrix and assigning an enhanced direction value to each center data element position of the $Q' \times Q'$ scan window within the $N \times M$ matrix, based upon the predominance of an estimated direction and its adjacent directions, or an estimated direction and its adjacent directions and "no direction," or an average of a first estimated direction and a second estimated direction based upon the predominance of the first direction and the second direction, or the first direction, the second direction and "no direction";

subsequently incrementing a $Q'' \times Q''$ scan window, having a center data element, through the $N \times M$ matrix and assigning an enhanced intensity value to each center data element position of the $Q'' \times Q''$ scan window within the $N \times M$ matrix based upon the relationship of the intensity value of each data element within the $Q'' \times Q''$ scan window defining a direction slit having the direction of the enhanced direction of the center data element, and the mean of the intensity values of all data elements in the $Q'' \times Q''$ scan window, and based upon the relationship of the enhanced direction data of the center data element and the enhanced direction data in each data element within the direction slit;

generating a binary image of the fingerprint from the enhanced intensity value for each data element in the matrix, by assigning a 1 or a 0 to each matrix location based upon the enhanced intensity value for each data element in the matrix;

determining the classification of the fingerprint and the location of fingerprint minutia based upon either or both of the enhanced direction value and the binary intensity value for each data element in the matrix.

14. The method of claim 1, comprising the further steps of:

estimating the dynamic range of intensity values for a matrix of data elements each having its own intensity value represented by n bits of digital data, within the range $I_{min}$ to $I_{max}$, wherein the dynamic range is defined as the difference between the intensity value above which lie a first percentile of the number of data elements and the intensity value below which lie a second percentile of the number of data elements comprising:

scanning the data elements and determining the s most significant bits of the n digital data bits for each data element;

forming a histogram containing s groups of bins formed according to a hierarchy of most significant bits, and each group containing the possible combinations of the s, s−1, s−2 . . . , s−(s−1) most significant bits for the respective group of bins, with 0 in the least significant bit location of the combination corresponding to each bin of the respective group, comparing the number contained in the bin of the first group, corresponding to the number of data elements which have the most significant bit in their intensity value set to 0, i.e., which are less $$\frac{I_{max} - I_{min}}{2},$$

with the number of data elements constituting the first percentile, to determine if the number in the bin of the first group is equal to or greater than the number constituting the first percentile, and comparing the number contained in the bin of the first group with the number of data elements constituting the second percentile, to determine if the number in the bin of the first group is equal to or greater than the number constituting the second percentile;

selecting a first percentile selected bin and a second percentile selected bin from second group of bins, based upon the results of each of the preceding comparisons, such that, if the number in the bin of the first group of bins is equal to or greater than the respective percentile, a most significant bit of 0 is retained and the bin in the second group having a 0 for the most significant bit is selected for comparison, and if the number in the bin of the first group is less than the respective percentile a most significant bit of 1 is retained, and the bin in the second group having a 1 in the most significant bit is selected for comparison;

comparing the number in the first percentile selected bin in the second group with the first percentile, to determine if the number in the first percentile selected bin is equal to or greater than the first percentile, and, if so, retaining an 0 as the second most significant bit, and selecting for comparison the bin in the third group having the retained value for the most significant bit as 0 as the second most significant bit, and, if not, retaining a 1 as the next most significant bit, and selecting the bin in the third group having the retained value for the immediately more significant bit and a 1 as the next most significant bit, and comparing the number in the second percentile selected bin in the second group with the second percentile to determine if the number in the second percentile selected bin in the second group is equal to or greater than the second percentile and, if so, retaining a 0 as the second most significant bit and selecting for comparison the bin in the third group having the retained value for the immediately more significant bit and 0 in the second most significant bit, and if not, retaining a 1 as the next most significant bit, and selecting the bin in the third group having the retained value for the immediately more significant bit and a 1 as the second next most significant bit;

repeating such comparison and selection for each successive group of the s groups respecting the lesser significant bits to determine the state of s bits of data representative of the s most significant bits of the estimated intensity of the first and of the second percentiles.

15. The method of claim 1, comprising the further steps of:

updataing a compilation of the data contained in the data elements within a matrix of data elements, forming a scan window having a center data element, while incrementing the matrix through an N×M matrix of data elements, comprising the steps of:

incrementing the scan window through the N×M matrix column by column and row by row;

for a first center data element position, determining the change in the compilation of the data due to the addition of the data in a data element "X" in the same row as the leading corner of the S×S scan window and immediately adjacent the leading corner in the direction of incrementation, the deletion of the data in a data element "W," in the same column as the data element "X" and S rows before the data element "X," in a direction opposite the direction of incrementation, the deletion of the data in a data element "Z," S columns before the data element "X," in a direction opposite the direction of incrementation, and the addition of the data in a data element "Y," S columns and S rows before the data element "X," in a direction opposite the direction of incrementation, in order to form a first delta;

storing the first delta;

for a second center data element position, determining the change in the compilation of the data due to the addition of data elements "X" and "Y," and the deletion of data elements "W" and "Z," positioned as recited in the second proceeding subparagraph with respect to the second center data element position in the N×M matrix, to form a second delta;

determining the net change to the compilation of the data due to the first delta and the second delta to form a net delta;

modifying the compilation of the data by the net delta.

16. The method of claim 14, comprising the further steps of:

updating a compilation of the data contained in the data elements within a matrix of data elements, forming a scan window having a center data element, while incrementing the matrix through an N×M matrix of data elements, comprising the steps of:

incrementing the scan window through the N×M matrix column by column and row by row;

for a first center data element position, determining the change in the compilation of the data due to the addition of the data in a data element "X" in the same row as the leading corner of the S×S scan window and immediately adjacent the leading corner in the direction of incrementation, the deletion of the data in a data element "W," in the same column as the data element "X" and S rows before the data element "X," in a direction opposite the direction of incrementation, the deletion of the data in a data element "Z," S columns before the data element "X," in a direction opposite the direction of incrementation, and the addition of the data in a data element "Y," S columns and S rows before the data element "X," in a direction opposite the direction of incrementation, in order to form a first delta;

storing the first delta;

for a second center data element position, determining the change in the compilation of the data due to the addition of data elements "X" and "Y," and the deletion of data elements "W" and "Z," positioned as recited in the second proceeding subparagraph with respect to the second center data element position in the N×M matrix, to form a second delta;

determining the net change to the compilation of the data due to the first delta and the second delta to form a net delta;

modifying the compilation of the data by the net delta.

17. An apparatus for enhancing data representative of intensity in each data element an N×M matrix of data elements, each having data representative of intensity and data representative of a direction from a plurality of directions, comprising:

scan window incrementation means, operating in syncronization with a system clock, for incrementing through the N×M matrix of data elements a folded scan window comprising a selected pattern of data element positions within a portion of the N×M matrix and having a leading row and a trailing row;

selection means for selecting from within the folded scan window positions, during each clock period, a plurality of data elements, each selected to be located, respectively, in a slit defined by the direction data in one of a plurality of different data element locations within the N×M matrix in the leading row or in the trailing row of the folded scan window;

logic means for computing a plurality of partial correction factors each based upon the comparison of the direction and intensity data for a respective one of the selected data elements in the folded scan window and its respective center data element;

accumulator means for accumulating for a plurality of clock periods the partial correction factor associated with each respective center data element location in the leading row and for each respective center data element location in the trailing row;

partial accumulated correction factor storage and accumulation means for storing a first output of the accumulator means representing the accumulation of the partial correction factors for a center data element location in the N×M matrix positioned in the leading row, until a second output of the accumulator means is the accumulation of the partial corection factors for the same center data element in the N×M matrix positioned in the trailing row, and for combining the two accumulated partial correction factors to form an intensity enhancement correction value;

correction means for applying the intensity enhancement correction value to the intensity data for the center data element location in the N×M matrix, to enhance the intensity data of the center data element location.

18. The apparatus of claim 17 further comprising:

dynamic range determining means for determining the value of the dynamic range of the intensity values represented by the intensity data in each of the data elements in a dynamic range scan window centered at a center data element location in the N×M matrix of data elements;

the logic means includes:

comparator means for comparing the intensity value for each respective one of the selected data elements to the intensity value for its respective center data element to determine the absolute value of the difference in intensity between the two to form an intensity difference signal;

adjusted intensity difference determining means for adjusting the intensity difference signal according to the dynamic range value and relationship between the dynamic range value and the value represented by the intensity difference, to form an adjusted intensity difference signal;

multiplication factor generating means for generating a multiplication factor based upon the relationship between the direction of each respective selected data element and the direction of its respective center data element to provide a multiplication factor signal;

multiplication means for multiplying the adjusted intensity difference signal by the multiplication factor to form the partial correction factor.

19. The apparatus of claim 17 further comprising:

multiplexer means, having a plurality of outputs each corresponding to a location in the folded scan window during a respective clock period;

clock splitting means for dividing the system clock period into a plurality of shorter clock periods;

a plurality of selection logic means, each associated with a respective center data element position located in either of the leading row or the trailing row and for addressing one of the multiplexer outputs during each of the plurality of shorter clock periods, responsive to the direction data contained in the center data element location and the position of the folded scan window with respect to the center data element during the respective system clock period.

* * * * *